United States Patent
Song et al.

(10) Patent No.: US 12,032,799 B2
(45) Date of Patent: Jul. 9, 2024

(54) CARD SHARING METHOD, ELECTRONIC DEVICE, AND COMMUNICATIONS SYSTEM

(71) Applicant: HONOR DEVICE CO., LTD., Shenzhen (CN)

(72) Inventors: Ping Song, Shenzhen (CN); Changjun Yang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/794,165

(22) PCT Filed: May 11, 2021

(86) PCT No.: PCT/CN2021/092985
§ 371 (c)(1),
(2) Date: Jul. 20, 2022

(87) PCT Pub. No.: WO2021/249087
PCT Pub. Date: Dec. 16, 2021

(65) Prior Publication Data
US 2023/0004259 A1    Jan. 5, 2023

(30) Foreign Application Priority Data

Jun. 8, 2020  (CN) .......................... 202010512011.3

(51) Int. Cl.
*H04M 1/72403* (2021.01)
*G06F 3/0481* (2022.01)
*G06F 9/54* (2006.01)

(52) U.S. Cl.
CPC ............ *G06F 3/0481* (2013.01); *G06F 9/546* (2013.01); *H04M 1/72403* (2021.01); *G06F 2203/04803* (2013.01)

(58) Field of Classification Search
CPC .. H04M 1/72403; G06F 3/0481; G06F 9/546; G06F 2203/04803
See application file for complete search history.

(56) References Cited

U.S. PATENT DOCUMENTS 8,042,110 B1 * 10/2011 Kawahara ............... G06F 9/451
715/764
10,461,710 B1 * 10/2019 Charlton .................. H03G 3/02
(Continued)

FOREIGN PATENT DOCUMENTS

CA    2820971 A1 *  2/2014 ............ G06F 21/31
CA    2820993 A1 *  2/2014 ........... G06F 3/0482
(Continued)

OTHER PUBLICATIONS

Harry Guinness, "How to Use Spotify on Your Sonos Speaker", published Mar. 27, 2018 to https://www.howtogeek.com/346581/how-to-use-spotify-on-your-sonos-speaker, retrieved Aug. 17, 2023. (Year: 2018).*

(Continued)

*Primary Examiner* — Shourjo Dasgupta
(74) *Attorney, Agent, or Firm* — WOMBLE BOND DICKINSON (US) LLP

(57) ABSTRACT

This application provides a card sharing method, an electronic device, and a communications system. The method includes: displaying an interface of a first application in response to a first operation of a user, where a first card is displayed on the interface of the first application, the first card includes a first card module and a second card module, and interface resources of the first card are provided by a second application; sending a second message to a third application in response to a second operation of the user, where the second operation is associated with the first card module, and the second message includes an identifier of the first card module; and displaying an interface of the third (Continued)

application, where the first card module is displayed on the interface of the third application, and interface resources of the first card module are provided by a fourth application.

20 Claims, 45 Drawing Sheets

(56) References Cited

U.S. PATENT DOCUMENTS

| | | | |
|---|---|---|---|
| 2004/0030719 A1* | 2/2004 | Wei | G06F 16/9577 |
| 2007/0082707 A1* | 4/2007 | Flynt | G06Q 30/0261 |
| | | | 455/564 |
| 2010/0293461 A1* | 11/2010 | Boezeman | G06F 16/95 |
| | | | 715/764 |
| 2013/0046855 A1* | 2/2013 | Jiang | H04L 67/10 |
| | | | 709/218 |
| 2013/0091513 A1* | 4/2013 | Underdal | G06F 9/4843 |
| | | | 719/328 |
| 2014/0212640 A1* | 7/2014 | Piazza | B82Y 40/00 |
| | | | 252/502 |
| 2014/0282213 A1* | 9/2014 | Musa | G06F 9/451 |
| | | | 715/781 |
| 2014/0298253 A1* | 10/2014 | Jin | G06F 3/0485 |
| | | | 715/803 |
| 2015/0193135 A1* | 7/2015 | Kim | G06F 3/0483 |
| | | | 715/747 |
| 2016/0085436 A1* | 3/2016 | Louch | G06F 3/04817 |
| | | | 715/790 |
| 2017/0090879 A1* | 3/2017 | Veltri | G06Q 10/063 |
| 2017/0188213 A1* | 6/2017 | Nirantar | H04L 67/564 |
| 2018/0316745 A1* | 11/2018 | Kim | H04L 67/10 |
| 2018/0348967 A1* | 12/2018 | Kondrk | G06F 8/20 |
| 2018/0367483 A1* | 12/2018 | Rodriguez | H04L 51/046 |
| 2019/0087507 A1* | 3/2019 | Fields | G06F 3/0486 |
| 2020/0097871 A1 | 3/2020 | Barrows et al. | |
| 2020/0183545 A1* | 6/2020 | Kitson | H04L 65/612 |
| 2020/0218443 A1* | 7/2020 | Narayan | G06F 3/04886 |
| 2020/0278775 A1* | 9/2020 | Tao | G06F 3/04883 |

FOREIGN PATENT DOCUMENTS

| | | | | |
|---|---|---|---|---|
| CN | 108958867 A | | 12/2018 | |
| CN | 109032479 A | | 12/2018 | |
| CN | 110572431 A | | 12/2019 | |
| CN | 110837398 A | | 2/2020 | |
| CN | 111061522 A | | 4/2020 | |
| EP | 2891970 A1 | * | 7/2015 | G06F 3/04817 |
| KR | 20150021943 A | * | 3/2015 | |
| WO | WO-2018116252 A1 | * | 6/2018 | G06F 40/186 |
| WO | WO-2020048495 A1 | * | 3/2020 | H04M 1/72466 |

OTHER PUBLICATIONS

Apple Support, "Search from the iPhone Home Screen or Lock Screen", published on Feb. 17, 2019 to https://support.apple.com/guide/iphone/search-from-the-home-screen-or-lock-screen-iph3c51148/ios, retrieved on Aug. 19, 2023. (Year: 2019).*

"Modern Approach to Embedding a Web Server in a Device", published on Aug. 12, 2018 to https://realtimelogic.com/articles/Modern-Approach-to-Embedding-a-Web-Server-in-a-Device, retrieved Feb. 13, 2024. (Year: 2018).*

Robert Witkowski, "UI in Microservices World—Micro Frontends patterns and Web Components", published Dec. 13, 2018 to https://medium.com/@witek1902/ui-in-microservices-world-micro-frontends-pattern-and-web-components-23607a569363, retrieved Feb. 13, 2024. (Year: 2018).*

* cited by examiner

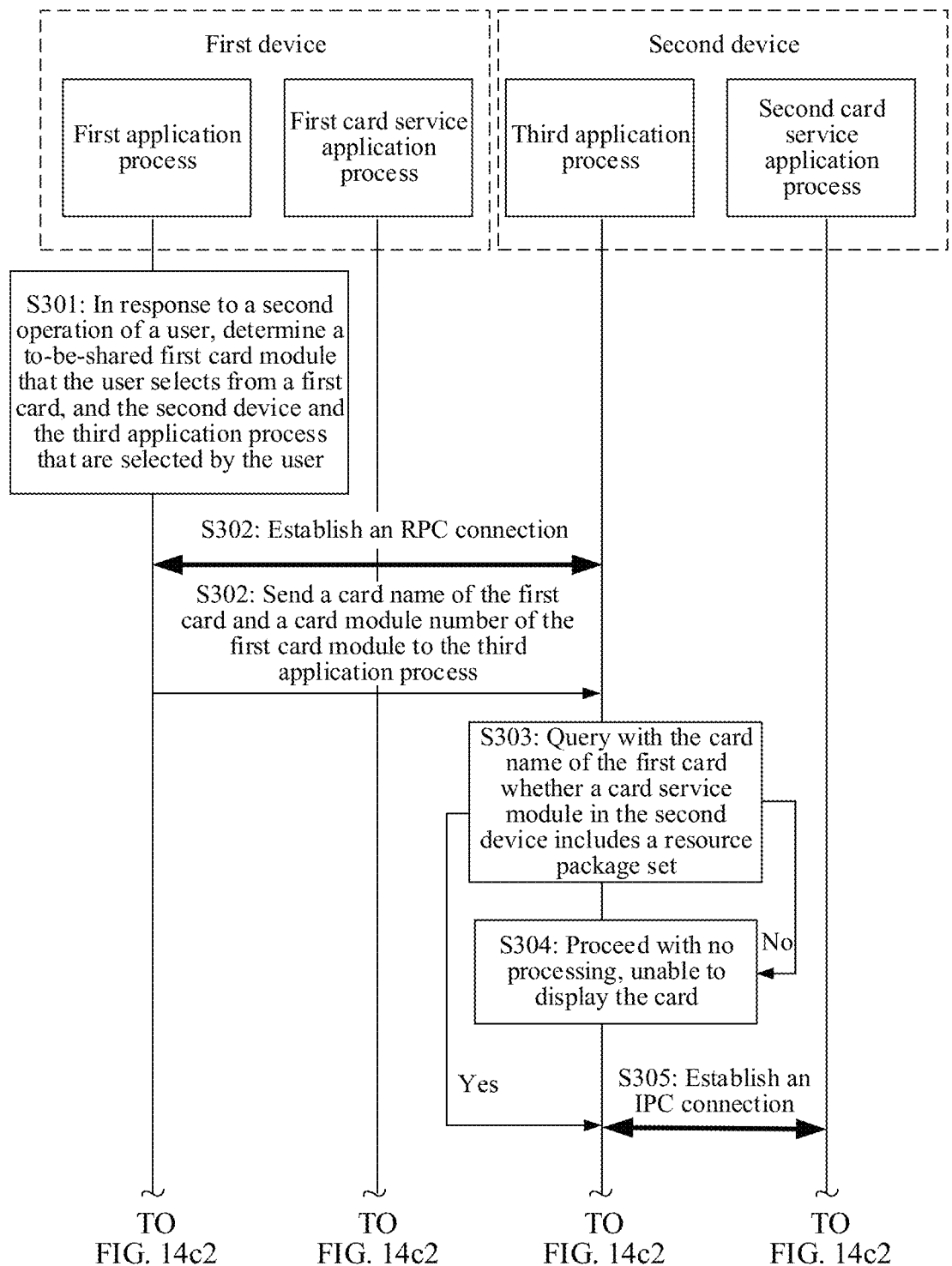
FIG. 14c1

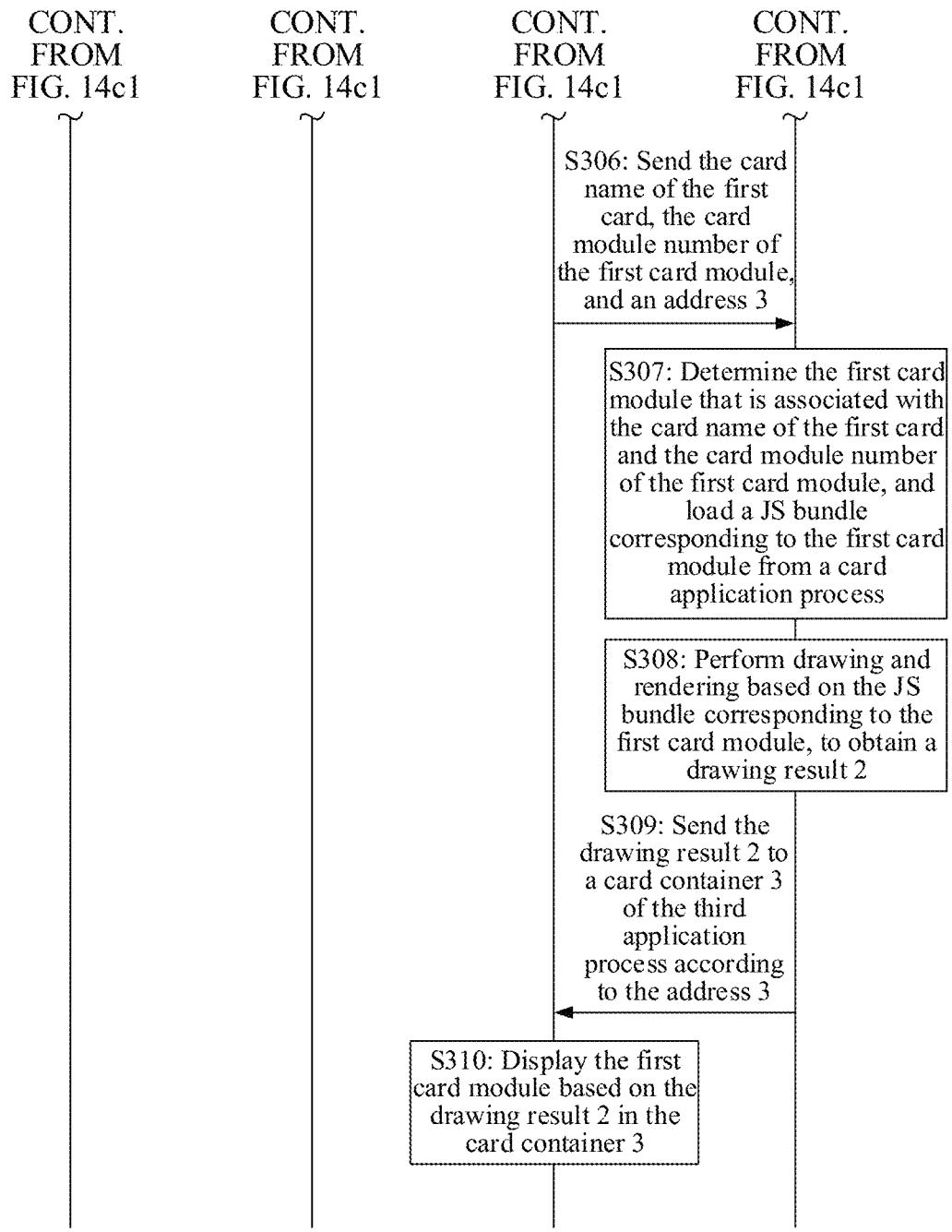
FIG. 14c2

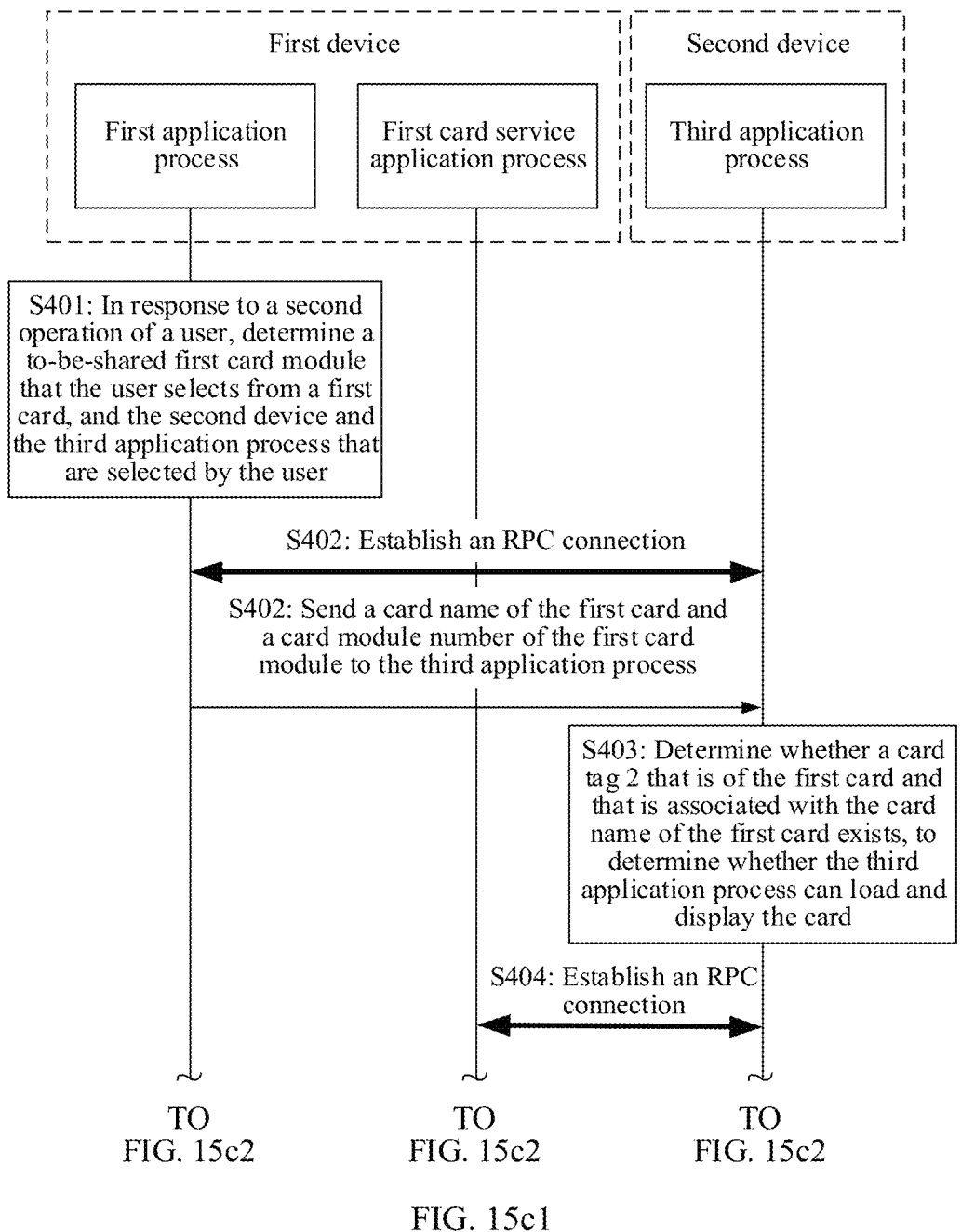
FIG. 15c1

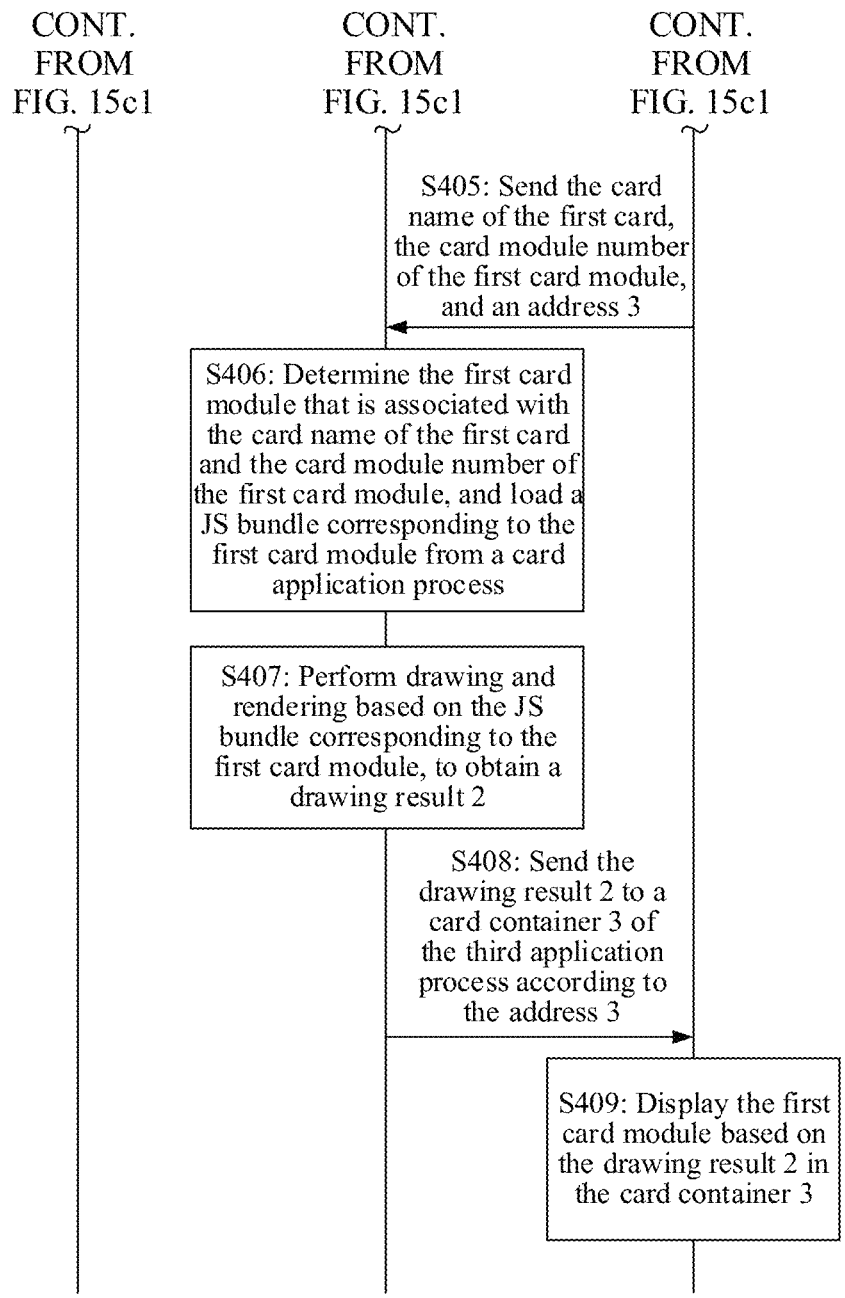
FIG. 15c2

CARD SHARING METHOD, ELECTRONIC DEVICE, AND COMMUNICATIONS SYSTEM

CROSS-REFERENCE TO RELATED APPLICATIONS

This application is a national stage of International Application No. PCT/CN2021/092985, filed on May 11, 2021, which claims priority to Chinese Patent Application No. 202010512011.3, filed on Jun. 8, 2020. Both of the aforementioned applications are hereby incorporated by reference in their entireties.

TECHNICAL FIELD

This application relates to the field of communications technologies, and in particular, to a card sharing method, an electronic device, and a communications system.

BACKGROUND

Cards are a type of new service display technology that is widely applied to electronic devices, to help users quickly view service information of various applications. However, existing cards support only limited control combinations in applications, and especially do not support controls that are frequently used or have deeper control entries. In addition, the existing cards often appear in fixed positions of electronic devices with monotonous and fixed display manners. It is difficult to implement secondary combinations and sharing. Therefore, how to flexibly implement card sharing is an urgent problem to be resolved.

SUMMARY

This application provides a card sharing method, an electronic device, and a communications system, to implement sharing of some card modules of a card or an entire card between application programs on a same device, and also implement sharing of some card modules of a card or an entire card across devices.

According to a first aspect, this application provides a card sharing method, including: displaying an interface of a first application in response to a first operation of a user, where a first card is displayed on the interface of the first application, the first card includes a first card module and a second card module, and interface resources of the first card are provided by a second application; sending a second message to a third application in response to a second operation of the user, where the second operation is associated with the first card module, and the second message includes an identifier of the first card module; and displaying an interface of the third application, where the first card module is displayed on the interface of the third application, and interface resources of the first card module are provided by a fourth application.

By using the card sharing method provided in the first aspect, a card can be split into a plurality of card modules and the card modules can be recombined. In this way, sharing of some card modules of the card or the entire card is implemented not only between application programs on a same device but also across devices. Therefore, by using the card modules of the card or the entire card, service content expected by the user can be conveniently and quickly provided for the user based on the user's wishes, especially key information that is in the service content and that is frequently used or requires cumbersome operations, which satisfies sharing requirements in different scenarios and helps improve user experience.

In a possible design, the first card further includes a third card module, the third card module is also displayed on the interface of the third application, and interface resources of the third card module are provided by the fourth application. Therefore, in this application, the card may be set with a property of being recombinable, or with a property of being non-recombinable. For example, a card module used to indicate service content of a card, key information of a card, or the like is set to be a non-recombinable card module. Therefore, the first application process may determine, in response to the second operation of the user, that the second card module and the third card module need to be displayed on the interface of the third application; or the third application may determine, based on the identifier of the first card module in the second message, that the second card module and the third card module need to be displayed on the interface of the third application, thereby facilitating implementation of card sharing.

In a possible design, the first application, the second application, and the third application are different application programs on a first device; the first application process is corresponding to the first application; a second application process is corresponding to the second application; a third application process is corresponding to the third application; a fourth application process is corresponding to the fourth application; the second application and the fourth application are a same application program; and the second application process and the fourth application process are a same application program process. Therefore, the card sharing method in this application is applicable to scenarios of use between different application programs on a same device, helping provide the user with a variety of display channels of cards. A card may be presented the same or differently for each display channel, so that the user can obtain expected service content in a timely manner.

In a possible design, the first application and the second application are different application programs on a first device; the third application and the fourth application are different application programs on a second device; the first device is different from the second device; the first application process is corresponding to the first application; a second application process is corresponding to the second application; a third application process is corresponding to the third application; and a fourth application process is corresponding to the fourth application. Therefore, the card sharing method in this application is applicable to scenarios of card sharing across devices, helping provide different users with display channels of cards. In addition, different devices provide their own resource support for cards, which reduces dependence between different devices, and implements decoupling between different devices.

In a possible design, the first application and the second application are different application programs on a first device; the third application is a different application program on a second device; the first device is different from the second device; the first application process is corresponding to the first application; a second application process is corresponding to the second application; a third application process is corresponding to the third application; a fourth application process is corresponding to the fourth application; the second application and the fourth application are a same application program; and the second application process and the fourth application process are a same application program process. Therefore, the card sharing method in this application is applicable to scenarios of card sharing across devices, helping provide different users with display channels of cards. In addition, resource support is provided by one device for UI display of cards on different devices, which ensures that cards can be continuously displayed on different devices.

In a possible design, the method includes: sending a first message to the second application process; receiving a first drawing result from the second application process, where the first drawing result is obtained by rendering and drawing by the second application process based on the interface resources of the first card, the interface resources of the first card are obtained by invoking by the second application process from a resource package set based on the first message, and the resource package set includes the interface resources of the first card module, the second card module, and the third card module that are of the first card, and interface resources of a fourth card module and a fifth card module that are of a second card; and displaying the first card on the interface of the first application based on the first drawing result. Therefore, at least one card can be embedded into any application program on an electronic device, so that service content is displayed to the user in a card form, and abundant UI display channels are available for cards, which can satisfy different user requirements.

In a possible design, the first message includes an identifier of the first card. Therefore, on a basis that the first card and the first card module and the second card module that are of the first card are determined by the second application process, the amount of data transmission between the first application process and the second application process is reduced.

In a possible design, the first message includes an identifier of the first card, the identifier of the first card module, and an identifier of the second card module. Therefore, the second application process is able to correctly determine the first card module and the second card module that are of the first card, and invoke the interface resources of the first card module and the second card module of the first card in a timely manner, to implement rendering and drawing of the first card. In this way, the first application can quickly display the first card.

In a possible design, the first message further includes a first address; and the first drawing result sent to the first address is received from the second application process, which provides a possible implementation for providing the first drawing result. In addition, through address sharing, not only updating of the first drawing result can be implemented, but also card sharing can be stopped to revoke a service.

In a possible design, the method further includes: when the first device has a resource package set, sending a first message to the second application process. When the first device does not have any resource package set, the second application process is unable to invoke the interface resources of the first card from the resource package set. Therefore, the method helps reduce unnecessary operations performed by the first device, thereby reducing power consumption of the first device, and also allows the first device to download a resource package set in a timely manner for quickly implementing card sharing.

In a possible design, the method includes: sending a third message to the fourth application process; receiving a second drawing result from the fourth application process, where the second drawing result is obtained by rendering and drawing by the fourth application process based on the interface resources of the first card module, the interface resources of the first card module are obtained by invoking by the fourth application process from the resource package set based on the third message, and the resource package set includes the interface resources of the first card module, the second card module, and the third card module that are of the first card, and the interface resources of the fourth card module and the fifth card module that are of the second card; and displaying the first card module on the interface of the third application based on the second drawing result. Therefore, a card may be shared to different application programs on a same device or to different devices, satisfying sharing requirements in different scenarios.

In a possible design, the third message includes the identifier of the first card and the identifier of the first card module. Therefore, the fourth application process is able to correctly determine the first card and the first card module, and invoke the interface resources of the first card module of the first card in a timely manner, to implement rendering and drawing of the first card module. In this way, the third application can quickly display the first card module.

In a possible design, the third message further includes a second address; and the second drawing result sent to the second address is received from the fourth application process, which provides a possible implementation for providing the second drawing result. In addition, through address sharing, not only updating of the second drawing result can be implemented, but also card sharing can be stopped to revoke a service.

In a possible design, the method further includes: when it is determined that the third application process is capable of displaying a card, sending the third message to the fourth application process. Therefore, when the third application process is incapable of displaying a card, the third application process is unable to send the third message to the fourth application process. Therefore, the method helps reduce unnecessary operations performed by a device on which the third application process is located, thereby reducing power consumption of the device on which the third application process is located, and allows the device on which the third application process is located to notify the user in a timely manner that the first application is unable to share a card to the third application.

In a possible design, the resource package set further includes interface resources of a fifth application. Therefore, resource support is provided for implementing interface display of the fifth application.

In a possible design, the interface of the first application includes a first region and a second region; and the first card is located in the first region, a first application page is located in the second region, and interface resources of the first application page are provided by the first application. Therefore, the interface of the first application is enriched, so that the first application can not only display one or more cards, but also display the first application page. Correspondingly, other applications such as the third application can also support display of cards and application pages at the same time.

In a possible design, the first application includes any one of a home screen, a minus one screen, a control center, a notification center, or an AI life application. The first application may be various types of application programs on the first device, which helps enrich card displaying channels and card sharing channels.

In a possible design, the third application includes any one of a home screen, a minus one screen, a control center, a notification center, or an AI life application. The third application may be various types of application programs on the first device or the second device, which helps enrich card displaying channels and card sharing channels.

According to a second aspect, this application provides an electronic device, including: at least one memory and at least one processor, where the memory is configured to store program instructions, and the processor is configured to invoke the program instructions in the memory to cause the electronic device to perform the card sharing method provided in any one of the first aspect or the possible designs of the first aspect.

According to a third aspect, this application provides a computer readable storage medium, where a computer program is stored in the computer readable storage medium. When the computer program is executed by a processor, an electronic device is caused to implement the card sharing method provided in any one of the first aspect or the possible designs of the first aspect.

According to a fourth aspect, this application provides a computer program product, including executable instructions. The executable instructions are stored in a readable storage medium. At least one processor of an electronic device is able to read the executable instructions from the readable storage medium, and the at least one processor executes the executable instructions to cause the electronic device to implement the card sharing method provided in any one of the first aspect or the possible designs of the first aspect.

According to a fifth aspect, this application provides a communications system, including a first device and a second device, where a first application is installed on the first device, and a third application is installed on the second device. The first application is configured to: display an interface of the first application in response to a first operation of a user, where a first card is displayed on the interface of the first application, the first card includes a first card module and a second card module, and interface resources of the first card are provided by a second application. The first application is further configured to send a second message to the third application in response to a second operation of the user, where the second operation is associated with the first card module, and the second message is used to indicate the first card module. The third application is configured to display an interface of the third application, where the first card module is displayed on the interface of the third application, and interface resources of the first card module are provided by a fourth application.

For beneficial effects of the network device provided in the fifth aspect and the possible designs of the fifth aspect, refer to the beneficial effects brought by the first aspect and the possible implementations of the first aspect. Details are not described herein again.

BRIEF DESCRIPTION OF DRAWINGS

FIG. 3a to FIG. 3l are schematic diagrams of human-machine interaction interfaces according to an embodiment of this application;

FIGS. 14c1 and 14c2 are a signaling interaction diagram of a card sharing method according to an embodiment of this application;

FIGS. 15c1 and 15c2 are a signaling interaction diagram of a card sharing method according to an embodiment of this application.

DESCRIPTION OF EMBODIMENTS

In this application, "at least one" means one or more, and "a plurality of" means two or more; and "and/or" is an association relationship used for describing associated objects, and represents that three relationships may exist. For example, A and/or B may represent the following three cases: only A, both A and B, and only B, where A and B may be singular or plural. The character "/" usually represents that associated objects are in an "or" relationship. In this application, "at least one of the following items (objects)" or a similar expression means any combination of these items, including a single item (object) or any combination of a plurality of items (objects). For example, at least one of only a, only b, or only c may represent: only a, only b, only c, a combination of a and b, a combination of a and c, a combination of b and c, or a combination of a, b, and c, where a, b, and c may be singular or plural. In addition, the terms "first" and "second" are merely used for a purpose of description, and should not be understood as an indication or implication of relative importance.

This application provides a card sharing method with which a card can be split into a plurality of card modules and the card modules can be recombined. In this way, sharing of some card modules of the card or the entire card is implemented not only between application programs on a same device but also across devices. Therefore, by using the card modules of the card or the entire card, service content expected by a user can be conveniently and quickly provided for the user based on the user's wishes, especially key information that is in the service content and that is frequently used or requires cumbersome operations, which satisfies sharing requirements in different scenarios and helps improve user experience.

For example, the electronic device may be a mobile phone, a tablet computer, a wearable device, an in-vehicle device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), or an internet of things (the internet of things, IOT) device such as a smart television, a smart screen, a high definition television, a 4K television, a smart speaker, or a smart projector. A specific type of the electronic device is not limited in this application.

Figure 1:
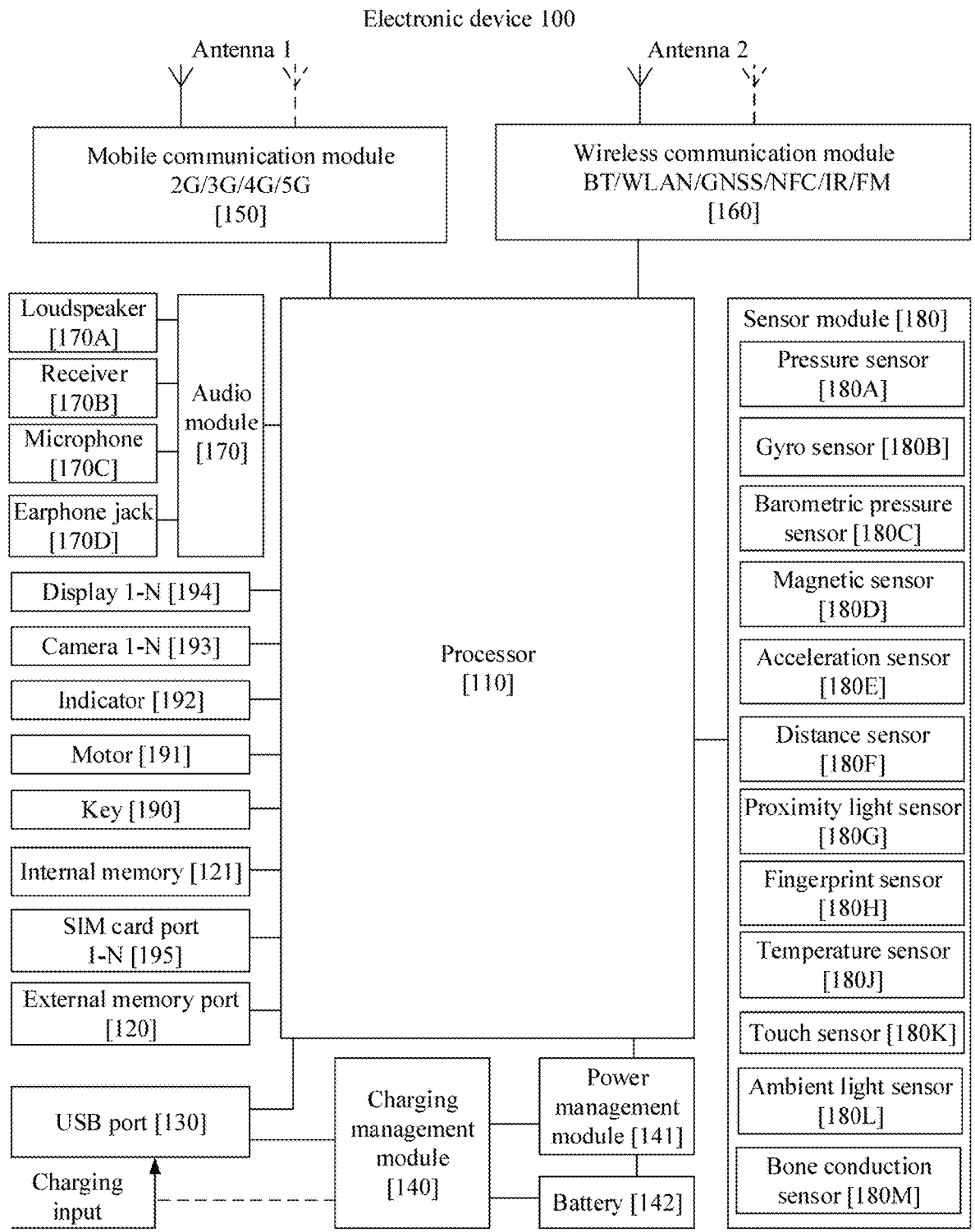
FIG. 1 is a schematic structural diagram of an electronic device according to an embodiment of this application.

Using an example in which the electronic device is a mobile phone, the following describes the electronic device included in this application with reference to FIG. 1.

FIG. 1 is a schematic structural diagram of an electronic device according to an embodiment of this application. As shown in FIG. 1, the electronic device 100 may include a processor 110, an external memory port 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a loudspeaker 170A, a receiver 170B, a microphone 170C, an earphone jack 170D, a sensor module 180, a key 190, a motor 191, an indicator 192, a camera 193, a display 194, a subscriber identity module (subscriber identification module, SIM) card port 195, and the like. The sensor module 180 may include a pressure sensor 180A, a gyro sensor 180B, a barometric pressure sensor 180C, a magnetic sensor 180D, an acceleration sensor 180E, a distance sensor 180F, a proximity light sensor 180G, a fingerprint sensor 180H, a temperature sensor 180J, a touch sensor 180K, an ambient light sensor 180L, a bone conduction sensor 180M, and the like.

It may be understood that the structure illustrated in this application does not constitute a specific limitation on the electronic device 100. In some other embodiments, the electronic device 100 may include more or fewer components than shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be separate devices or be integrated into one or more processors.

The controller may be a nerve center and command center of the electronic device 100. The controller may generate an operation control signal according to an instruction operation code and a timing signal, to complete control of instruction fetching and execution.

A memory may further be provided in the processor 110 and is configured to store an instruction and data. In some embodiments, the memory in the processor 110 is a cache. The cache may store an instruction or data that has just been used or cyclically used by the processor 110. If the processor 110 needs to use the instruction or data again, the instruction or data may be directly invoked from the cache, which avoids repeated access, reduces waiting time of the processor 110, and therefore improves system efficiency.

In some embodiments, the processor 110 may include one or more ports. The port may include an inter-integrated circuit (inter-integrated circuit, I2C) port, an inter-integrated circuit sound (inter-integrated circuit sound, I2S) port, a pulse code modulation (pulse code modulation, PCM) port, a universal asynchronous receiver/transmitter (universal asynchronous receiver/transmitter, UART) port, a mobile industry processor interface (mobile industry processor interface, MIPI), a general-purpose input/output (general-purpose input/output, GPIO) port, a subscriber identity module (subscriber identity module, SIM) port, a universal serial bus (universal serial bus, USB) port, and/or the like.

The I2C port is a bidirectional synchronous serial bus, including one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a camera flash, the camera 193, and the like by using different I2C bus ports. For example, the processor 110 may be coupled to the touch sensor 180K by using an I2C port, so that the processor 110 communicates with the touch sensor 180K by using the I2C bus port, thereby implementing a touch function of the electronic device 100.

The I2S port may be used for audio communication. In some embodiments, the processor 110 may include a plurality of groups of I2S buses. The processor 110 may be coupled to the audio module 170 by using the I2S bus, thereby implementing communication between the processor 110 and the audio module 170. In some embodiments, the audio module 170 may transfer an audio signal to the wireless communication module 160 by using the I2S port, thereby implementing a function of answering a call through a Bluetooth earphone.

The PCM port may also be used for audio communication, sampling, quantizing, and encoding an analog signal. In some embodiments, the audio module 170 and the wireless communication module 160 may be coupled by using the PCM bus port. In some embodiments, the audio module 170 may also transfer an audio signal to the wireless communication module 160 by using the PCM port, thereby implementing the function of answering a call through the Bluetooth earphone. Both the I2S port and the PCM port may be used for audio communication.

The UART port is a universal serial data bus used for asynchronous communication. The bus may be a bidirectional communications bus that converts to-be-transmitted data between serial communication and parallel communication. In some embodiments, the UART port is usually configured to connect the processor 110 and the wireless communication module 160. For example, the processor 110 communicates with a Bluetooth module of the wireless communication module 160 by using the UART port, thereby implementing a Bluetooth function. In some embodiments, the audio module 170 may transfer an audio signal to the wireless communication module 160 by using the UART port, thereby implementing a function of playing music through the Bluetooth earphone.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 by using the CSI interface, thereby implementing a shooting function of the electronic device 100. The processor 110 communicates with the display 194 by using the DSI interface, thereby implementing a display function of the electronic device 100.

The GPIO port may be configured by using software. The GPIO port may be configured as a control signal or configured as a data signal. In some embodiments, the GPIO port may be configured to connect the processor 110 to the camera 193, the display 194, the wireless communication module 160, the audio module 170, the sensor module 180, and the like. The GPIO port may also be configured as an I2C port, an I2S port, a UART port, an MIPI interface, or the like.

The USB port 130 is a port that conforms to USB standard specifications, and may be specifically a Mini USB port, a Micro USB port, a USB Type C port, or the like. The USB port 130 may be configured to connect to a charger to charge the electronic device 100, may be configured to transmit data between the electronic device 100 and a peripheral device, or may be configured to connect to an earphone to play audio through the earphone. The port may be further configured to connect to another electronic device, for example, an AR device.

It may be understood that a port connection relationship between the modules illustrated in this application is merely an example for description, and does not constitute a limitation on a structure of the electronic device 100. In some other embodiments, the electronic device 100 may alternatively use a port connection manner different from those in the foregoing embodiments or a combination of a plurality of port connection manners.

The charging management module 140 is configured to receive a charging input from a charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input by using a wireless charging coil of the electronic device 100. When charging the battery 142, the charging management module 140 may further supply power to the electronic device by using the power management module 141.

The power management module 141 is configured to connect the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communication module 160, and the like. The power management module 141 may be further configured to monitor parameters such as battery capacity, battery cycle quantity, and battery health status (leakage and impedance). In some other embodiments, the power management module 141 may be provided in the processor 110. In some other embodiments, the power management module 141 and the charging management module 140 may be provided in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to send and receive an electromagnetic wave signal. Each antenna in the electronic device 100 may be configured to cover one or more communications frequency bands. Different antennas may be multiplexed to improve utilization of the antennas. For example, the antenna 1 may be multiplexed into a diversity antenna used in a wireless local area network. In some other embodiments, the antenna may be used in combination with a tuning switch.

The mobile communication module 150 may provide a wireless communication solution that is applied to the electronic device 100 and that includes 2G, 3G, 4G, 5G, and the like. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and transfer the electromagnetic wave to the modem processor for demodulation. The mobile communication module 150 may also amplify a signal modulated by the modem processor, and convert the signal into an electromagnetic wave and radiate the electromagnetic wave out by using the antenna 1. In some embodiments, at least some functional modules of the mobile communication module 150 may be provided in the processor 110. In some embodiments, at least some functional modules of the mobile communication module 150 and at least some modules of the processor 110 may be provided in a same device.

The modem processor may include a modulator and a demodulator. The modulator is configured to modulate a low frequency baseband signal that is to be sent into a medium or high frequency signal. The demodulator is configured to demodulate a received electromagnetic wave signal into a low frequency baseband signal. Then, the demodulator sends the low frequency baseband signal obtained through demodulation to the baseband processor for processing. After being processed by the baseband processor, the low frequency baseband signal is transferred to the application processor. The application processor outputs a sound signal by using an audio device (not limited to the loudspeaker 170A, the receiver 170B, or the like), or displays an image or a video by using the display 194. In some embodiments, the modem processor may be a separate device. In some other embodiments, the modem processor may be separate from the processor 110 or provided in a same device with the mobile communication module 150 or another functional module.

The wireless communication module 160 may provide a wireless communication solution that is applied to the electronic device 100 and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more devices integrating at least one communication processing module. The wireless communication module 160 receives an electromagnetic wave by using the antenna 2, performs frequency modulation and filtering processing on an electromagnetic wave signal, and sends a processed signal to the processor 110. The wireless communication module 160 may also receive a to-be-sent signal from the processor 110, perform frequency modulation and amplification on the signal, and convert the signal into an electromagnetic wave and radiate the electromagnetic wave out by using the antenna 2.

In some embodiments, in the electronic device 100, the antenna 1 is coupled to the mobile communication module 150, and the antenna 2 is coupled to the wireless communication module 160, so that the electronic device 100 can communicate with a network and other devices by using a wireless communications technology. The wireless communications technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, IR technology, and/or the like. The GNSS may include the global positioning system (global positioning system, GPS), the global navigation satellite system (global navigation satellite system, GLONASS), the BeiDou navigation satellite system (beidou navigation satellite system, BDS), the quasi-zenith satellite system (quasi-zenith satellite system, QZSS), and/or satellite based augmentation systems (satellite based augmentation systems, SBAS).

The electronic device 100 implements a display function by using the GPU, the display 194, the application processor, and the like. The GPU is a microprocessor for image processing that is connected to the display 194 and the application processor. The GPU is configured to perform mathematical and geometric calculation for graphics rendering. The processor 110 may include one or more GPUs that execute program instructions to generate or change display information.

The display 194 is configured to display images, videos, and the like. The display 194 includes a display panel. The display panel may use a liquid crystal display (liquid crystal display, LCD), an organic light-emitting diode (organic light-emitting diode, OLED), an active-matrix organic light emitting diode or active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), and the like. In some embodiments, the electronic device 100 may include one or N displays 194, where N is a positive integer greater than 1.

The electronic device 100 may implement the shooting function by using the ISP, the camera 193, the video codec, the GPU, the display 194, the application processor, and the like.

The ISP is configured to process data fed back by the camera 193. For example, during photographing, a shutter is opened, light is transferred to a photosensitive element of the camera through a lens, an optical signal is converted into an electrical signal, and the photosensitive element of the camera transfers the electrical signal to the ISP for processing, so that the electrical signal is converted into an image visible to naked eyes. The ISP may also perform algorithm optimization on image noise, brightness, and skin color. The ISP may further optimize parameters such as exposure and color temperature for a shooting scenario. In some embodiments, the ISP may be provided in the camera 193.

The camera 193 is configured to capture a static image or a video. An optical image of an object is generated through a lens and is projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP to convert the electrical signal into a digital image signal. The ISP outputs the digital image signal to the DSP for processing. The DSP converts the digital image signal into an image signal in a standard format, such as RGB or YUV. In some embodiments, the electronic device 100 may include one or N cameras 193, where N is a positive integer greater than 1.

The digital signal processor is configured to process digital signals, able to process not only digital image signals but also other digital signals. For example, when the electronic device 100 selects a frequency, the digital signal processor is configured to perform Fourier transform or the like on frequency energy.

The video codec is configured to compress or decompress a digital video. The electronic device 100 may support one or more types of video codecs. In this way, the electronic device 100 may play or record videos in a plurality of encoding formats, for example, moving picture experts group (moving picture experts group, MPEG)1, MPEG2, MPEG3, and MPEG4.

The NPU is a neural network (neural-network, NN) computing processor. By learning from structures of biological neural networks, for example, from the mode of transmission between neurons in a human brain, the NPU quickly processes input information and is also capable of continuous self-learning. By using the NPU, applications such as intelligent cognition of the electronic device 100 may be implemented, for example, image recognition, face recognition, voice recognition, and text understanding.

The external memory port 120 may be configured to connect to an external memory card, for example, a Micro SD card, to extend a storage capacity of the electronic device 100. The external memory card communicates with the processor 110 through the external memory port 120, thereby implementing a data storage function. For example, files such as music and videos are stored in the external memory card.

The internal memory 121 may be configured to store computer executable program code, and the executable program code includes instructions. By running the instructions stored in the internal memory 121, the processor 110 executes various functional applications and data processing of the electronic device 100. The internal memory 121 may include a program storage area and a data storage area. The program storage area may store an operating system, an application program required by at least one function (such as a sound playing function or an image playing function), and the like. The data storage area may store data (such as audio data and a phone book) created during use of the electronic device 100, and the like. In addition, the internal memory 121 may include a high-speed random access memory, and may further include a nonvolatile memory, for example, at least one magnetic disk storage device, a flash storage device, and a universal flash storage (universal flash storage, UFS).

The electronic device 100 may implement an audio function, such as music playing and sound recording, by using the audio module 170, the loudspeaker 170A, the receiver 170B, the microphone 170C, the earphone jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be provided in the processor 110, or some functional modules of the audio module 170 are provided in the processor 110.

The loudspeaker 170A, also referred to as a "speaker", is configured to convert an audio electrical signal into a sound signal. A user may listen to music or answer a hands-free call by using the loudspeaker 170A of the electronic device 100.

The receiver 170B, also referred to as an "earpiece", is configured to convert an audio electrical signal into a sound signal. When the electronic device 100 receives a call or a voice message, the user may listen to a speech by placing the receiver 170B close to an ear.

The microphone 170C, also referred to as a "microphone" or a "microphone", is configured to convert a sound signal into an electrical signal. When making a call or sending a voice message, the user may speak after moving the microphone 170C close to the mouth, to input a sound signal to the microphone 170C. At least one microphone 170C may be provided in the electronic device 100. In some other embodiments, two microphones 170C may be provided in the electronic device 100, functioning to not only collect sound signals but also provide noise reduction. In some other embodiments, alternatively, three, four, or more microphones 170C may be provided in the electronic device 100, to collect sound signals, provide noise reduction, and identify a sound source for implementing a directional recording function.

The earphone jack 170D is configured to connect to a wired earphone. The earphone jack 170D may be the USB port 130, or a 3.5 mm standard port of the open mobile terminal platform (open mobile terminal platform, OMTP), or a standard port of the cellular telecommunications industry association of the USA (cellular telecommunications industry association of the USA, CTIA).

The pressure sensor 180A is configured to sense a pressure signal, and may convert the pressure signal into an electrical signal. In some embodiments, the pressure sensor 180A may be provided in the display 194. There are many types of pressure sensors 180A, such as a resistive pressure sensor, an inductive pressure sensor, and a capacitive pressure sensor. The capacitive pressure sensor may include at least two parallel plates that include a conductive material. When force is applied to the pressure sensor 180A, a capacitance between electrodes changes. The electronic device 100 determines a strength of pressure based on a change in the capacitance. When a touch operation is performed on the display 194, the electronic device 100 detects a strength of the touch operation by using the pressure sensor 180A. The electronic device 100 may also calculate a touch position based on a detection signal of the pressure sensor 180A. In some embodiments, touch operations that are performed on a same touch position but have different touch operation strengths may be corresponding to different operation instructions. For example, when a touch operation whose touch operation strength is less than a first pressure threshold is performed on a messaging application icon, an instruction to view a message is executed. When a touch operation whose touch operation strength is greater than or equal to the first pressure threshold is performed on the messaging application icon, an instruction to create a new message is executed.

The gyro sensor 180B may be configured to determine a motion posture of the electronic device 100. In some embodiments, angular velocities of the electronic device 100 around three axes (that is, x-axis, y-axis, and z-axis) may be determined by using the gyro sensor 180B. The gyro sensor 180B may be configured for image stabilization during shooting. For example, when the shutter is pressed, the gyro sensor 180B detects an angle at which the electronic device 100 shakes, calculates, based on the angle, a distance for which a lens module needs to compensate, and causes a lens to be in reverse motion to counteract the shake of the electronic device 100, thereby implementing image stabilization. The gyro sensor 180B may also be used in navigation and somatosensory game scenarios.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall effect sensor. The electronic device 100 may detect opening and closing of a clamshell or a smart cover by using the magnetic sensor 180D. In some embodiments, when the electronic device 100 is a clamshell device, the electronic device 100 may detect opening and closing of a clamshell by using the magnetic sensor 180D. Then, a feature such as automatic unlocking upon opening of clamshell is set based on a detected opening or closing state of the smart cover or a detected opening or closing state of the clamshell.

The acceleration sensor 180E may detect magnitudes of accelerations of the electronic device 100 in various directions (typically three axes). When the electronic device 100 is static, a magnitude and a direction of gravity may be detected. The acceleration sensor 180E may be further configured to recognize a posture of an electronic device, for use in applications such as landscape/portrait orientation switching and pedometer.

The distance sensor 180F is configured to measure a distance. The electronic device 100 may measure a distance by using infrared or a laser. In some embodiments, in a shooting scenario, the electronic device 100 may measure a distance by using the distance sensor 180F, to implement fast focusing.

The proximity light sensor 180G may include, for example, a light-emitting diode (LED) and an optical detector, for example, a photodiode. The light-emitting diode may be an infrared light-emitting diode. The electronic device 100 emits infrared light to the outside by using the light-emitting diode, and the electronic device 100 detects infrared light reflected from nearby objects by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the proximity light sensor 180G, that the user is holding the electronic device 100 close to an ear for a call, and then automatically turn off a screen to save power. The proximity light sensor 180G may also be used in a smart cover mode and a pocket mode to automatically unlock and lock the screen.

The ambient light sensor 180L is configured to sense brightness of ambient light. The electronic device 100 may adaptively adjust brightness of the display 194 based on the sensed brightness of the ambient light. The ambient light sensor 180L may also be configured to automatically adjust white balance during photographing. The ambient light sensor 180L may further cooperate with the proximity light sensor 180G to detect whether the electronic device 100 is in a pocket, to prevent accidental touches.

The fingerprint sensor 180H is configured to collect a fingerprint. The electronic device 100 may implement fingerprint unlocking, application lock access, fingerprint-based photographing, fingerprint-based call answering, and the like by using characteristics of a collected fingerprint.

The temperature sensor 180J is configured to detect a temperature. In some embodiments, the electronic device 100 executes a temperature handling policy based on a temperature detected by the temperature sensor 180J. For example, when a temperature reported by the temperature sensor 180J exceeds a threshold, the electronic device 100 degrades performance of a processor near the temperature sensor 180J, to reduce power consumption and implement thermal protection. In some other embodiments, when a temperature is lower than another threshold, the electronic device 100 heats the battery 142, to avoid abnormal power-off of the electronic device 100 due to a low temperature. In some other embodiments, when a temperature is lower than still another threshold, the electronic device 100 boosts an output voltage of the battery 142, to avoid abnormal power-off due to a low temperature.

The touch sensor 180K is also referred to as a "touch panel". The touch sensor 180K may be provided in the display 194. The touch sensor 180K and the display 194 form a touchscreen, also referred to as a "touchscreen". The touch sensor 180K is configured to detect a touch operation performed on or near the touchscreen. The touch sensor may transfer the detected touch operation to the application processor for determining a type of a touch event. The display 194 may provide a visual output related to the touch operation. In some other embodiments, the touch sensor 180K may be alternatively provided on a surface of the electronic device 100 at a location different from that of the display 194.

The bone conduction sensor 180M may obtain a vibration signal. In some embodiments, the bone conduction sensor 180M may obtain a vibration signal from a vibration bone in a vocal part of a human body. The bone conduction sensor 180M may also be in contact with a human pulse to receive a blood pressure beating signal. In some embodiments, the bone conduction sensor 180M may also be provided in an earphone, together forming a bone conduction earphone. The audio module 170 may obtain a voice signal through parsing based on a vibration signal that is obtained by the bone conduction sensor 180M from a vibration bone in a vocal part, to implement a speech function. The application processor may parse heart rate information based on a blood pressure beating signal obtained by the bone conduction sensor 180M, to implement a heart rate detection function.

The key 190 includes a power key, a volume key, and the like. The key 190 may be a mechanical key or a touch key. The electronic device 100 may receive a key-based input, and generate a key signal input related to user setting and function control that are of the electronic device 100.

The motor 191 may generate a vibration alert. The motor 191 may be configured to provide a vibration alert for an incoming call or configured to provide a touch vibration feedback. For example, touch operations performed on different applications (for example, photographing and audio playing) may be corresponding to different vibration feedback effects. For touch operations performed on different regions of the display 194, the motor 191 may also correspondingly provide different vibration feedback effects. Different application scenarios (for example, time reminder, message reception, alarm clock, and gaming) may also be corresponding to different vibration feedback effects. In addition, touch vibration feedback effects can be customized.

The indicator 192 may be an indicator, and may be configured to indicate a state of charge and change of a battery level, and also to indicate a message, a missed call, a notification, and the like.

The SIM card port 195 is configured to connect a SIM card. The SIM card may be inserted into the SIM card port 195 or removed from the SIM card port 195 to implement contact with or separation from the electronic device 100. The electronic device 100 may support one or N SIM card ports, where N is a positive integer greater than 1. The SIM card port 195 may support a nano-SIM card, a micro-SIM card, a SIM card, and the like. A plurality of SIM cards may be inserted into a same SIM card port 195 at the same time. The plurality of SIM cards may be of a same type or of different types. The SIM card port 195 may also be compatible with different types of SIM cards. The SIM card port 195 may further be compatible with an external memory card. The electronic device 100 interacts with a network by using a SIM card, to implement functions such as calling and data communication. In some embodiments, the electronic device 100 uses an eSIM card, that is, an embedded SIM card. The eSIM card may be embedded into the electronic device 100, and cannot be separated from the electronic device 100.

A software system of the electronic device 100 may use a layered architecture, an event-driven architecture, a microkernel architecture, a microservice architecture, or a cloud architecture. In this application, a software structure of the electronic device 100 is described by using an Android system with a layered architecture as an example. The operating system for the electronic device is not limited in this application, which may be, for example, an Android system or a Harmony operating system (Harmony Operating System, Harmony OS).

Figure 2A:
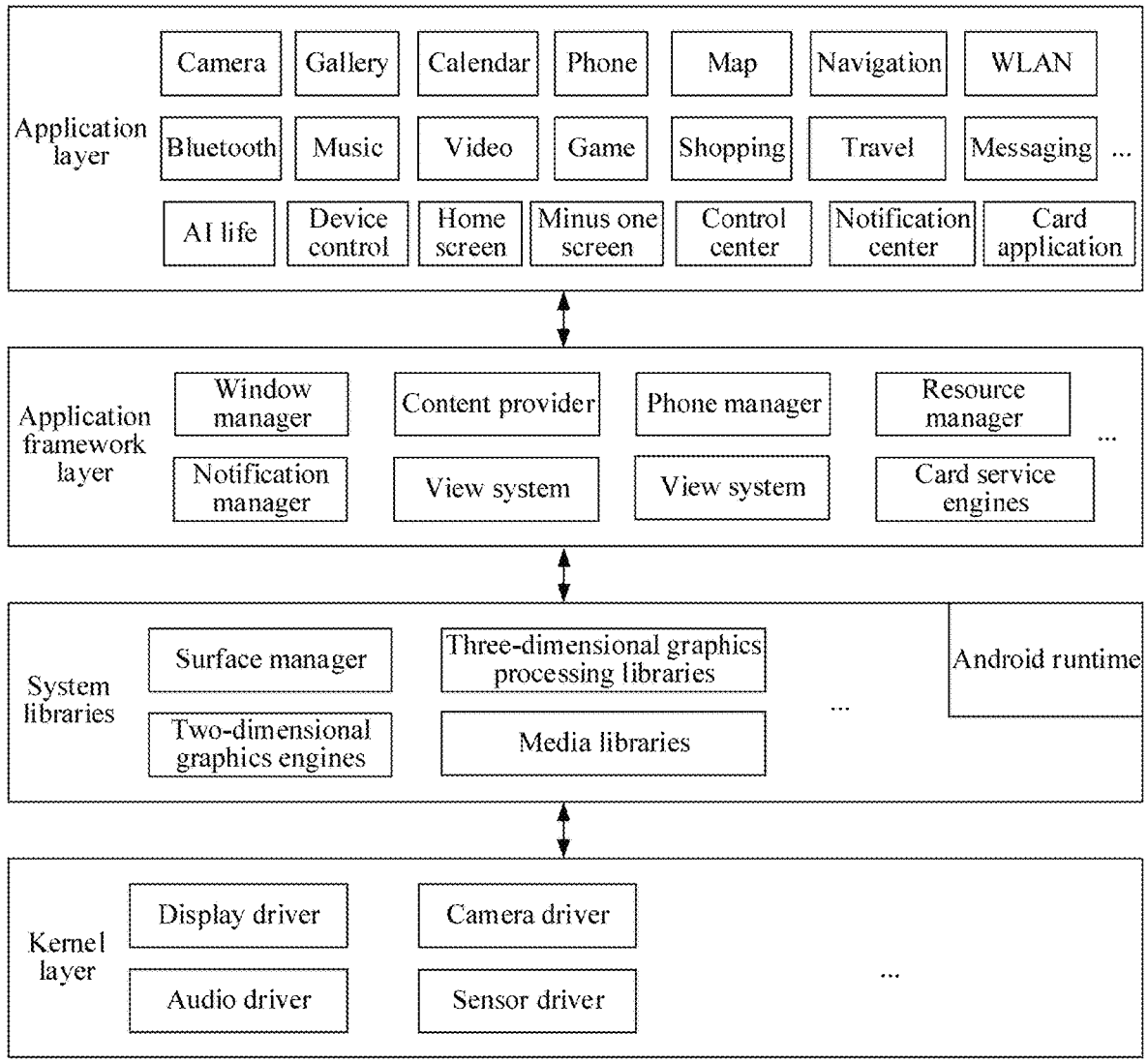
FIG. 2a is a block diagram of a software structure of an electronic device according to an embodiment of this application.

FIG. 2a is a block diagram of a software structure of an electronic device according to an embodiment of this application. As shown in FIG. 2a, in a layered architecture, software is divided into several layers, and each layer has clear roles and responsibilities. The layers communicate with each other through software ports. In some embodiments, an Android system is divided into four layers. From top to bottom, they are: an application program layer, an application program framework layer, Android runtime (Android runtime) and system libraries, and a kernel layer.

The application program layer may include a series of application program packages.

As shown in FIG. 2a, the application program package may include application programs such as camera, gallery, calendar, phone, map, navigation, WLAN, Bluetooth, music, video, game, shopping, travel, instant messaging (such as short messaging), AI life, and device control.

The AI life application may be used to control or manage home devices that have a networking capability. For example, the home devices may include lights, televisions, and air conditioners. For another example, the home devices may also include anti-theft door locks, speakers, sweeping robots, sockets, body fat scales, desk lamps, air purifiers, refrigerators, washing machines, water heaters, microwave ovens, rice cookers, curtains, electric fans, televisions, set-top boxes, doors and windows, and the like.

In addition, the application program package may further include: application programs such as a home screen (that is, a desktop), a minus one screen, a control center, a notification center, a card application, and a card service application.

The minus one screen, which may also be referred to as a "−1 screen", is a leftmost screen-split user interface (user interface, UI) appearing when a user swipes right on a home screen of an electronic device. For example, some quick service functions and notification messages may be placed on the minus one screen, such as global search, quick access to a specific page of an application program (payment code, WeChat, or the like), instant messaging and reminders (package shipping information, expenditure information, commuting traffic, taxi ride information, schedule information, and the like), and follow-up trends (football stands, basketball stands, stock information, and the like). The control center is a drop-down message notification bar of an electronic device, which is a user interface displayed by the electronic device when a user performs a downward operation on the electronic device. The notification center is a pull-up message notification bar of an electronic device, which is a user interface displayed by the electronic device when a user performs an upward operation on the electronic device. For the card application, refer to the following content, and details are not described herein. The card service application is configured to provide a card service to support UI display of cards, card sharing between application programs on a same device, card sharing across devices, and the like.

The application program framework layer provides application programming interfaces (application programming interface, API) and a programming framework for application programs at the application program layer. The application program framework layer includes some predefined functions.

As shown in FIG. 2a, the application program framework layer may include a window manager, a content provider, a view system, a phone manager, a resource manager, a notification manager, card service (service) engines, and the like.

The window manager is configured to manage window programs. The window manager may, for example, obtain a size of a display, determine whether there is a status bar, lock the screen, and capture a screenshot.

The content provider is configured to store and obtain data and to make the data accessible to an application program. The data may include videos, images, audio, calls made and answered, a browsing history and bookmarks, a phone book, and the like.

The view system includes visual controls, for example controls with text displayed and controls with a picture displayed. The view system may be used for building application programs. A display interface may include one or more views. For example, a display interface including a message notification icon may include a view displaying text and a view displaying a picture.

The phone manager is configured to provide a communication function of the electronic device 100, for example, management of call status (including connection setup and teardown).

The resource manager provides various resources for application programs, such as localized character strings, icons, pictures, layout files, and video files.

The notification manager allows an application program to display notification information in a status bar. The notification manager may be configured to convey a notification-type message that automatically disappears after a short period of time, without user interaction. For example, the notification manager is configured to notify that download is completed and alert about a message. Alternatively, the notification manager may be a notification that appears in a status bar at the top of a system in a form of a chart or scroll bar text, for example, a notification of an application program running in the background, or may be a notification that appears on a screen in a form of a dialog window. For example, text information is provided in a status bar, an alert sound is played, an electronic device vibrates, or an indicator blinks.

The card service engine is configured to support the card service application in implementing card rendering and displaying, and is also configured to invoke and process events, APIs, and the like.

Figure 2B:
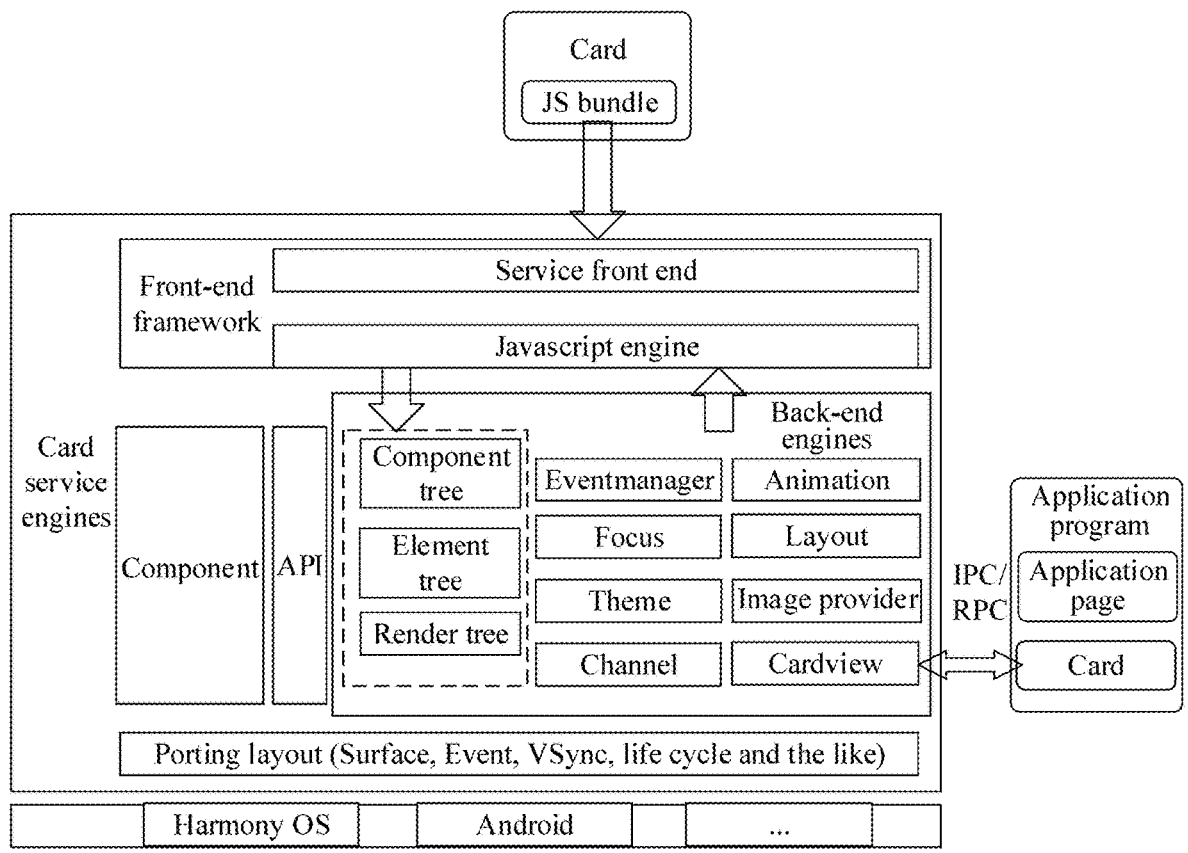
FIG. 2b is a block diagram of a software structure of card service engines according to an embodiment of this application.

FIG. 2b is a block diagram of a software structure of card service engines according to an embodiment of this application. As shown in FIG. 2b, the card service engines may include: a front-end framework, back-end engines, and a porting layout (porting layout).

The front-end framework includes a service front end and a Javascript engine.

The back-end engines include: component, API, component tree, element tree, render tree, eventmanager, focus, theme, channel, animation, layout, image provider, and cardview.

The porting layout is configured to interconnect with systems such as Surface, Event, VSync, and life cycle, to adapt to system libraries of different types of operating systems.

The Android runtime includes core libraries and a virtual machine. The Android runtime is responsible for scheduling and managing an Android system.

The core libraries include two parts: One is functions to be called by a Java language, and the other is core libraries of the Android system.

The application program layer and the application program framework layer run on the virtual machine. The virtual machine executes Java files at the application program layer and the application program framework layer as binary files. The virtual machine is configured to perform functions such as object lifecycle management, stack management, thread management, security and exception management, and garbage collection.

The system libraries may include a plurality of functional modules, for example, a surface manager (surface manager), media libraries (Media Libraries), three-dimensional graphics processing libraries (for example, OpenGL ES), and 2D graphics engines (for example, SGL).

The surface manager is configured to manage a display subsystem, and combine 2D and 3D graphic layers for a plurality of application programs.

The media library supports playback and recording of audio and videos in a plurality of commonly used formats, as well as static image files. The media library may support a plurality of audio and video encoding formats, such as MPEG4, H.264, MP3, AAC, AMR, JPG, and PNG.

The three-dimensional graphics processing library is configured to implement three-dimensional graphics drawing, image rendering and compositing, graphic layer processing, and the like.

The 2D graphics engine is a drawing engine for 2D drawing.

The kernel layer is a layer between hardware and software. The kernel layer includes at least a display driver, a camera driver, an audio driver, and a sensor driver.

With reference to a scenario in which a smart speaker is used to play sound, the following illustrates a working process of software and hardware of the electronic device 100.

When the touch sensor 180K receives a touch operation, a corresponding hardware interrupt is sent to the kernel layer. The kernel layer processes the touch operation into a raw input event (including information such as touch coordinates and a timestamp of the touch operation). The raw input event is stored at the kernel layer. The application program framework layer obtains the raw input event from the kernel layer, and identifies a control corresponding to the input event. An example is used in which the touch operation is a tap operation, and a control corresponding to the tap operation is a control of a smart speaker icon. A smart speaker application invokes a port at the application framework layer to start the smart speaker application and then invoke the kernel layer to start the audio driver, and the loudspeaker 170A converts an electrical signal of audio into a sound signal.

It may be understood that the structure illustrated in this application does not constitute a specific limitation on the electronic device 100. In some other embodiments, the electronic device 100 may include more or fewer components than shown in the figure, or combine some components, or split some components, or have different component arrangements. The components shown in the figure may be implemented by hardware, software, or a combination of software and hardware.

Based on the foregoing description, an electronic device may share a card or a card module of a card to another application program on the electronic device, thereby implementing card sharing between different application programs on a same device; or an electronic device may share a card or a card module of a card to another electronic device, thereby implementing card sharing across devices.

With reference to scenario 1 and scenario 2, an implementation process of sharing any card is described in detail in the following.

Scenario 1

In scenario 1 of this application, a first card displayed by a first application on a first device is shared to a second application on the first device. FIG. 3a to FIG. 3l are schematic diagrams of human-machine interaction interfaces according to an embodiment of this application. An example is used in which the first device is a mobile phone, the first application is an AI life application on the mobile phone, the first card is corresponding to a music playing service pushed by the AI life application, and the second application is a minus one screen of the mobile phone.

The first card includes: a card module 1, a card module 2, a card module 3, a card module 4, a card module 5, and a card module 6. The card module 1 is non-recombinable. The card module 2, the card module 3, the card module 4, the card module 5, and the card module 6 are all recombinable.

The card module 1 is used to indicate that a service corresponding to the card is a music playing service pushed by a smart speaker application, for example, using a smart speaker icon and text "HUAWEI Sound X" for indication.

The card module 2 is used to indicate a Bluetooth connection function of the smart speaker, for example, using text "Online" and an operation button with a Bluetooth icon for indication.

The card module 3 is used to indicate a name of a song being played by the smart speaker, and functions of song switching and volume tuning, for example, using a song name "Peninsula Iron Box", an operation button with a Previous icon, an operation button with a Play/Pause icon, an operation button with a Next icon, text "Volume", a volume icon, a slide operation button for volume tuning, and text "68%" for indication.

The card module 4 is used to indicate a music sound function of the smart speaker, for example, using text "Music sound" and an operation button with an earphone icon for indication.

The card module 5 is used to indicate a voice skill function of the smart speaker, for example, using text "Voice skill" and an operation button with a learning icon for indication.

The card module 6 is used to indicate a stereo function of the smart speaker, for example, using text "Stereo" and an operation button with a stereo icon for indication.

Refer to FIG. 3a to FIG. 3l. The card sharing method in this application may include step 11 to step 15.

Step 11: If a user wants to start the first card in the AI life application, the user may tap an icon of the AI life application on a display of the first device, as shown in FIG. 3b. An interface shown in FIG. 3c is displayed on the display of the mobile phone. The user taps an icon of the first card on the interface, where "HUAWEI Sound X" and a smart speaker icon are provided together in a rounded rectangular box to indicate the icon of the first card. The display of the mobile phone displays a UI of the first card, as shown in FIG. 3d, to provide the user with service content of the first card.

Step 12: If the user wants to view the first card, the user may perform a touch-and-hold operation in empty space of the first card shown in FIG. 3d. Then, an interface shown in FIG. 3e is displayed on the display of the mobile phone. An option is displayed on the bottom right of the card module 2, the card module 3, the card module 4, the card module 5, and the card module 6 each on the interface. The option is used to indicate whether a corresponding card module is selected for sharing, for example, an operation button with a square box icon. The touch-and-hold operation mentioned in this specification may be understood as an operation performed by a user for a time that has reached a preset time length.

Step 13: The user may select the "Online" and "Voice skill" service functions on the interface shown in FIG. 3e. The user may separately tap a square box icon displayed in the card module 2 and a square box icon displayed in the card module 5. Then, a tick icon appears in each of the square box icon corresponding to the card module 2 and the square box icon corresponding to the card module 5, as shown in FIG. 3f. The tick icon is used to indicate that a card module has been selected and is to be shared. The user may continue to tap the operation button with text "Share". Then, the display of the mobile phone jumps to a page shown in FIG. 3g.

Step 14: As shown in FIG. 3g, a preview region, cross-device sharing options, and in-device sharing options are displayed on the page.

The card module 1, the card module 2, and the card module 5 are displayed in the preview region. The card module 1 is indicated by a smart speaker icon and text "HUAWEI Sound X". The card module 2 is indicated by an operation button with a Bluetooth icon. The card module 5 is indicated by an operation button with a learning icon.

The cross-device sharing options include: a vehicle icon, a television icon, a mobile phone icon, a tablet computer icon, a watch icon, and a notebook icon. The vehicle icon is corresponding to a unique in-vehicle device. The television icon is corresponding to a television. The mobile phone icon is corresponding to a mobile phone. The tablet computer icon is corresponding to a tablet computer. The watch icon is corresponding to a watch. The notebook icon is corresponding to a notebook.

The in-device sharing options include: an operation button with text "Add to home screen", an operation button with text "Add to minus one screen", an operation button with text "Add to control center", and an operation button with text "Add to notification center".

Parameters such as shape and size, location layout, represented content, quantity of devices, and type of device are not limited in this application for the preview region, the cross-device sharing options, or the in-device sharing options on the page. It should be noted that the page is not limited to the representation manner shown in FIG. 3g.

Step 15: If the user wants to share the first card to the minus one screen, the user performs a tap operation on the operation button with text "Add to minus one screen" in the in-device sharing options. Then, a card that includes the card module 1, the card module 2, and the card module 5, as shown in FIG. 3h, is displayed on the minus one screen of the mobile phone.

Figure 3A:
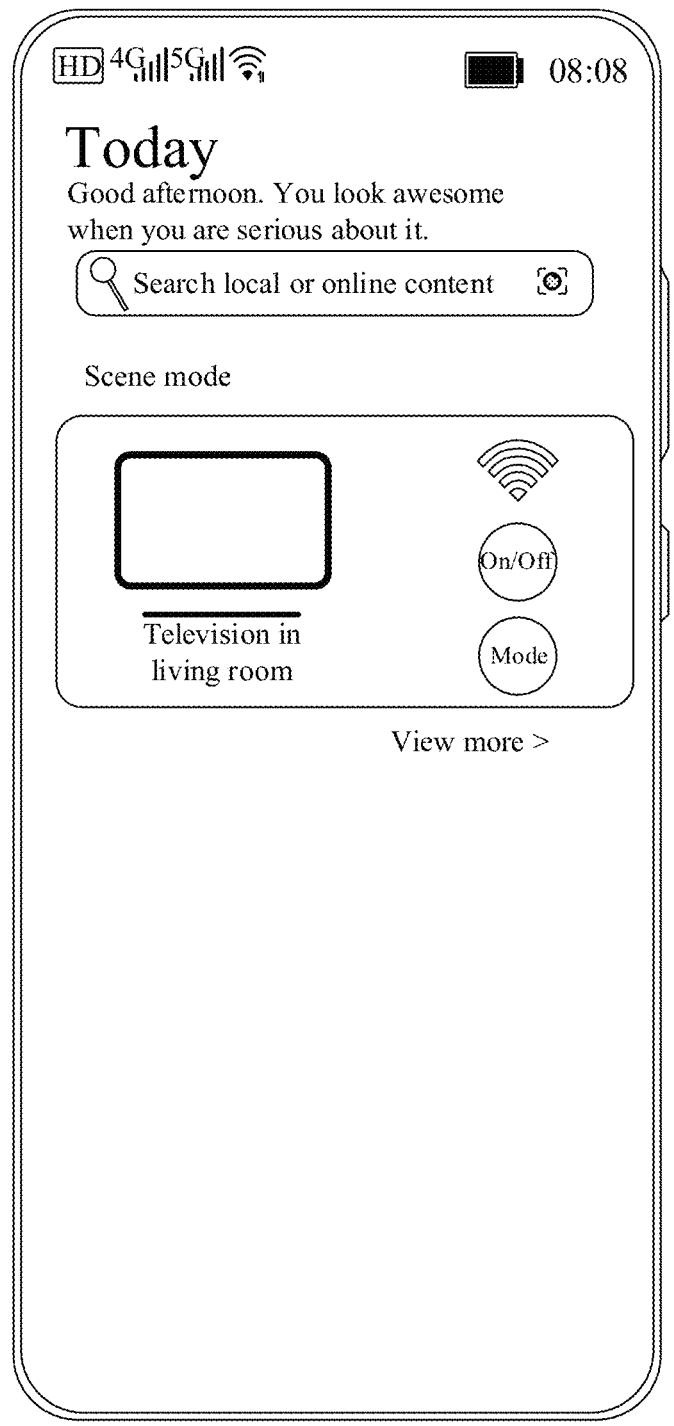
Figure 3B:
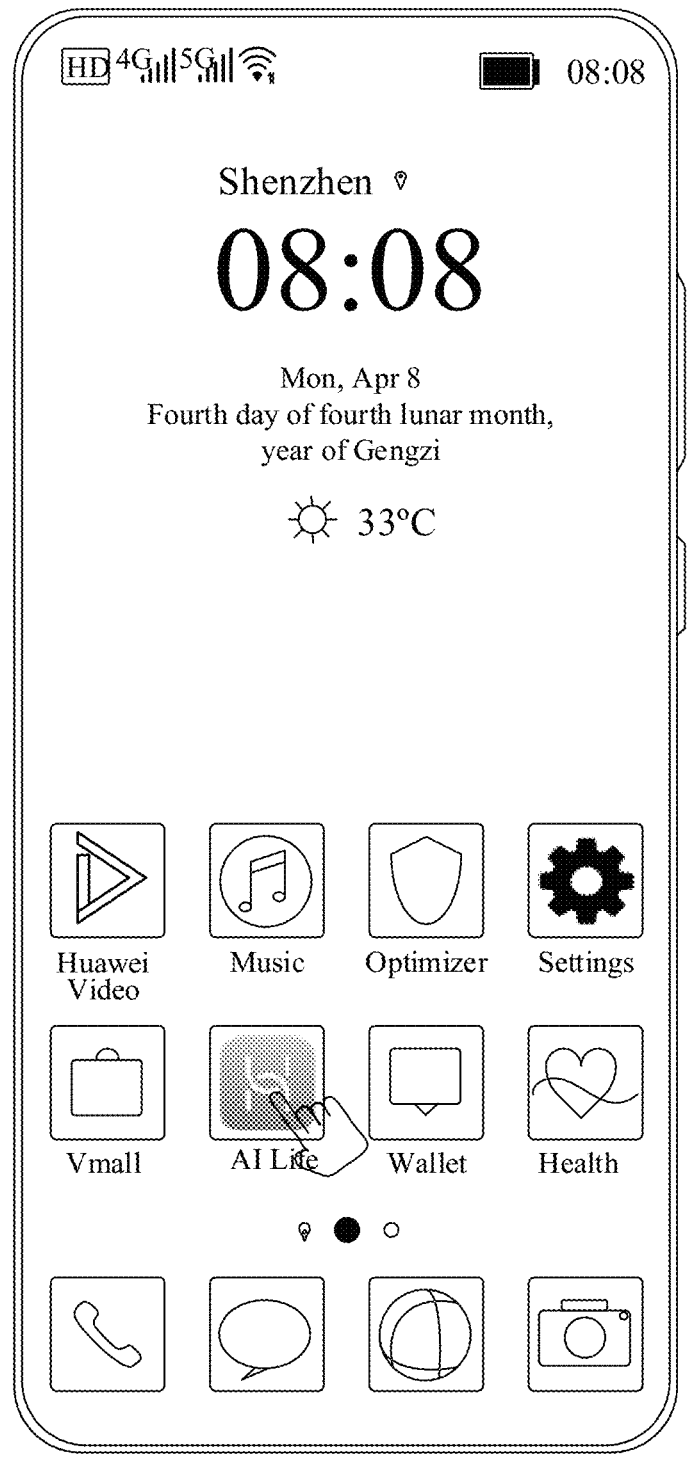
Figure 3C:
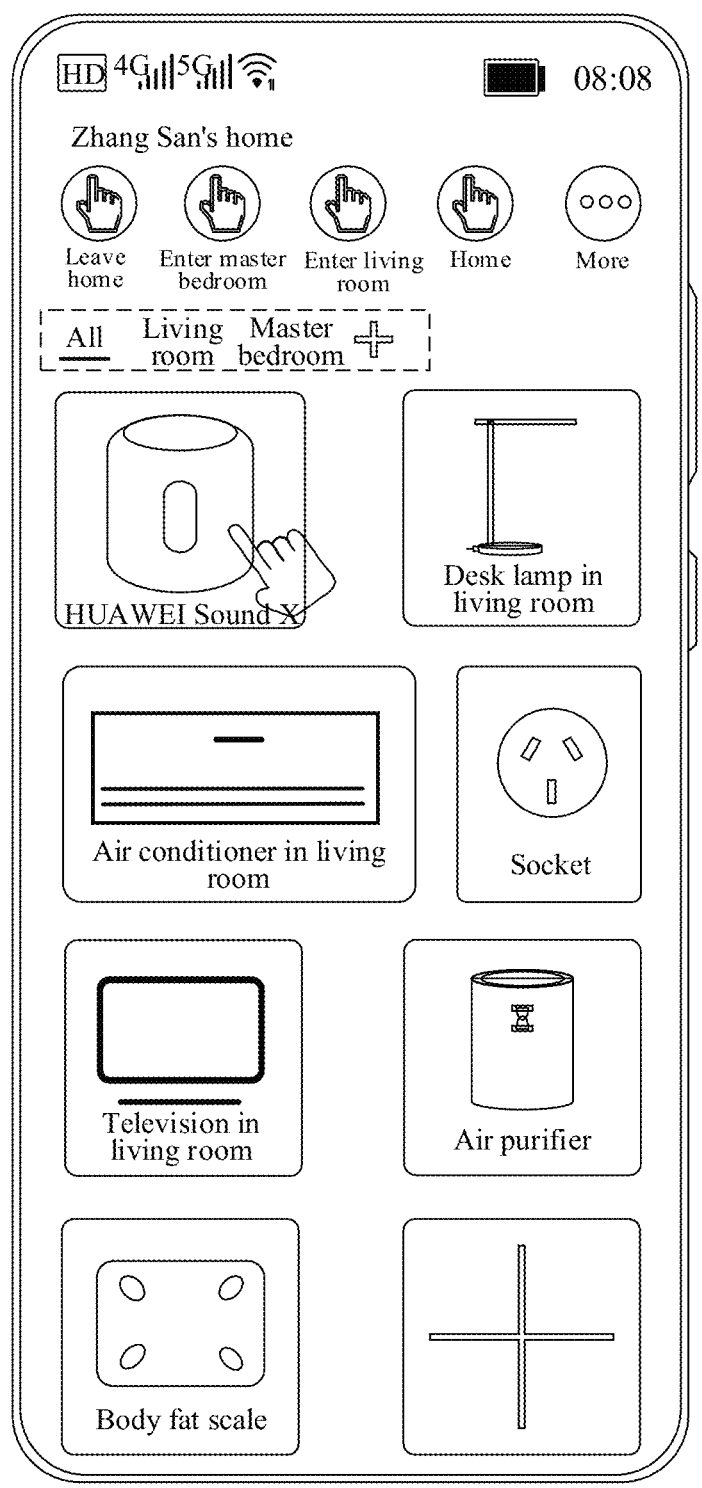
Figure 3D:
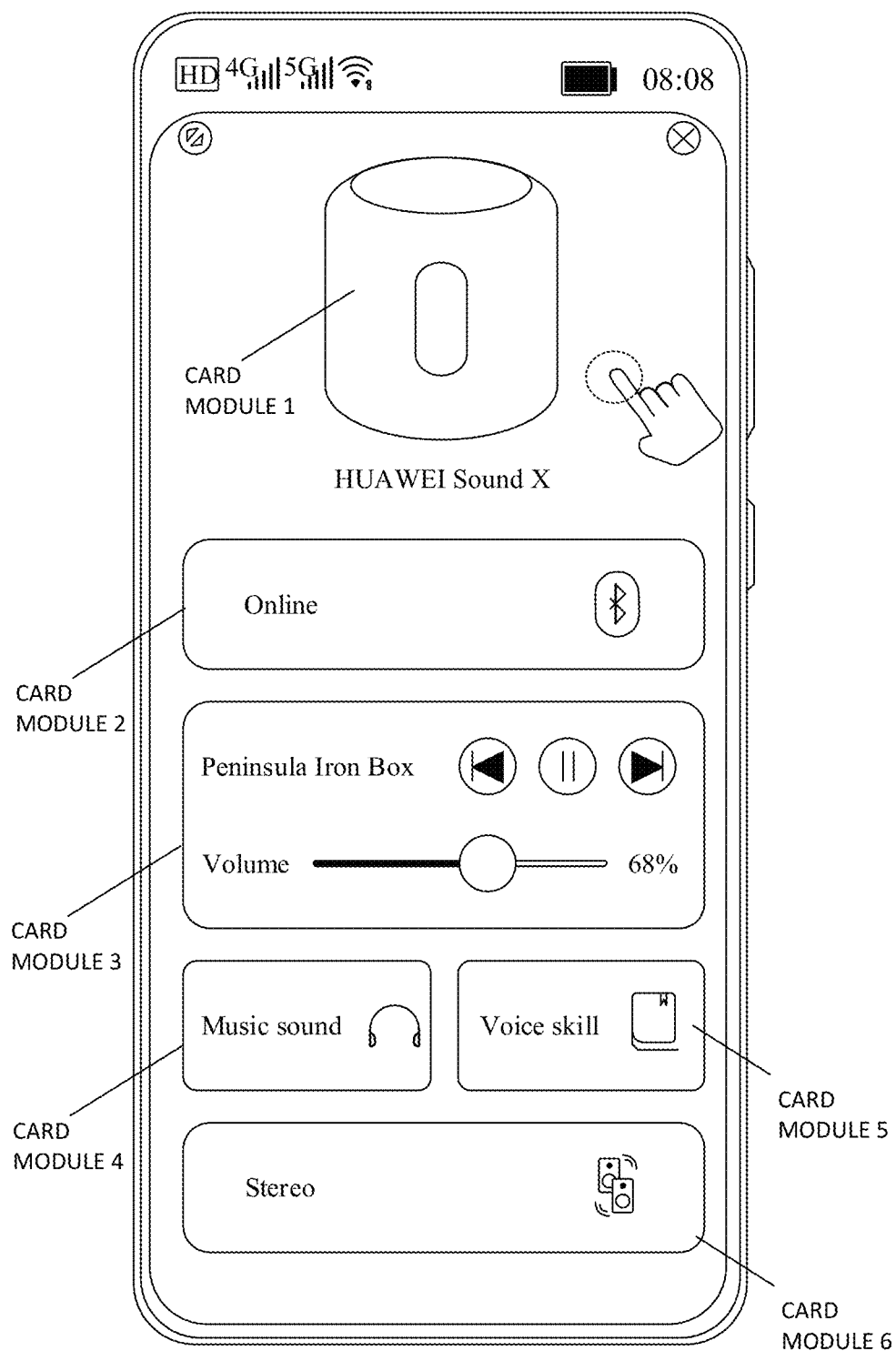
Figure 3E:
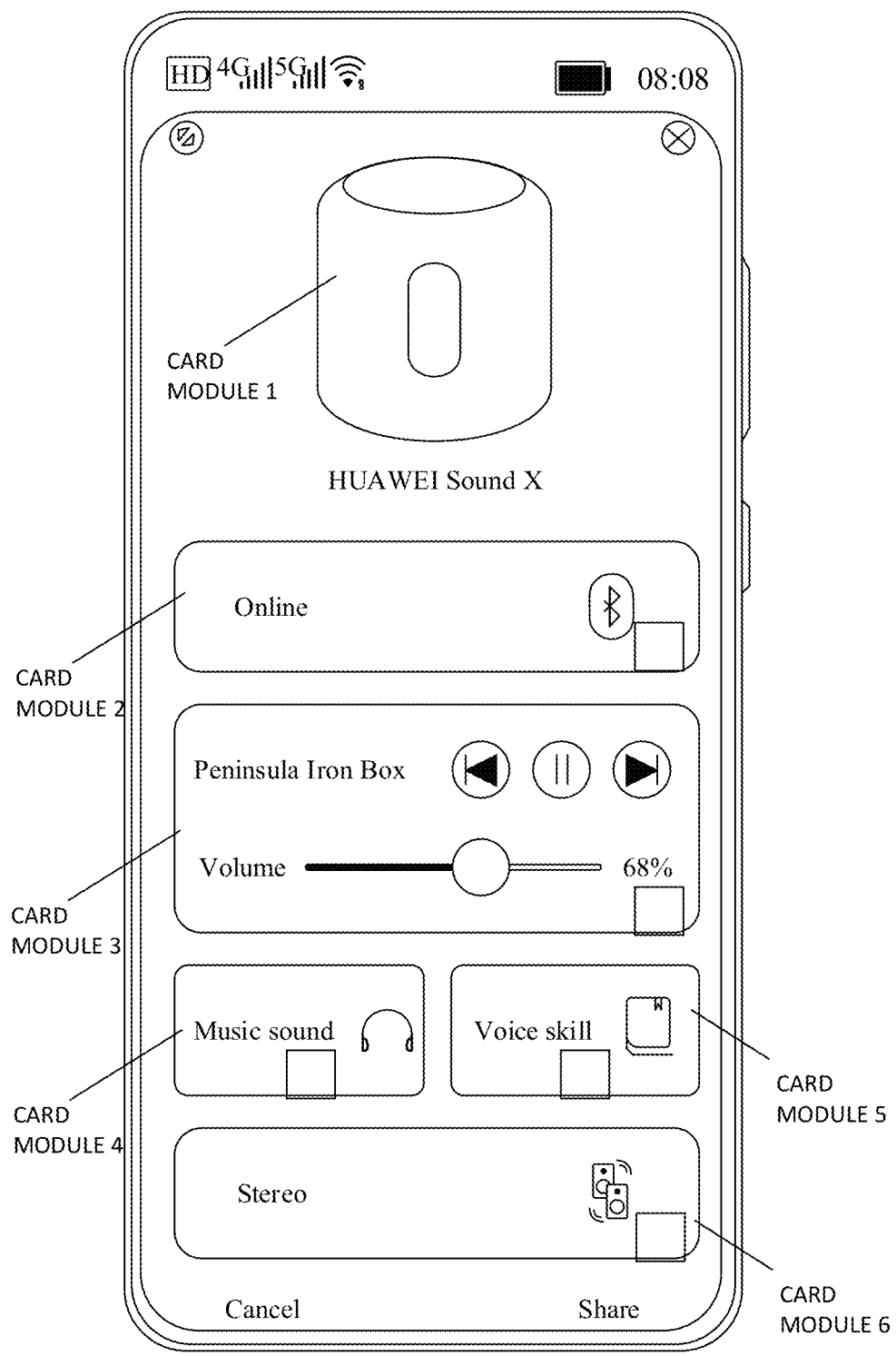
Figure 3F:
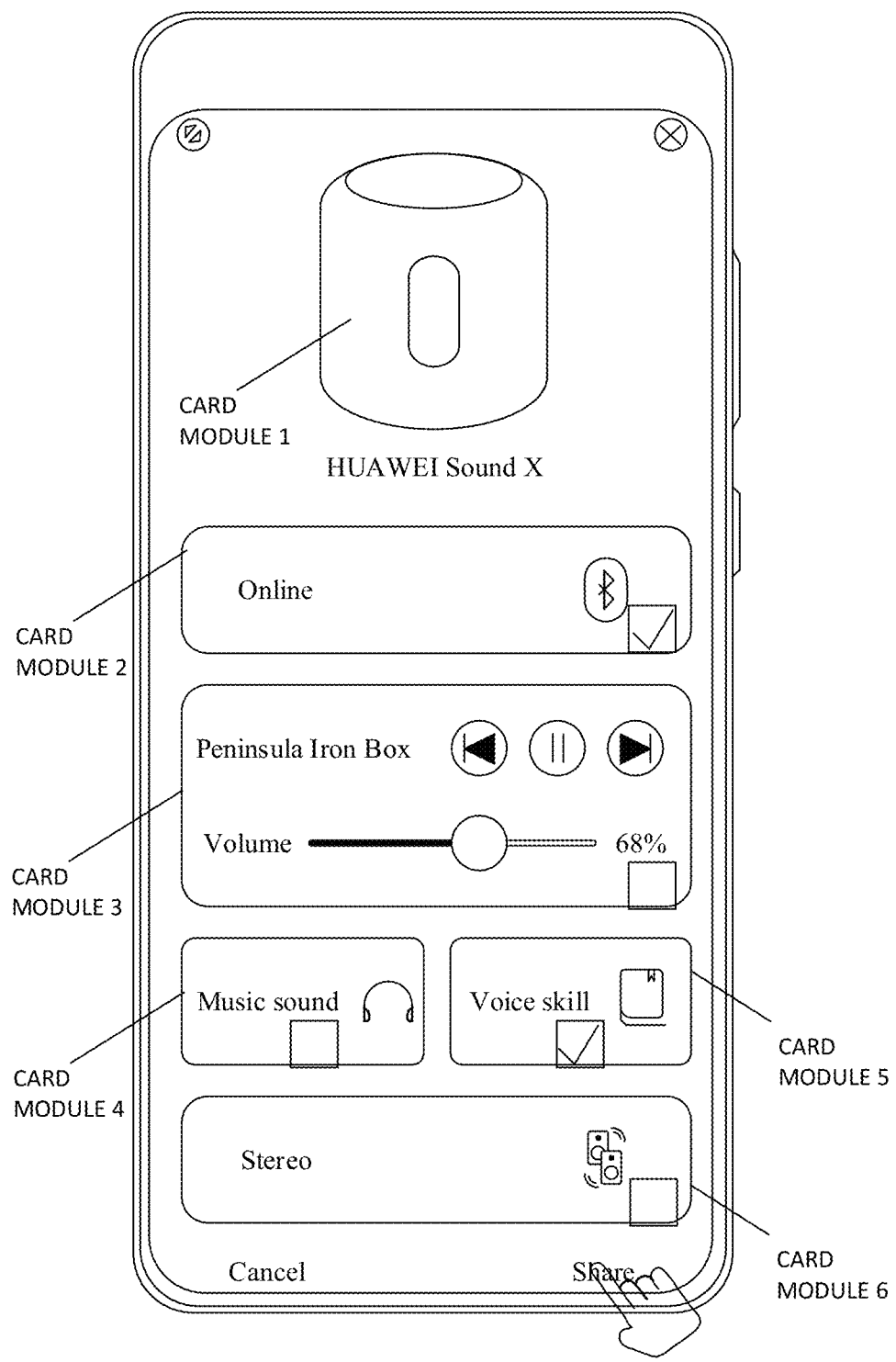
Figure 3G:
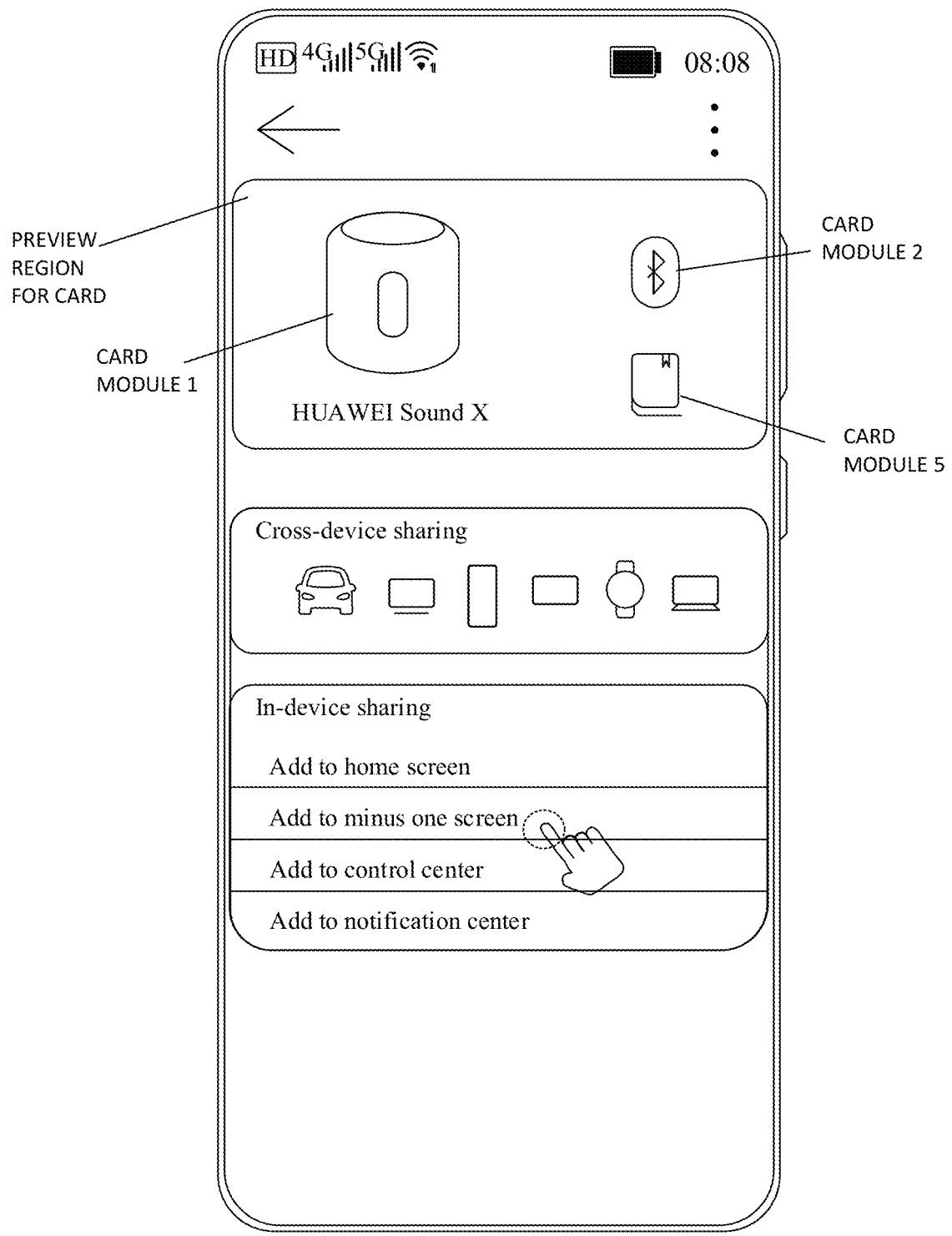
Figure 3H:
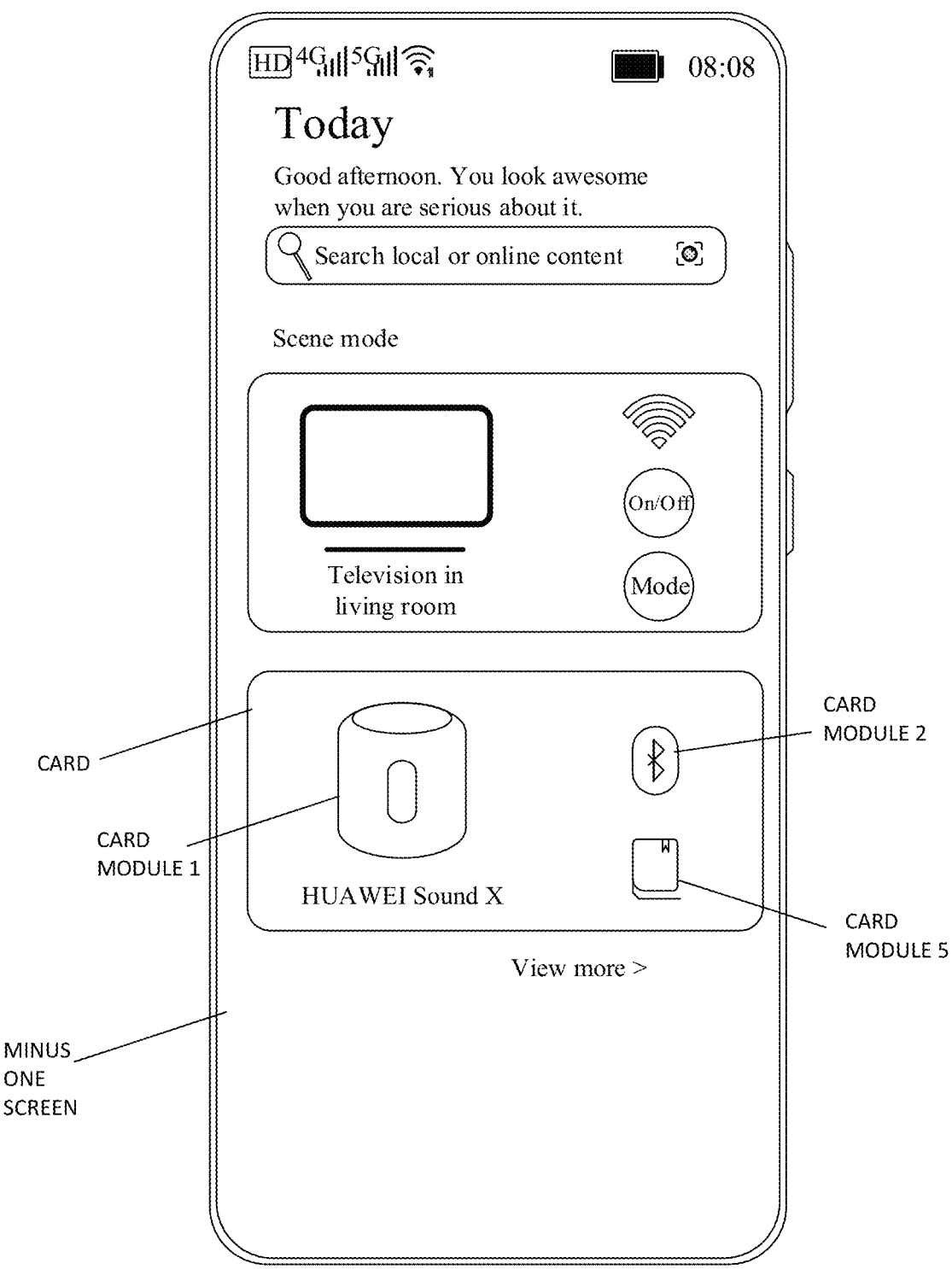
Figure 3I:
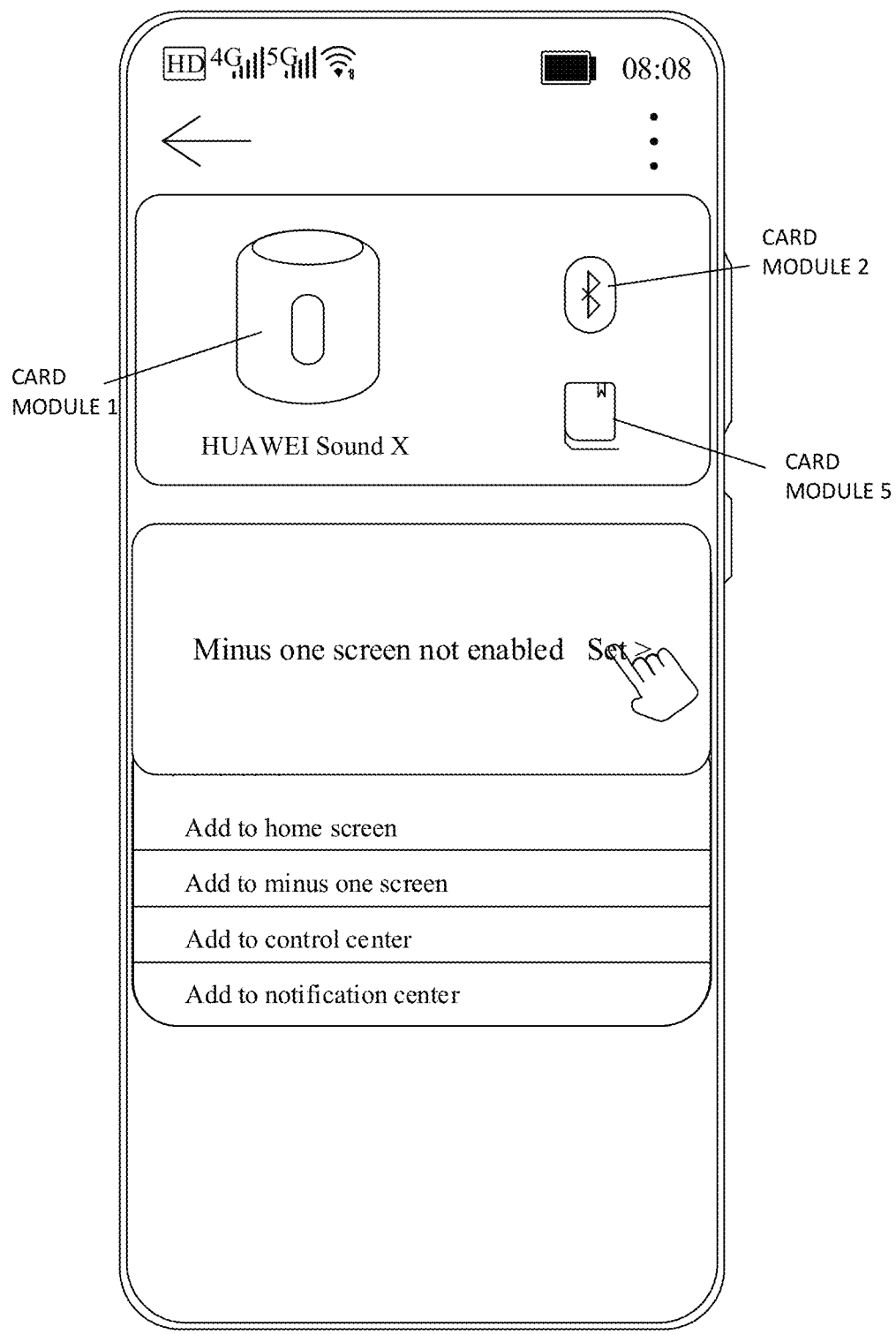
Figure 3J:
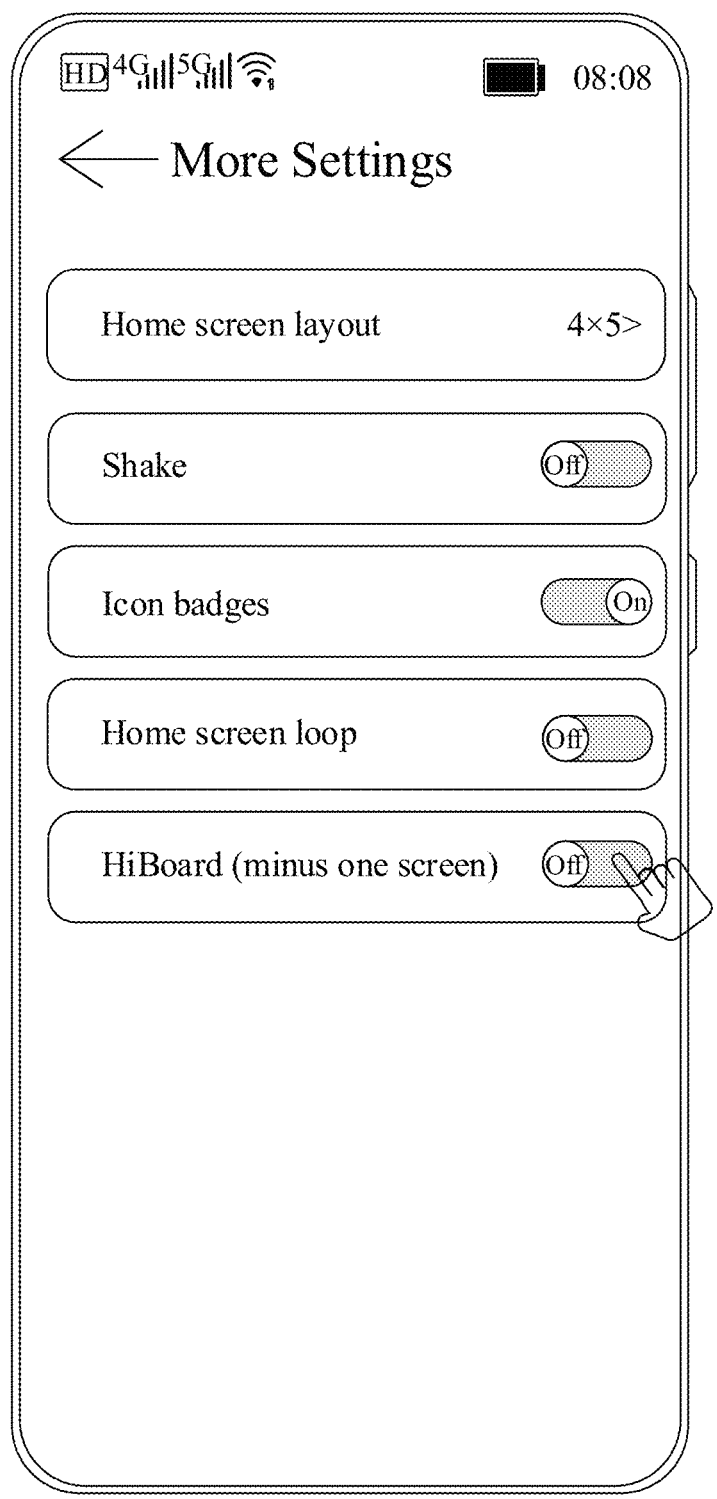

In this way, an interface shown in FIG. 3a is changed to an interface shown in FIG. 3h on the minus one screen. The card that includes the card module 1, the card module 2, and the card module 5 is added to the interface shown in FIG. 3h. Content displayed on a UI of the card has the same layout as content displayed in the preview region. Alternatively, content displayed on a UI of the card and content displayed in the preview region may have different layouts.

When the user swipes right on the display shown in FIG. 3b, the interface shown in FIG. 3a is displayed on the display of the mobile phone, which is an interface of the minus one screen of the mobile phone before card sharing. It should be noted that a card of a television in a living room that is displayed on the minus one screen may be shared from the AI life application to the minus one screen according to steps similar to step 11 to step 15, for which details are not further described herein.

In some embodiments, the minus one screen of the mobile phone may not have been enabled. In this case, when the user taps the operation button with text "Add to minus one screen" on the interface shown in FIG. 3g, an interface shown in FIG. 3i may be displayed on the display of the mobile phone. A rounded rectangular box may pop up on the interface. Text "Minus one screen not enabled" and a "Set" operation button are displayed in the rounded rectangular box, so that the user learns in a timely manner that the first card cannot be shared to the minus one screen because the minus one screen is not enabled.

Figure 3K:
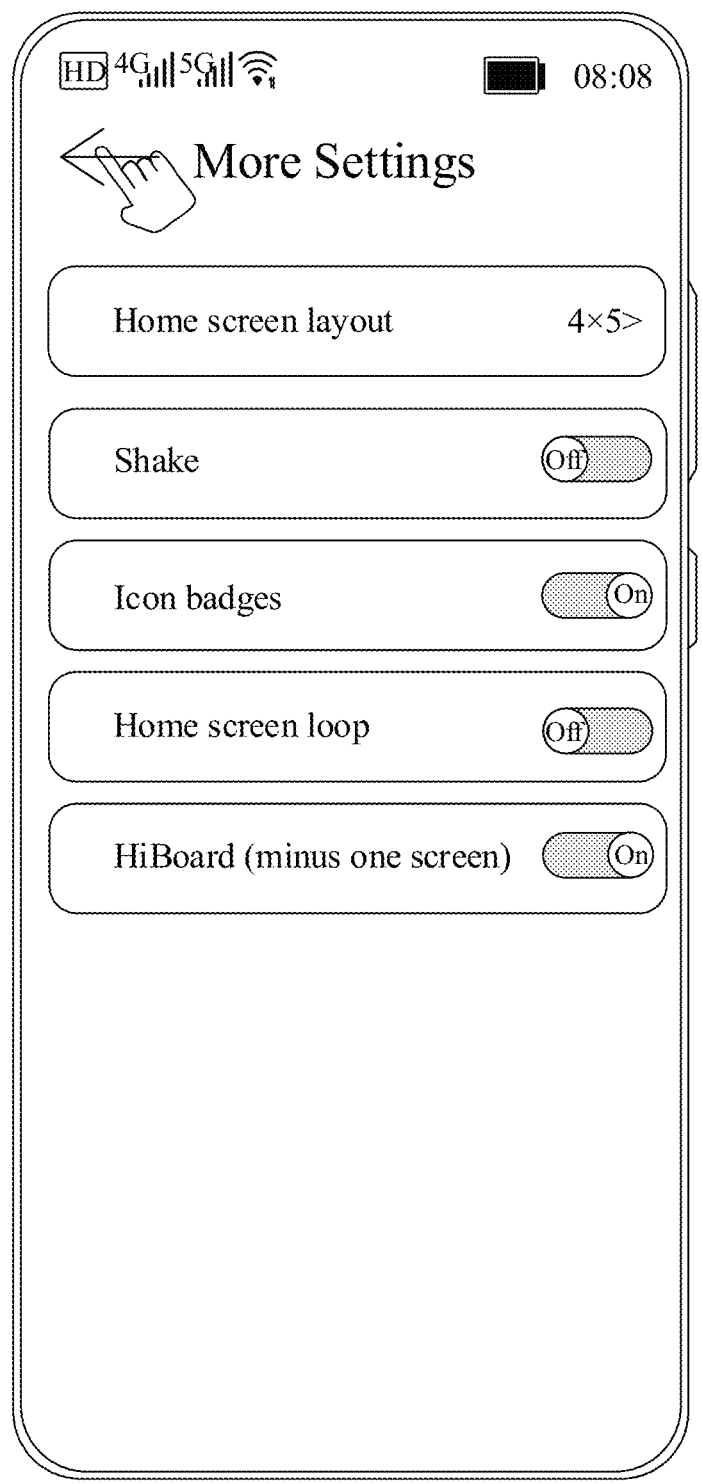
Figure 31:
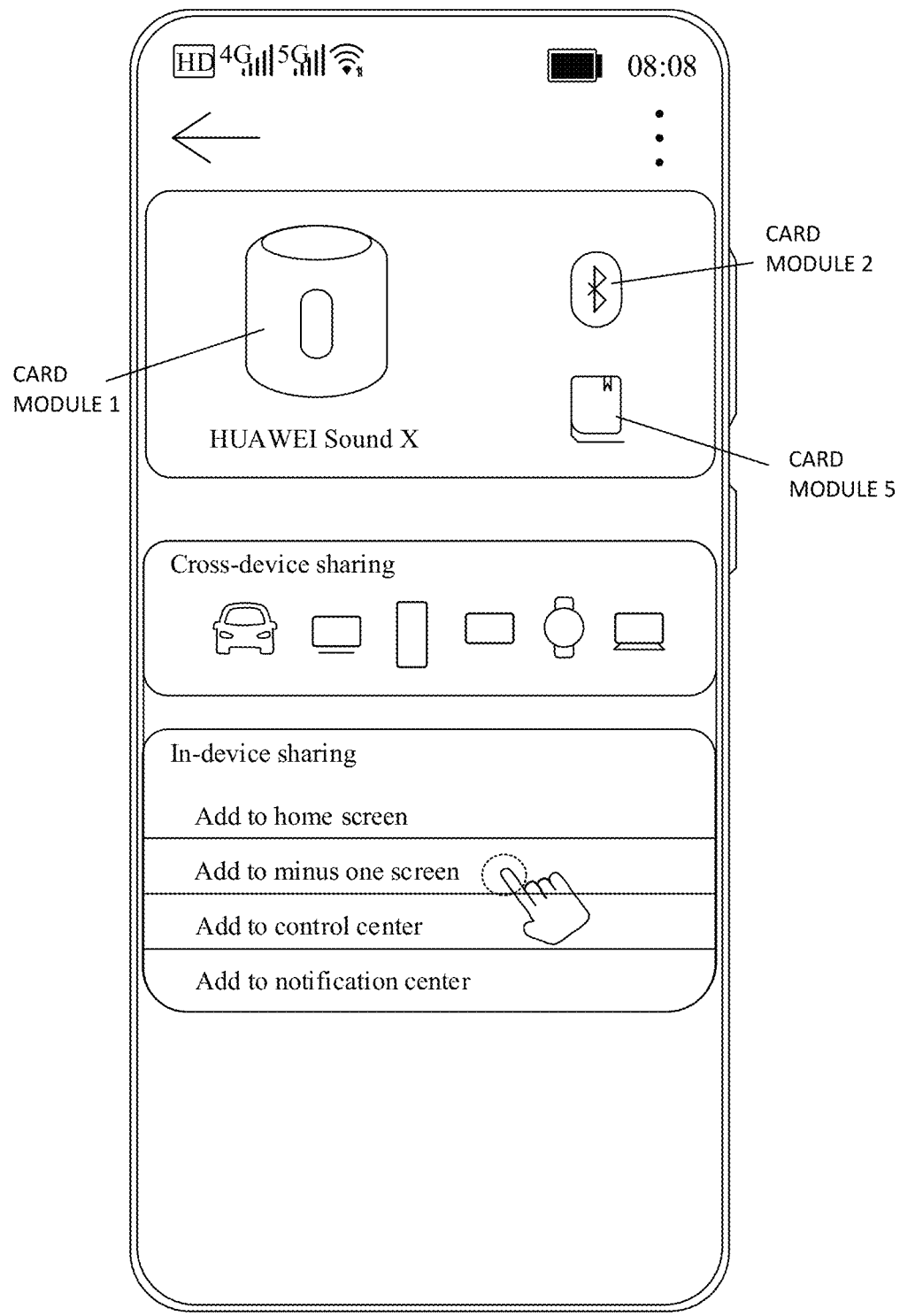

The user may tap the "Set" operation button. A "More Settings" interface is displayed on the display of the mobile phone. A setting operation button for "Home screen layout", a switch operation button for "Shake", a switch operation button for "Icon badges", a switch operation button for "Home screen loop", and a switch operation button for "HiBoard (minus one screen)" are displayed on the interface. The user may tap the switch operation button for "HiBoard (minus one screen)" to enable the HiBoard (minus one screen), as shown in FIG. 3k. The user taps a return button on an interface shown in FIG. 3k, where the return button is represented by, for example, a left arrow located in an upper left corner. The display of the mobile phone returns to an interface shown in FIG. 3l, which is also the interface shown in FIG. 3g.

The user taps the operation button with text "Add to minus one screen" on the interface shown in FIG. 3l. An interface shown in FIG. 3h may be displayed on the display of the mobile phone, so that the card that includes the card module 1, the card module 2, and the card module 5 can be shared to the minus one screen of the mobile phone.

In summary, a card or a card module of a card can be shared between different application programs on a same device, which helps provide the card for a user through different display channels of the same device, helps the user with quick card search, and avoids a problem of cumbersome and complicated user operations caused by a deeper control entry to service content. In this way, the user can conveniently and quickly find service content corresponding to the card, which simplifies the user's complicated operations, satisfies the user's requirements for frequently used operations, and improves the user's operation experience.

Scenario 2

Figure 4A:
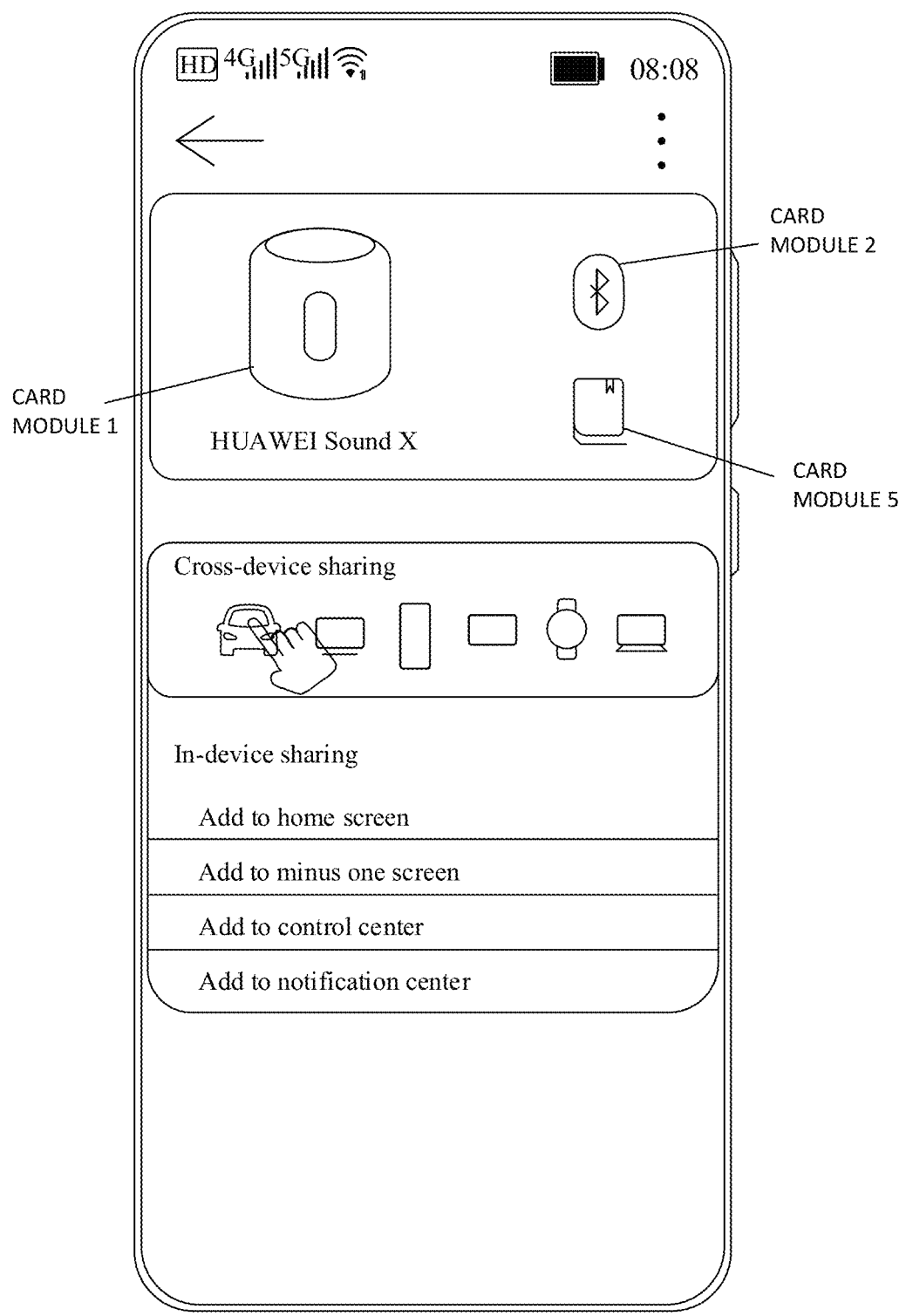
FIG. 4a and FIG. 4b are schematic diagrams of human-machine interaction interfaces according to an embodiment of this application.
Figure 4B:
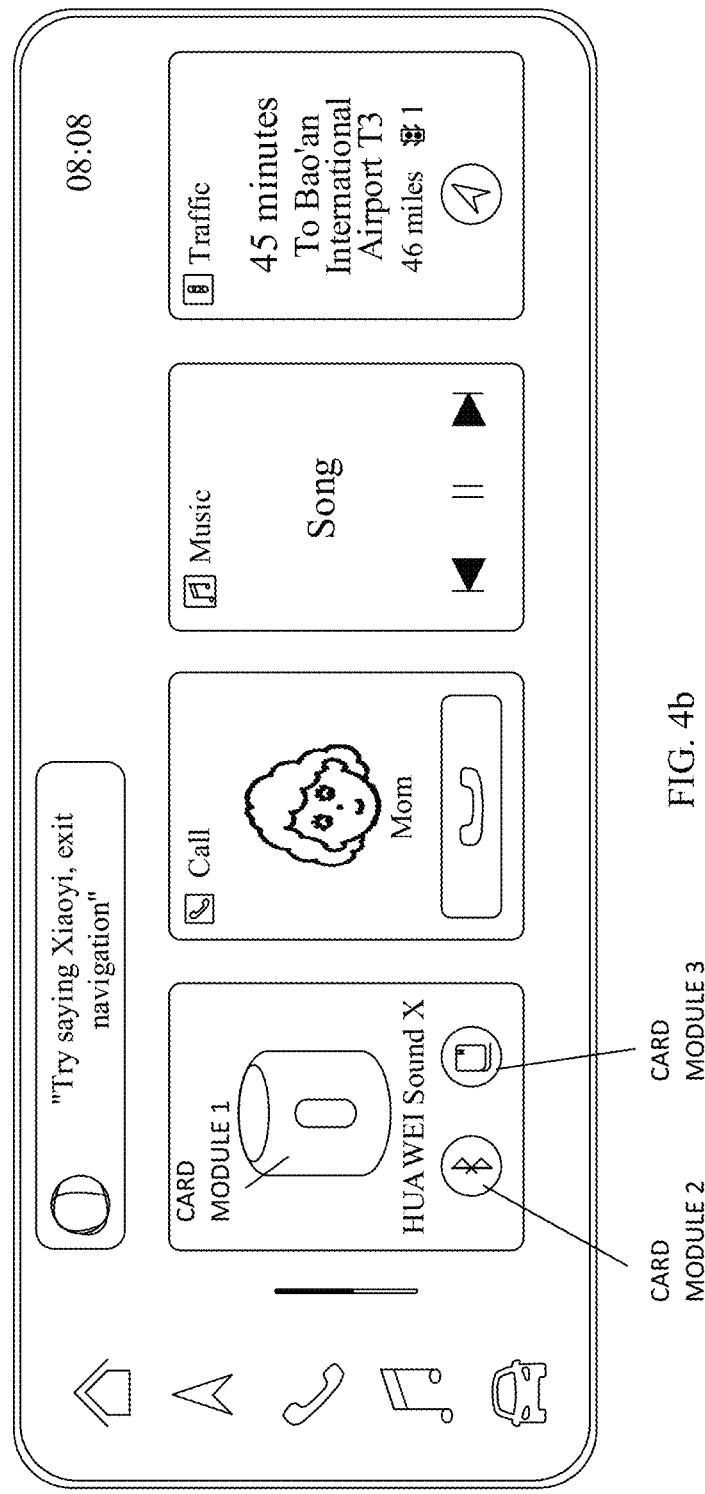

In scenario 2 of this application, the first card displayed by the first application on the first device is shared to a third application on a second device. FIG. 4a and FIG. 4b are schematic diagrams of human-machine interaction interfaces according to an embodiment of this application. An example is used in which the first device is a mobile phone, the first application is an AI life application on the mobile phone, the first card is corresponding to a music playing service pushed by the AI life application, the second device is an in-vehicle device, and the third application is a home screen of the in-vehicle device. For specific content of the first card, refer to the descriptions of FIG. 3a to FIG. 3l. Details are not described herein again.

Refer to FIG. 4a and FIG. 4b. The card sharing method in this application may include step 21 to step 25. Content of step 21 to step 24 is corresponding to the content of step 11 to step 14 in FIG. 3a to FIG. 3l respectively. Details are not described herein again.

Step 25: If the user wants to share the first card to an in-vehicle device, the user taps the operation button with a vehicle icon in the cross-device sharing options, as shown in FIG. 4a. Then, a card that includes the card module 1, the card module 2, and the card module 5, as shown in FIG. 4b, is displayed on a home screen of the in-vehicle device.

In this way, the card that includes the card module 1, the card module 2, and the card module 5 is added to the home screen of the in-vehicle device. Content displayed on a UI of the card and content displayed in a preview region have different layouts. Alternatively, content displayed on a UI of the card may have the same layout as content displayed in a preview region.

In summary, a card or a card module of a card can be shared between different devices, which helps provide service content for users by using display channels of different devices, simultaneously satisfies control requirements of a plurality of users by using cards, for example, temporary control requirements raised by family members or guests for a home device, satisfies sharing requirements in different scenarios, and improves the users' operation experience.

It should be noted that in scenario 1 and scenario 2, this application includes but is not limited to the parameters such as user operations, interface layout, interface size, and display content mentioned in the foregoing content. In addition, the UI of the first card may be the same or different on different types of devices. This is not limited in this application.

Based on the descriptions of scenario 1 and scenario 2, if the user fails to find the first card in the first application, the user may download the first card from a server such as a cloud download market and install the first card, or download the first card from local storage of the first device and install the first card. This is not limited in this application.

By using the AI life application as an example, an implementation process of downloading the first card from the AI life application is illustrated in the following.

FIG. 5a to FIG. 5d are schematic diagrams of human-machine interaction interfaces according to an embodiment of this application. An example is used in which the first device is a mobile phone, the first application is an AI life application on the mobile phone, and the first card is corresponding to a music playing service pushed by the AI life application.

Figure 5A:
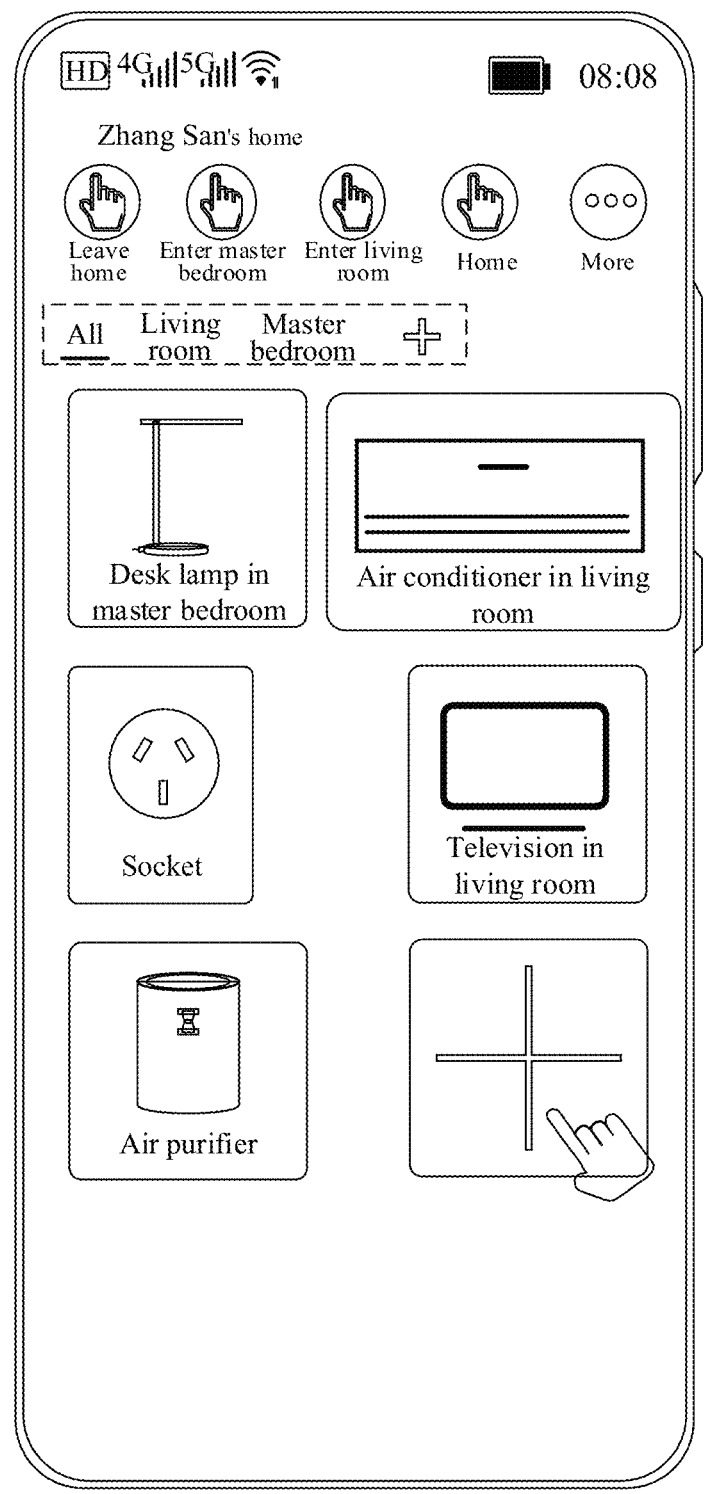
FIG. 5a to FIG. 5d are schematic diagrams of human-machine interaction interfaces according to an embodiment of this application.
Figure 5B:
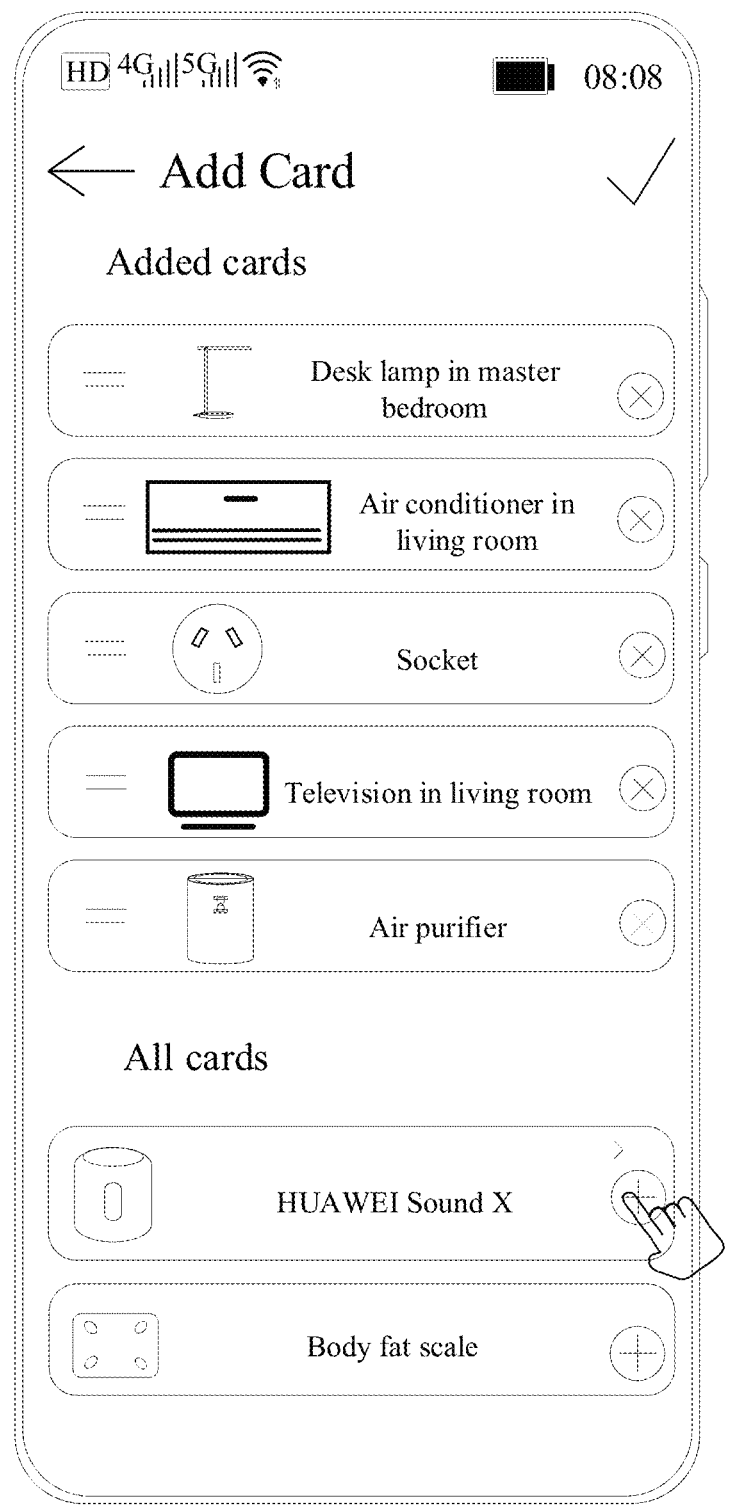

Refer to FIG. 5a to FIG. 5d. If the user performs step 11 or step 21, an interface shown in FIG. 5a instead of the interface shown in FIG. 3c is displayed on the display of the mobile phone. The user needs to download the first card from the AI life application. The user may tap an add operation button. An interface shown in FIG. 5b is displayed on the display of the mobile phone, where the interface includes options of "Added cards" and options of "All cards". The options of "Added cards" include: a card of "Desk lamp in master bedroom", a card of "Air conditioner in living room", a card of "Socket", a card of "Television in living room", and a card of "Air purifier". The "All cards" include: the first card and a card of "Body fat scale". It should be noted that the cards in the options of "Added cards" may also be added to the AI life application as instructed by the descriptions of FIG. 5a to FIG. 5d. Details are not described herein.

Figure 5C:
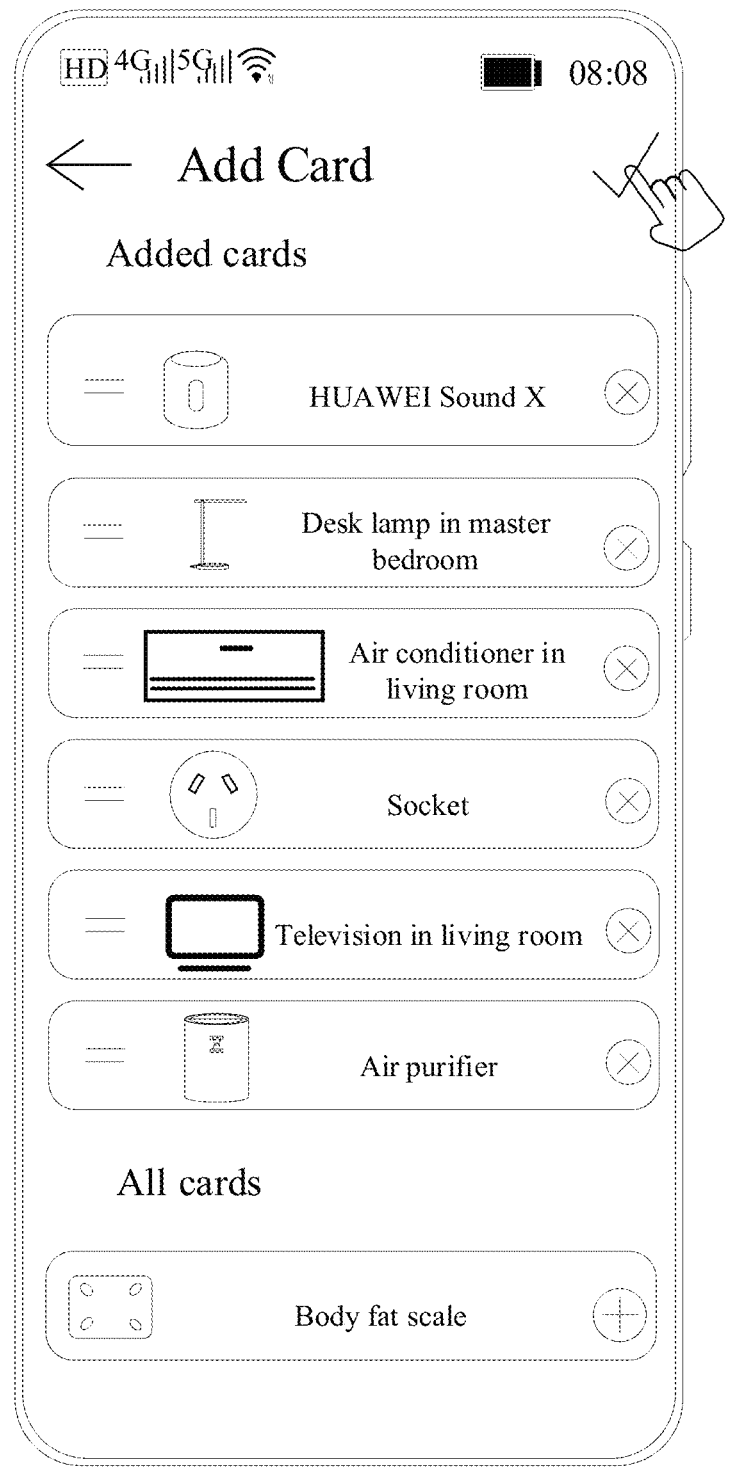
Figure 5D:
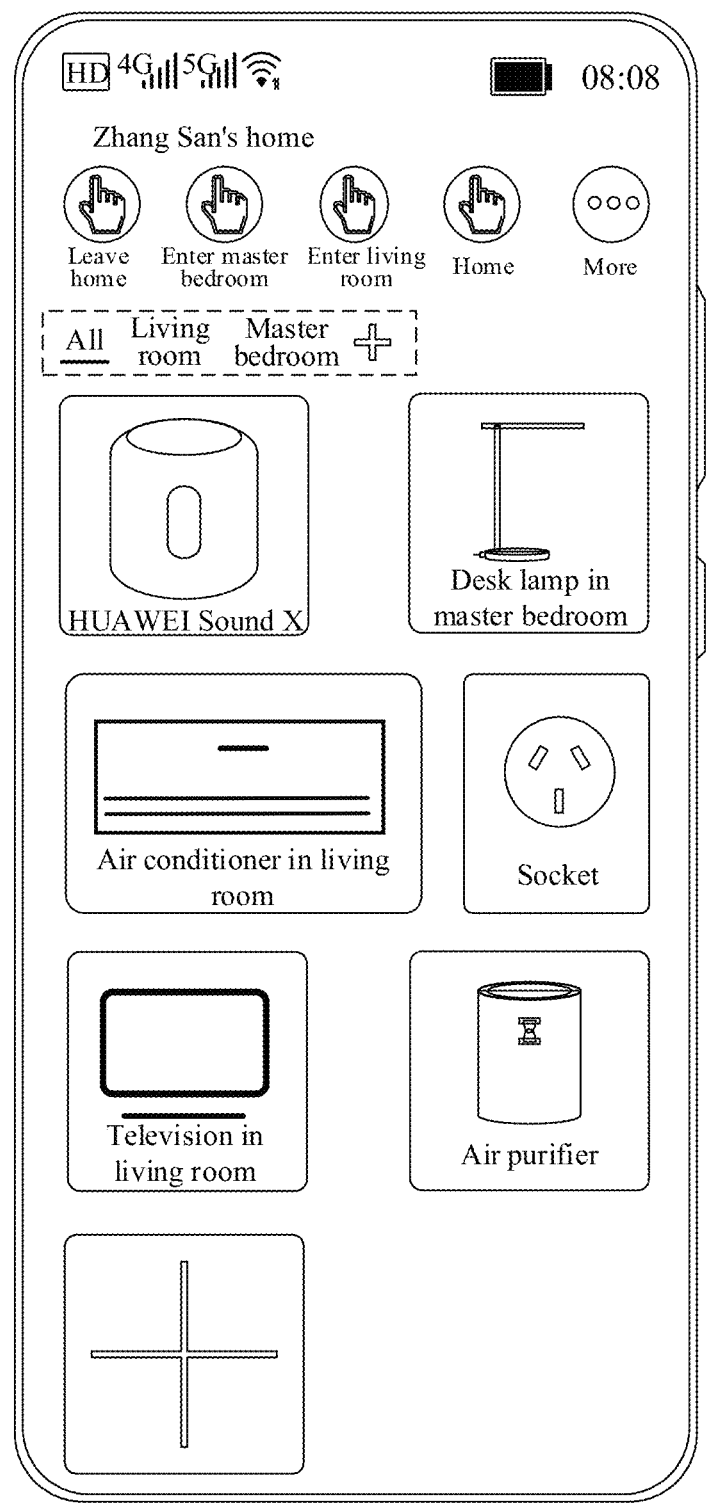

As shown in FIG. 5b, the user may tap an add operation button in the first card. An interface shown in FIG. 5c is displayed on the display of the mobile phone. The first card is added to the options of "Added cards" on the interface. The user may tap an option, where the option is used to indicate that the card has been added, for example, a tick icon shown in FIG. 5c. An interface shown in FIG. 5d, which is also the interface shown in FIG. 3c, is displayed on the display of the mobile phone. In this way, the first card is added to the AI life application, which helps the user implement sharing of the first card.

In the process of adding the first card to the AI life application, the AI life application may not only obtain a card name of the first card, but also obtain card module numbers of all card modules of the first card, that is, a card module number of the card module 1, a card module number of the card module 2, a card module number of the card module 3, a card module number of the card module 4, a card module number of the card module 5, and a card module number of the card module 6. In this way, the user is allowed to share all the card modules of the first card to the second application or the second device.

In some embodiments, the user may further choose to add a card module of the first card to the AI life application, so that a UI of a single card is displayed flexibly, and different display requirements are satisfied. In addition, the user may further choose to combine a card module of the first card and a card module of a second card and add them to the AI life application, so that UIs of different cards are displayed flexibly, and different display requirements are satisfied.

Still using the AI life application as an example, an implementation process of downloading the first card from the AI life application is illustrated in the following.

FIG. 6a to FIG. 6d are schematic diagrams of human-machine interaction interfaces according to an embodiment of this application. An example is used in which the first device is a mobile phone, the first application is an AI life application on the mobile phone, and the first card is corresponding to a music playing service pushed by the AI life application.

Figure 6A:
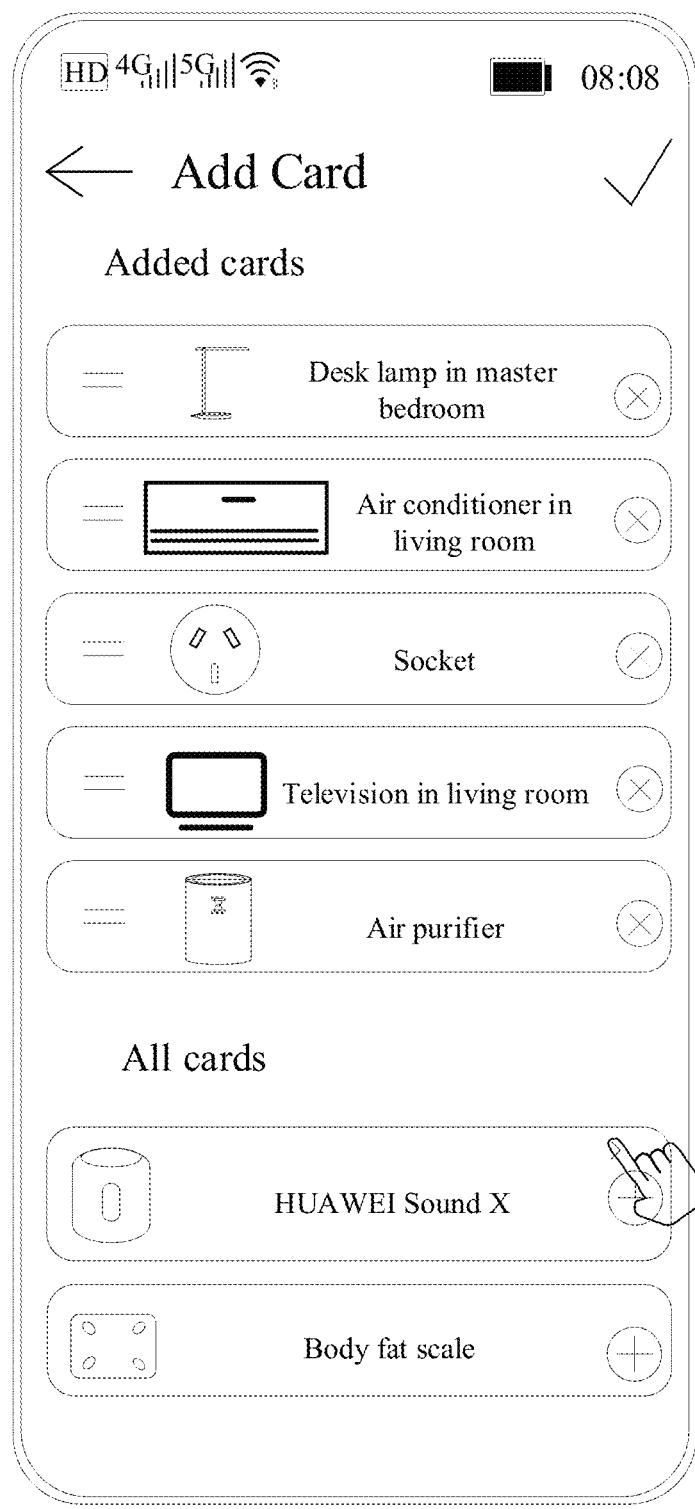
FIG. 6a to FIG. 6d are schematic diagrams of human-machine interaction interfaces according to an embodiment of this application.
Figure 6B:
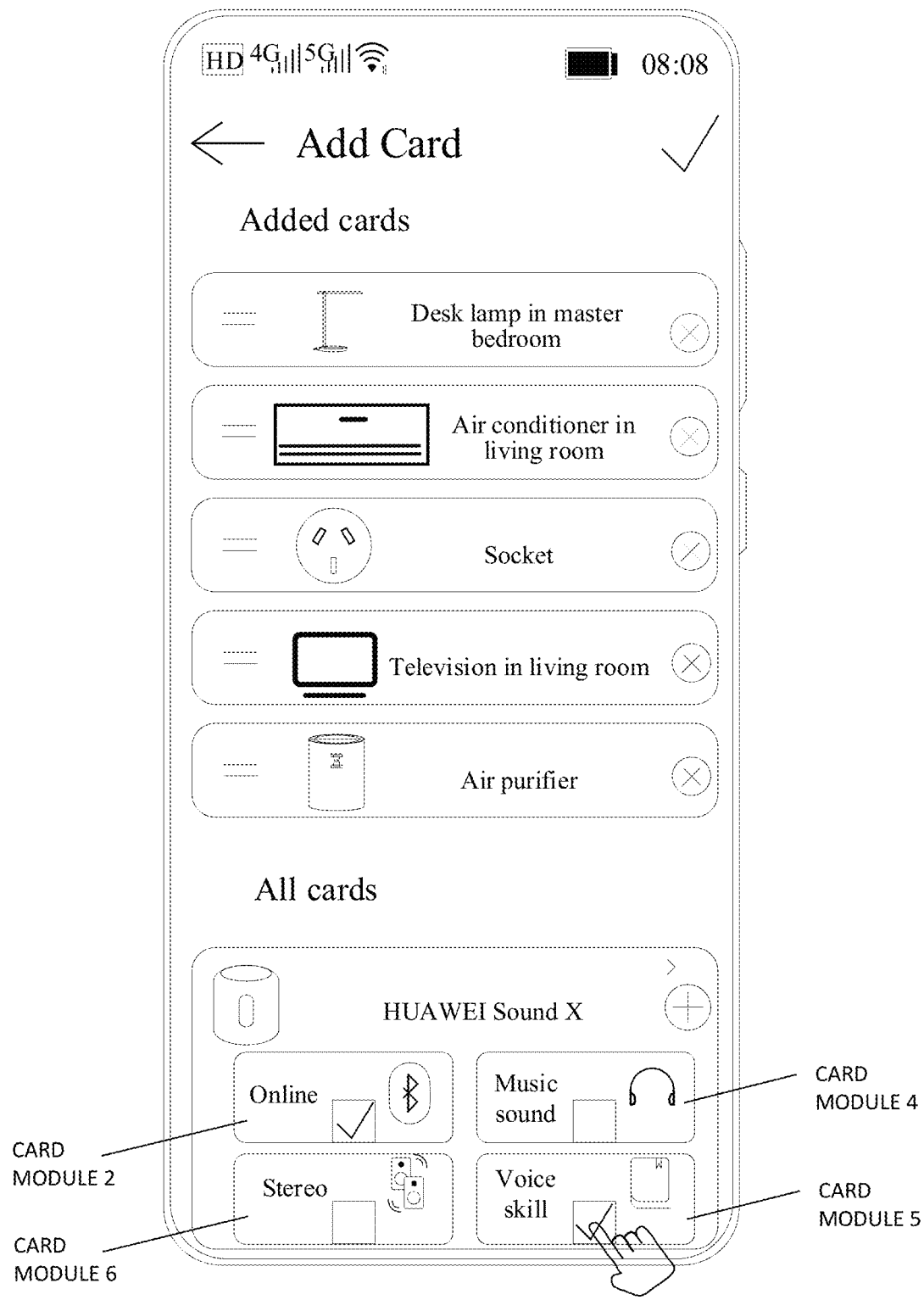

Refer to FIG. 6a to FIG. 6d. The user taps the add operation button on the interface that is shown in FIG. 5a and displayed on the display of the mobile phone. An interface shown in FIG. 6a is displayed on the display of the mobile phone. The user taps an option in the first card, where the option is used to present card modules of the first card, for example, an expand operation button on the interface shown in FIG. 6a. An interface shown in FIG. 6b is displayed on the display of the mobile phone. The interface includes the card module 2, the card module 4, the card module 5, and the card module 6. An option is display at the bottom right of the card module 2, the card module 4, the card module 5, and the card module 6 each on the interface. The option is used to indicate whether a corresponding card module is selected, for example, an operation button with a square box icon.

The user may tap separately a square box icon displayed in the card module 2 and a square box icon displayed in the card module 5 on the interface shown in FIG. 6b. Then, a tick icon shown in FIG. 6b appears in each of the square box icon displayed in the card module 2 and the square box icon displayed in the card module 5. The tick icon is used to indicate that the card module is selected.

Figure 6C:
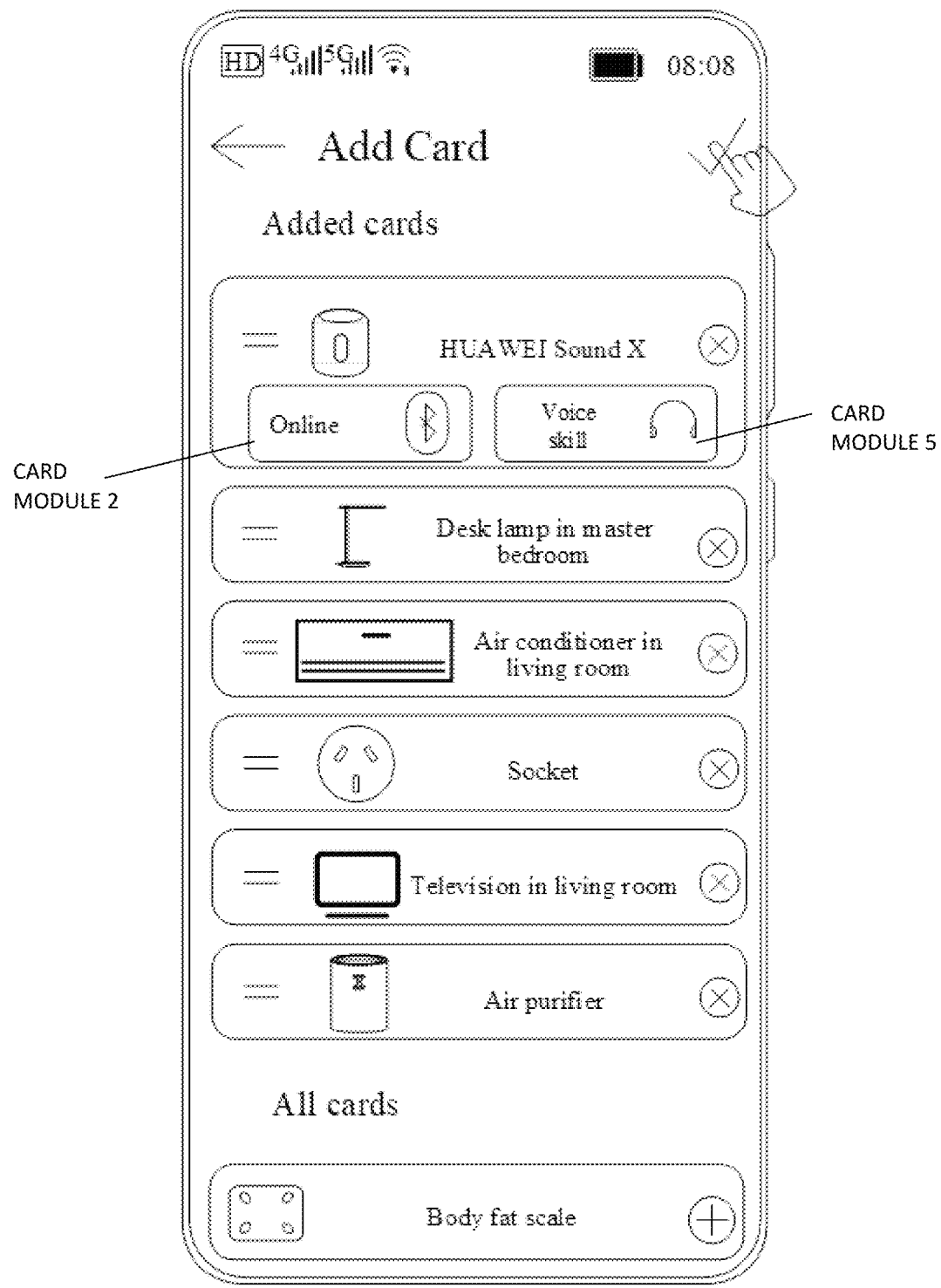
Figure 6D:
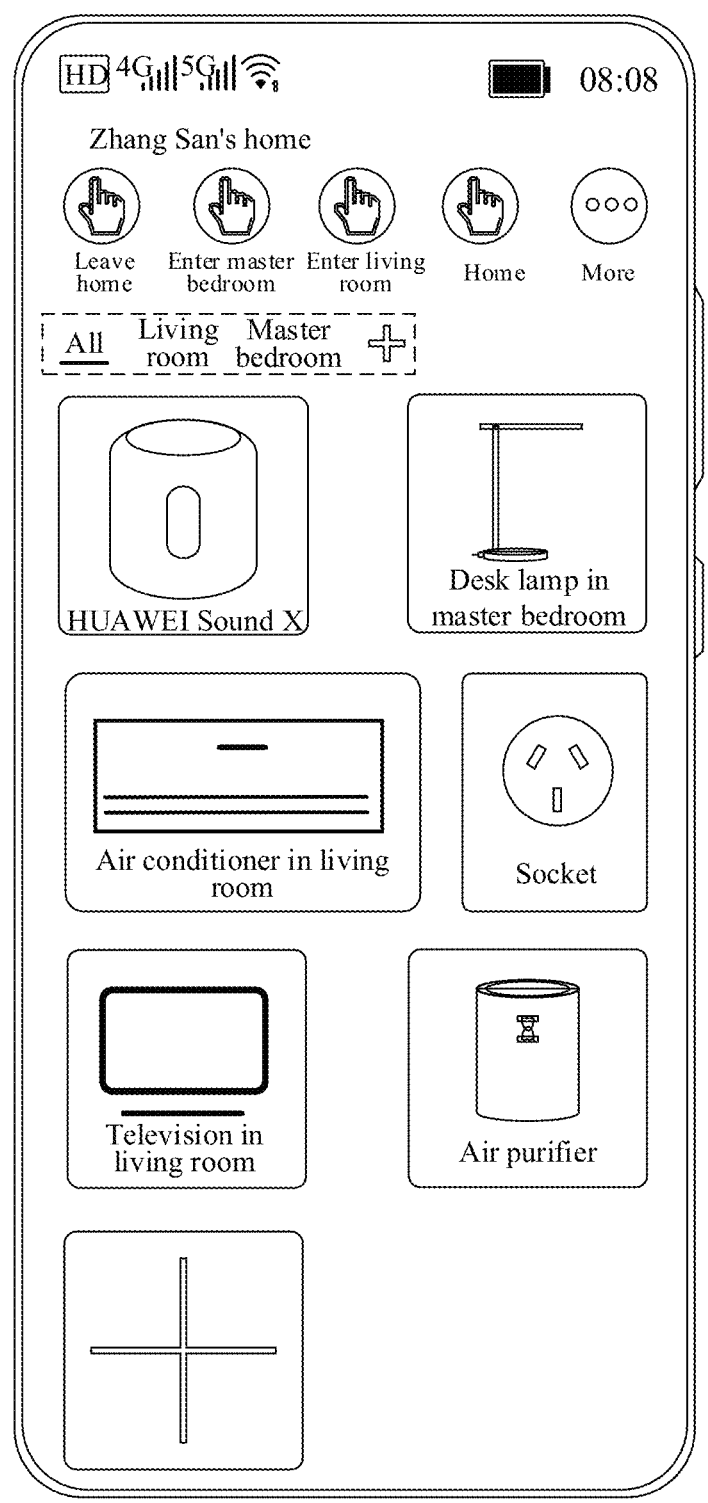

The user may tap the add operation button in the first card. An interface shown in FIG. 6c is displayed on the display of the mobile phone. The first card is added to the options of "Added cards" on the interface, and an icon corresponding to the card module 2 of the first card and an icon corresponding to the card module 5 of the first card are also displayed on the interface. The user may tap an option, where the option is used to indicate that a card has been added, for example, a tick icon shown in FIG. 6c. An interface shown in FIG. 6d is displayed on the display of the mobile phone. In this way, the first card is added to the AI life application, which helps the user implement sharing of the first card.

In the process of adding the first card to the AI life application, the AI life application may not only obtain the card name of the first card, but also obtain the card module number of the card module 2 of the first card and the card module number of the card module 5 of the first card. In this way, the user is allowed to share the card module 2 and the card module 5 that are of the first card to the second application or the second device.

In summary, at least one card can be embedded into any application program on an electronic device, so that service content is displayed to a user in a card form, and abundant UI display channels are available for cards, which can satisfy different user requirements.

In this application, a card (card) is a form of embedded service and can be embedded into an application process or an operating system to intuitively present key content (for example, pictures, text, videos, links, and the like that are related to a same topic) to a user, thereby satisfying a user requirement.

Generally, one card is corresponding to one service in an application program, for example, an order shipping service in a shopping application, a ticket information service in a travel application, and a sound playing service in a smart speaker application. Each card can be split into a plurality of corresponding card modules (complication). That is, a card is splittable.

A card module is a smallest unit of card recombination, or in other words, a card module is a smallest unit of card sharing. It may be understood that all card modules of a card are recombinable, to allow recombination of at least one card module of the card. Alternatively, some card modules of a card are recombinable, and remaining card modules are non-recombinable, to allow recombination of at least one of the remaining card modules with at least one of the some card modules.

A plurality of components may be combined into a card module. A component may include but is not limited to information, picture, text, operation button, audio/video, and link. When different components are combined, different UIs are displayed for corresponding card modules, so that different cards are displayed on different UIs by including different card modules. This not only facilitates storage and management of each card through a plurality of card modules, but also supports UI display of some or all card modules of each card, which helps implement and update UI display of each card quickly.

For card modules included in each card, it may be that a service provider of an application program splits each service to obtain corresponding card modules and delivers the card modules to a card application process on an electronic device; or it may be that a service provider of an application program sends service content to a card service application process, and the card service application process splits each service based on the service content to obtain corresponding card modules and delivers the card modules to a card application process on an electronic device. For specific content of the card service application process and the card application process, refer to the following description, and details are not described herein.

Each card has a unique identifier, that is, a card identity (identity document, ID), for example, in a form such as a card name or a card number. For ease of description, an example in which a card identifier is a card name is used in this application for illustration. All card modules included in each card are associated with a card name of the card, so that an electronic device stores the card modules included in each card based on the card name. In addition, each card module has a unique identifier, for example, a card module number, and the identifier may, for example, be expressed in a form of a binary number, a character string, or the like. For ease of description, an example in which a card module identifier is a card module number is used in this application for illustration.

When a card module is delivered to an electronic device, a card name is also delivered to the electronic device at the same time, to help quickly determine a card corresponding to the card name and all card modules of the card, or a card name and a card module number are also delivered to the electronic device at the same time, to help quickly determine a card corresponding to the card name and a card module of the card.

A visual style of a card is not limited in this application. The visual style, also referred to as "style", indicates visual experience of an object presented to people, including a shape, structure, size, color, motion state, and the like of that object. For example, when an electronic device displays a card, a visual style of the card may include a shape (such as a rectangle), color (such as white, black, or colored), and size of the card, layouts and shapes of card modules, and the like.

Figure 7:
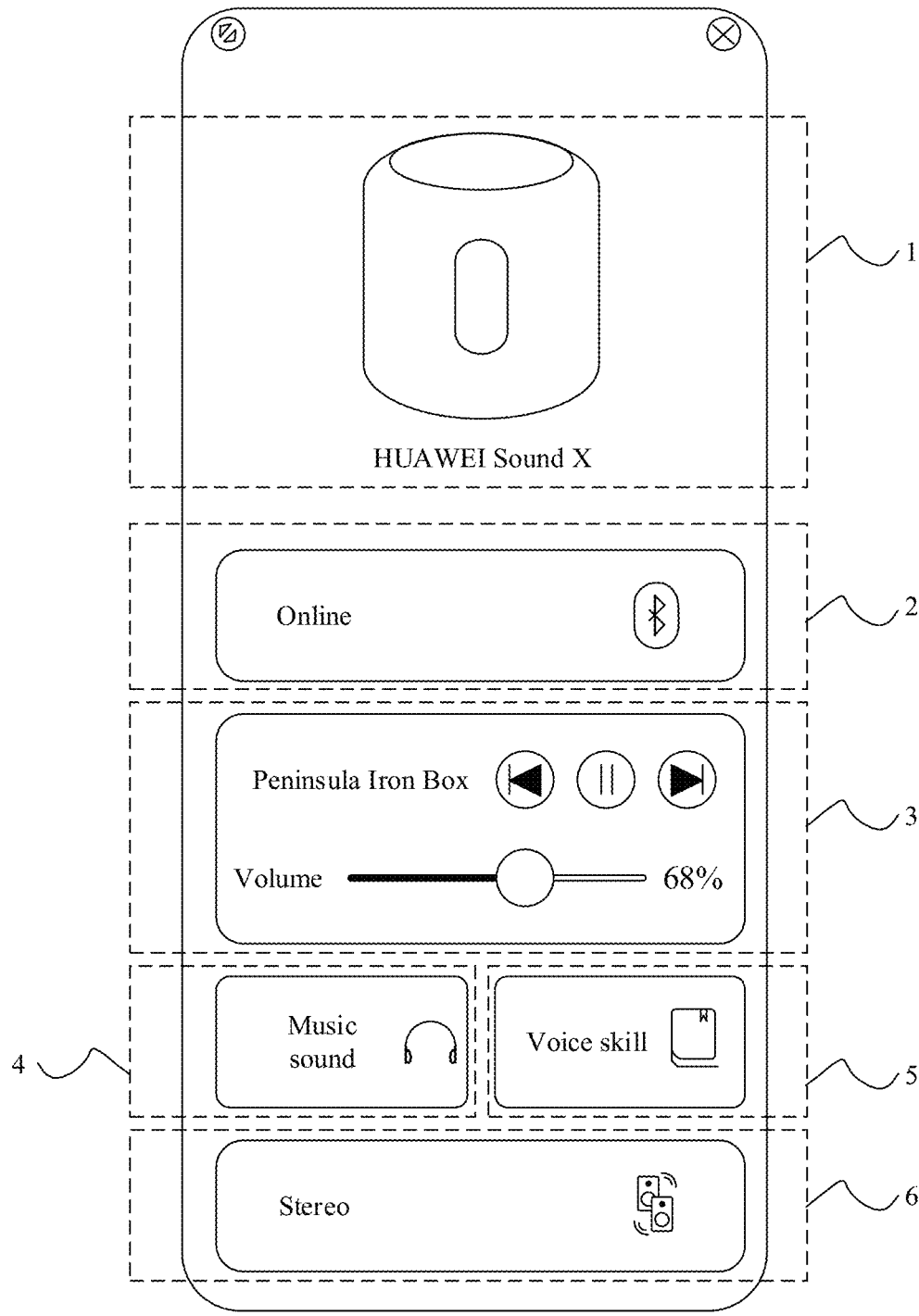
FIG. 7 is a schematic diagram of an interface of a card according to an embodiment of this application.
Figure 8:
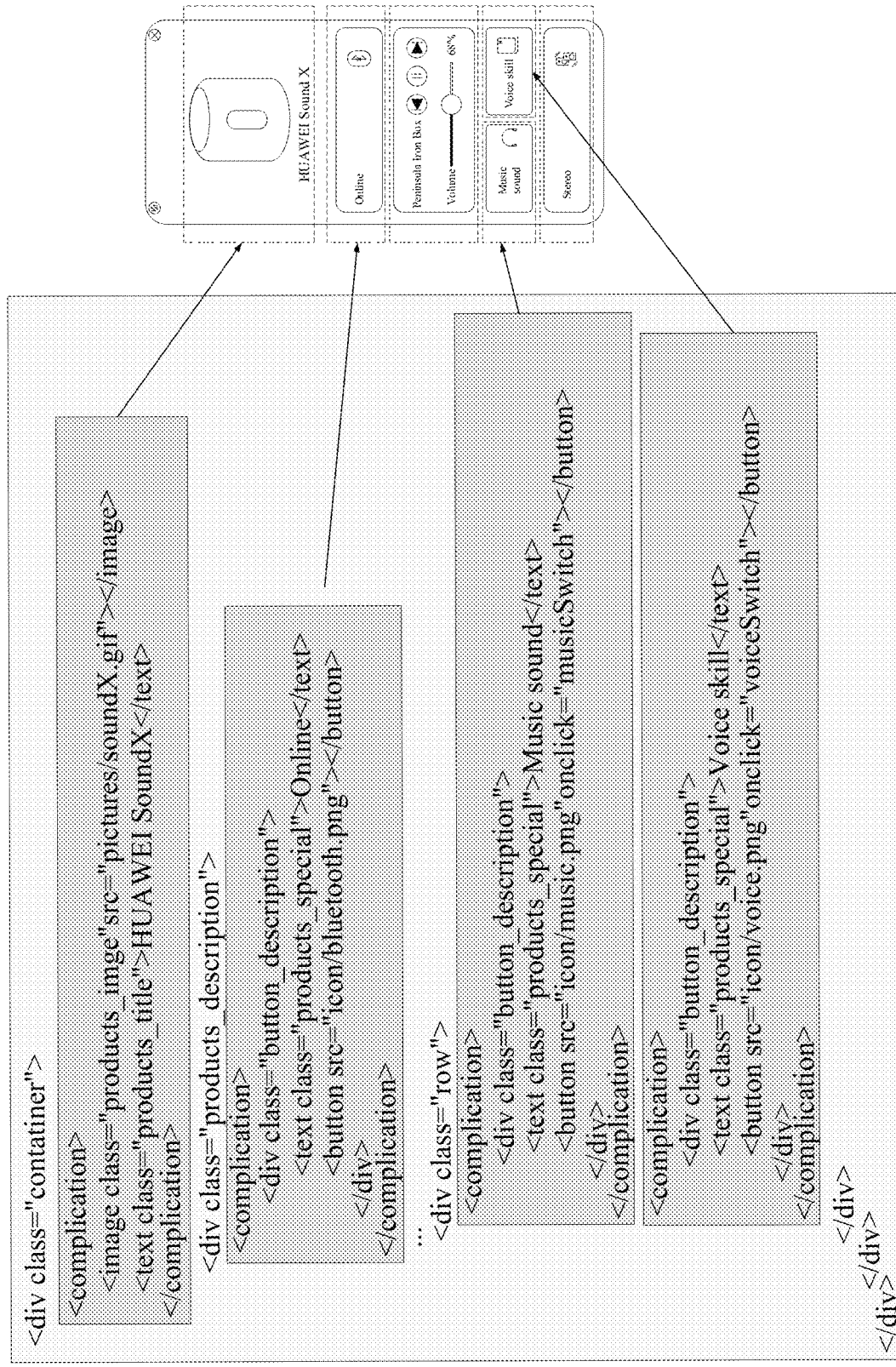
FIG. 8 is a schematic diagram of code of a card module according to an embodiment of this application.

In a specific embodiment, using the first card shown in FIG. 3d as an example, as shown in FIG. 7, the first card includes the card module 1, the card module 2, the card module 3, the card module 4, the card module 5, and the card module 6 (the six card modules are shown with corresponding numbers in FIG. 7), where:

the card module 1 is corresponding to code that is related to the smart speaker icon and the text "HUAWEI Sound X" in FIG. 8;

the card module 2 is corresponding to code that is related to the text "Online" and the operation button with a Bluetooth icon in FIG. 8;

the card module 4 is corresponding to code that is related to the text "Music sound" and the operation button with an earphone icon in FIG. 8; and the card module 5 is corresponding to code that is related to the text "Voice skill" and the operation button with a learning icon in FIG. 8.

It should be noted that any card may include only recombinable card modules. For example, the first card includes a first card module and a second card module, and both the first card module and the second card module may be recombinable card modules. In addition, any card may include a recombinable card module and a non-recombinable card module. For example, the first card includes a first card module, a second card module, and a third card module, and both the first card module and the second card module may be recombinable card modules while the third card module may be a non-recombinable card module. Recombination mentioned in this application may be understood as a user being able to perform selection and sharing.

In addition, each card may be associated with one or more UIs corresponding to the card, which helps the user implement, by performing an operation on the card, a function of jumping to a page of an application program corresponding to the card.

Figure 9A:
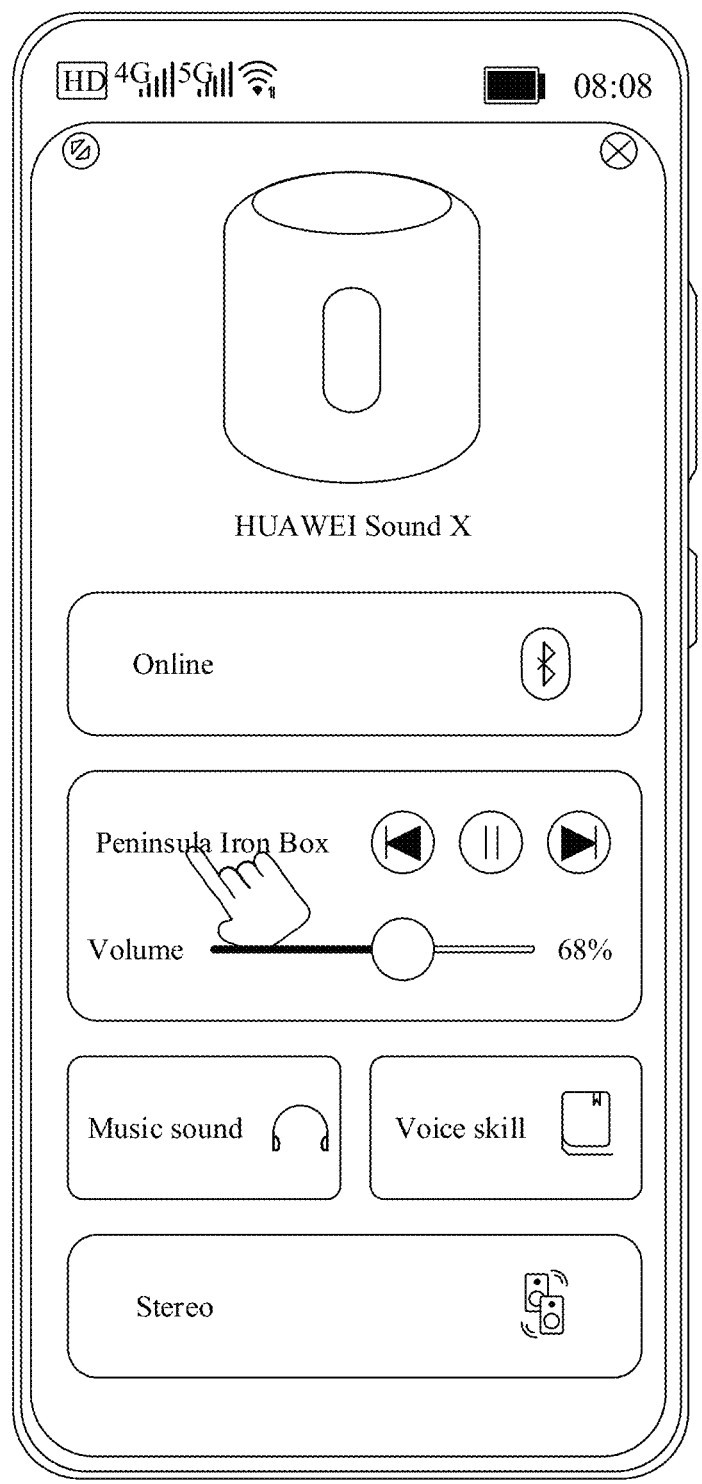
FIG. 9a and FIG. 9b are schematic diagrams of human-machine interaction interfaces according to an embodiment of this application.
Figure 9B:
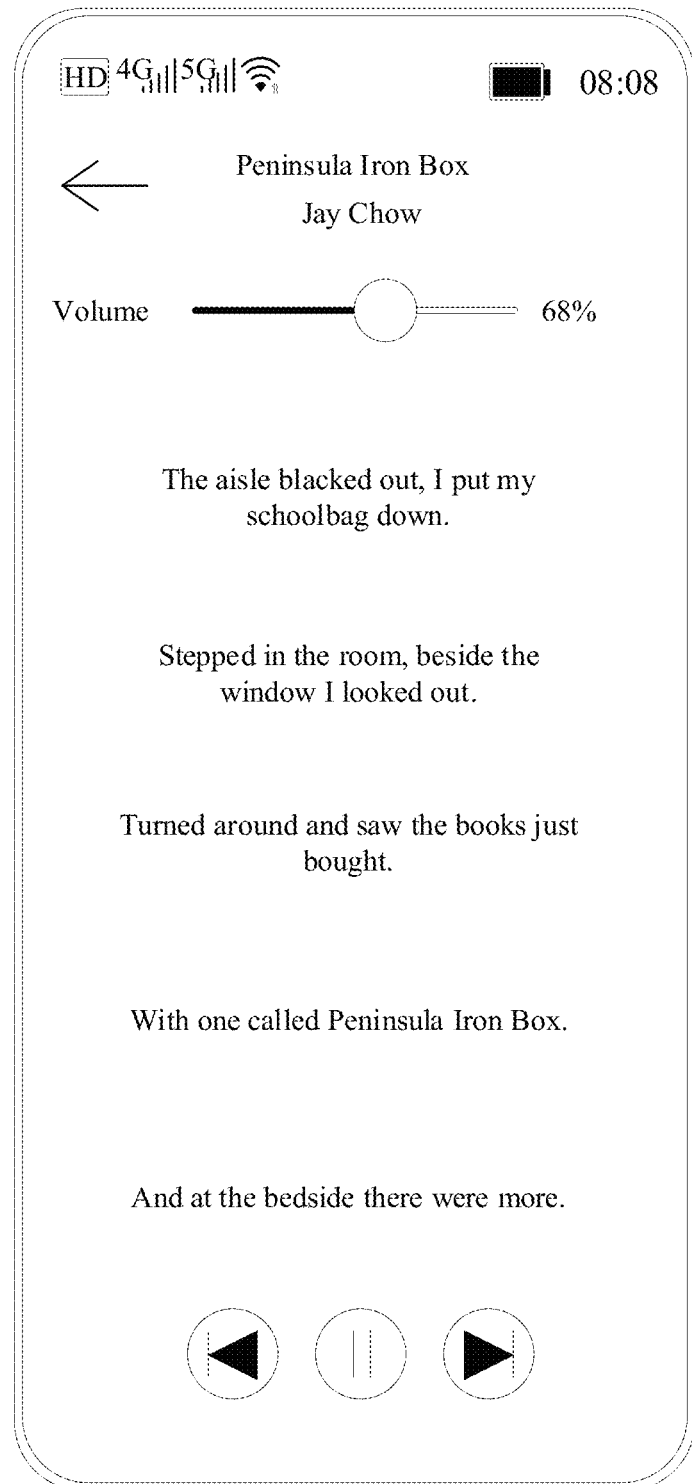

On the one hand, an operation button may be linked to a specific page of an application program corresponding to the operation button. For example, the user taps an operation button with the song name "Peninsula Iron Box" in the first card shown in FIG. 9a. Then, a display of a mobile phone may jump to a lyrics page of the song "Peninsula Iron Box". Some content of lyrics of the song "Peninsula Iron Box", an operation button with a Previous icon, an operation button with a Play/Pause icon, an operation button with a Next icon, text "Volume" and "68%" indicating volume, a slide operation button used for volume tuning, and the like are displayed on the lyrics page.

Figure 10A:
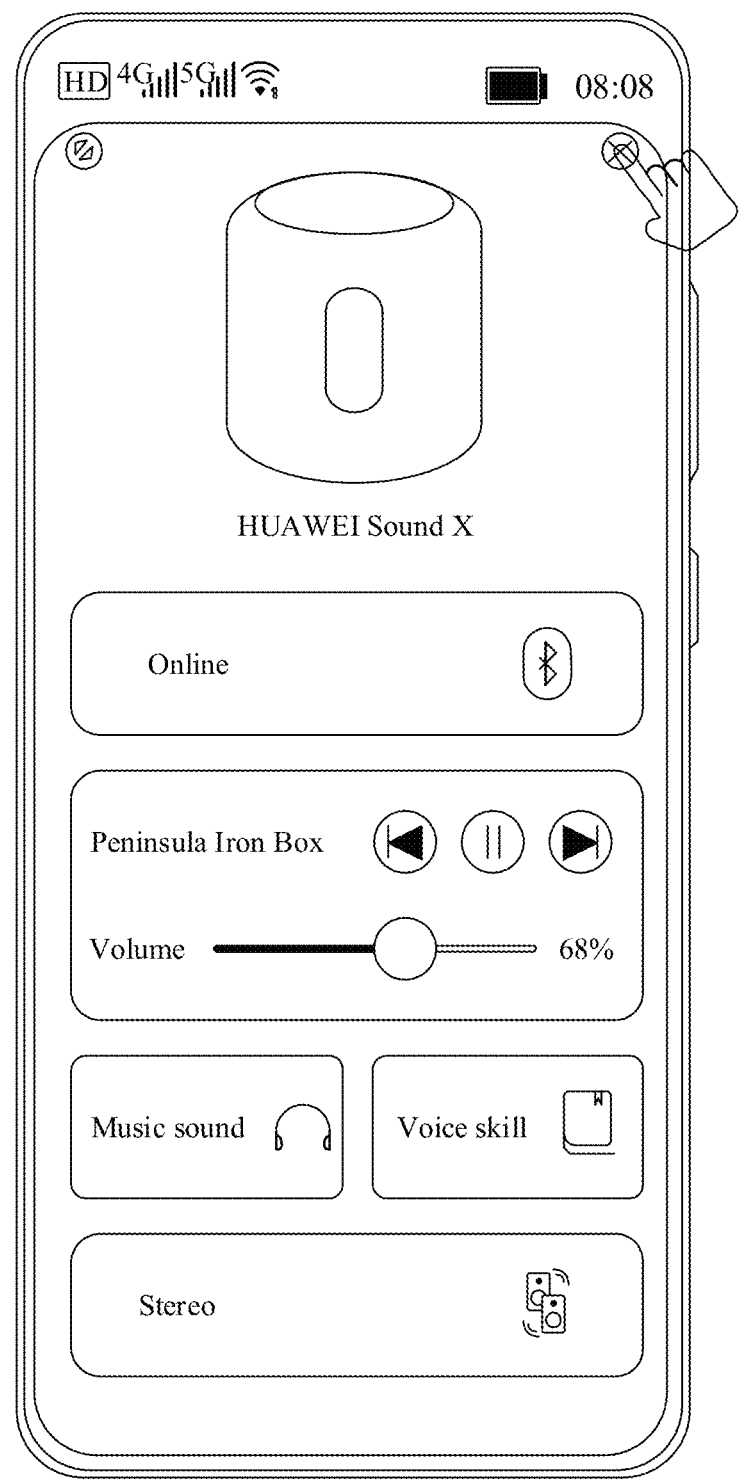
FIG. 10a and FIG. 10b are schematic diagrams of human-machine interaction interfaces according to an embodiment of this application.

On the other hand, a card itself may also be linked to a page of, for example, a card application. For example, as shown in FIG. 10a, the user taps an option in the first card, where the option is used to indicate disabling display of the first card. Then, an interface shown in FIG. 10b, which is also the interface shown in FIG. 3c, is displayed on the display of the mobile phone.

Figure 10B:
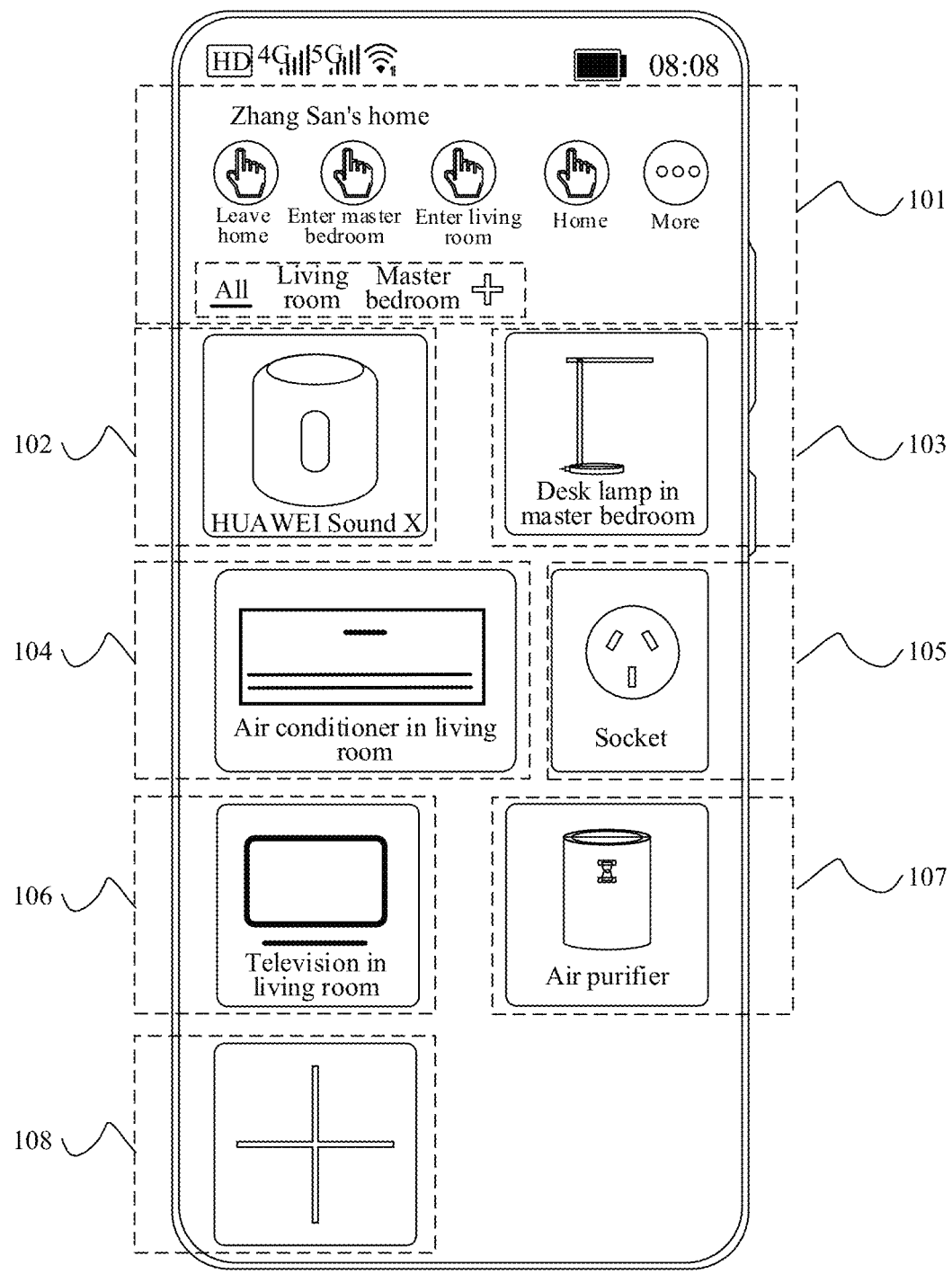

Refer to FIG. 10b. As shown in FIG. 10b, the interface includes: an application page 101 of the AI life application, UIs of six cards (102 to 107), and an option 108, where the option 108 is used for adding a card. For content of the six cards, refer to the foregoing description. Details are not described herein again. For ease of description, a first card and a second card in the six cards (102 to 107) are used as an example for illustration.

Figure 11:
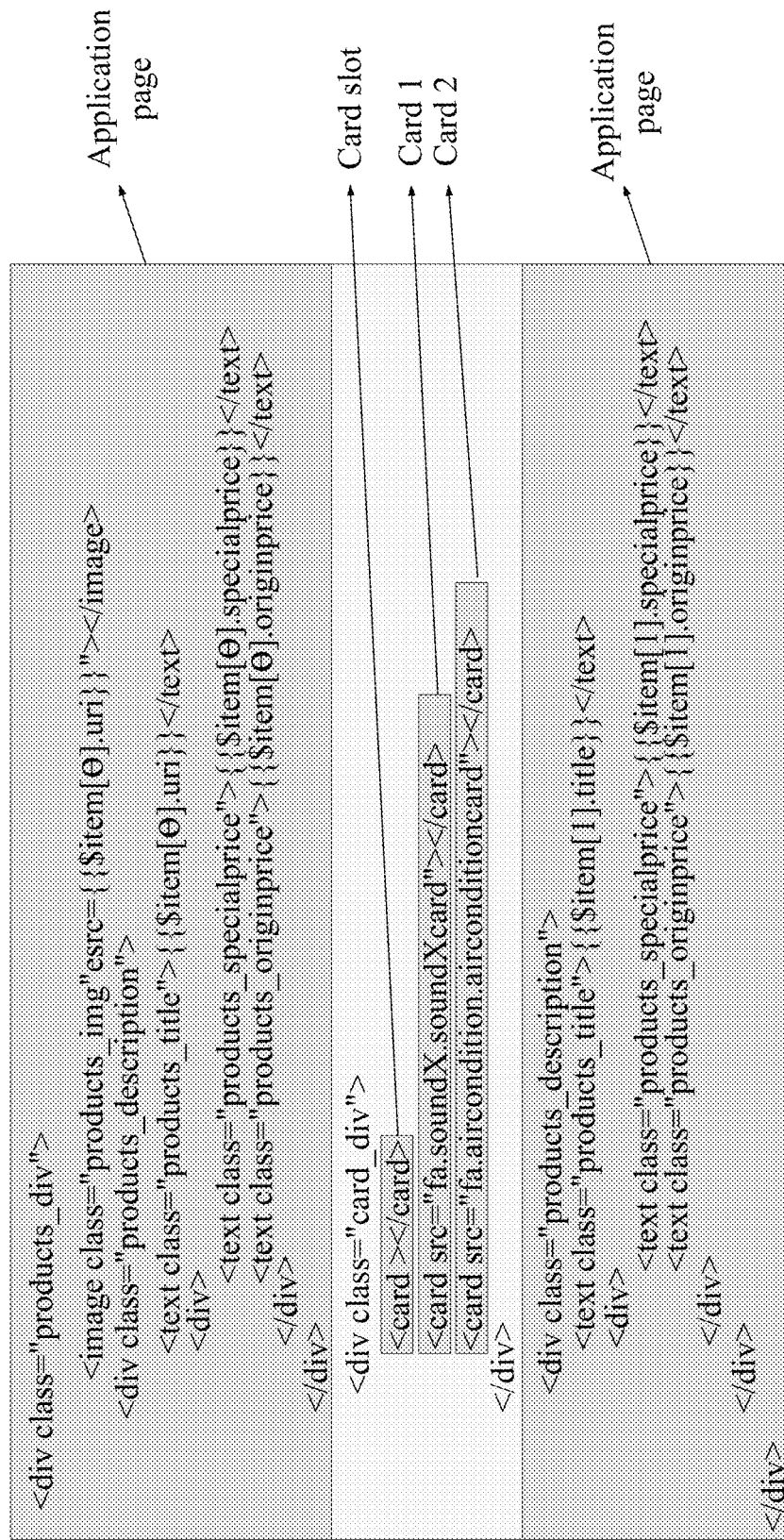
FIG. 11 is a schematic diagram of code of an application program according to an embodiment of this application.

The application page 101 of the AI life application is corresponding to code of an application page shown in FIG. 11. In this way, the AI life application is able to implement UI display of the application page.

A UI of the first card is corresponding to code of a first card shown in FIG. 11. A card tag "card src" of the first card is embedded into the code. The card tag carries a card name "fa.soundx.soundXcard" of the first card. In this way, the AI life application is able to implement UI display of the first card.

A UI of the second card is corresponding to code of a second card shown in FIG. 11. A card tag "card src" of the second card is embedded into the code. The card tag carries a card name "fa.aircondition.airconditioncard" of the second card. In this way, the AI life application is able to implement UI display of the second card.

A UI of the option 108 is corresponding to code of a card slot shown in FIG. 11. A card tag "card src" of the second card is embedded into the code. In this way, the AI life application is able to implement UI display of a new card (for example, a card reassembled with card modules recombined).

Figure 12A:
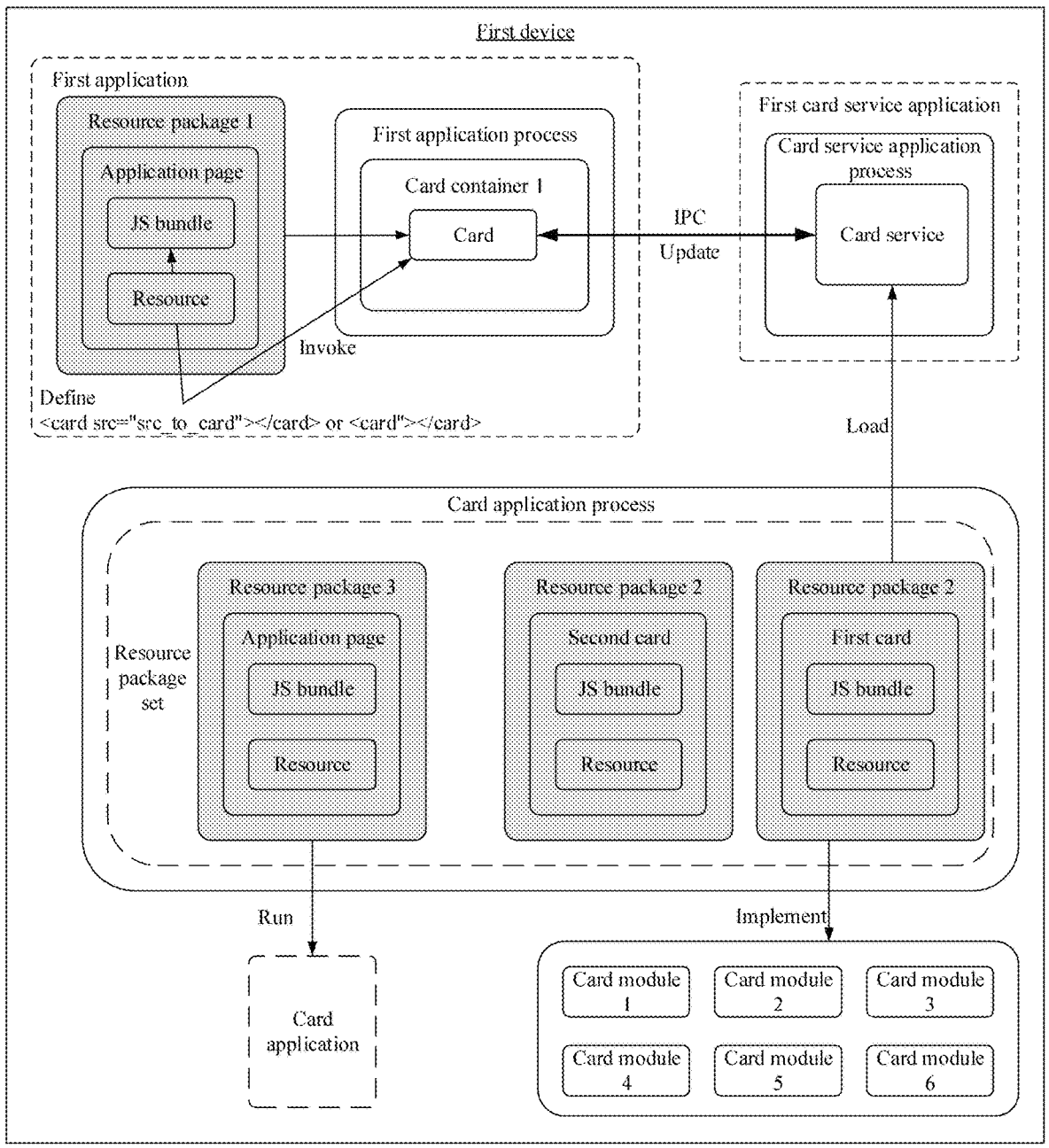
FIG. 12a is a schematic diagram of a software architecture for a scenario according to an embodiment of this application.

Refer to FIG. 12a. An example is used in which the first card is embedded into the first application on the first device, and display of the first card is implemented. FIG. 12a is a schematic diagram of a software architecture for a scenario according to an embodiment of this application. As shown in FIG. 12a, a first card service module on the first device may include a first application process, a first card service application process, and a resource package set, where the first card service module is located at the application program layer shown in FIG. 2a.

It should be noted that a process (Process) is a basic unit for resource allocation and scheduling performed by an operating system, and is a basis of an operating system structure. In other words, when running any application program, the operating system creates a process and allocates space. Correspondingly, the first application process is corresponding to the first application on the first device, and the first card service application process is corresponding to a first card service application on the first device. A specific implementation type of an application on the first device is not limited in this application. In addition, an application program mentioned in this application may also be referred to as an application.

The first application process is used to provide a card.

The first application process includes a resource package 1, a card tag 1, and a card container 1.

The resource package 1 is used to provide code for UI display and logic execution of an application page of the first application, that is, to provide interface resources. The resource package 1 includes a JS bundle and resource code that are corresponding to an application page of the first application. The JS bundle is used to implement logic execution and UI display of an application page 1 of the first application. The resource code is used to provide the JS bundle with a source of data such as videos and pictures, for the UI display of the application page 1 of the first application. The application page 1 of the first application herein refers to a UI other than card UIs, that is, a UI displayed by using the JS bundle in the resource package 1.

The card tag 1 is used for embedding different cards or card modules. The card tag 1 carries a card name of a card, so that the first application process parses and loads the card corresponding to the card name based on the card tag 1, and the card includes at least one card module. For example, code in the first application process includes <card src="src_to_card"></card>, where "card" indicates the card tag 1, and "src" indicates a card name. In this case, the first application process may load and display a card that includes all card modules.

Based on the foregoing description, the first application may implement UIs of the application page 1 and at least one card at the same time. If the first application is able to implement a UI of the first card and a UI of the second card, a card tag 1 of the first card and a card tag 1 of the second card are embedded into code for UI display and logic execution of the application page 1 of the first application, as shown in FIG. 11. The card tag 1 of the first card carries the card name "fa.soundx.soundXcard" of the first card, and the card tag 1 of the second card carries the card name "fa.aircondition.airconditioncard" of the second card.

In addition, the first application process may further include a card tag 2 that carries no card name, so that the first application process uses the card tag 2 as a placeholder for loading and displaying a card reassembled with card modules recombined. In this specification, the card reassembled with card modules recombined may be understood as a card that includes some card modules, or a card reassembled with all card modules combined. For example, code in the first application process includes <card"></card>, where "card" indicates the card tag 2, and "src" indicating a card name is absent. In this case, the first application process may load and display a card reassembled with card modules recombined.

The card container 1 is used to store a drawing result (one card is used for illustration in FIG. 12a). The drawing result may be understood as frames of images used to form a UI of a card. Interface resources of each card are usually stored in different storage space in the card container 1. In some embodiments, each card is corresponding to an address 1, so that the first card service application process transfers a drawing result to corresponding storage space in the card container 1 according to the address 1, allowing the first application to implement UI display of the card. Therefore, the card can be displayed in not only a static picture form but also a more complicated dynamic form. A specific implementation form of the address 1 is not limited in this application. For example, the address 1 may be a start address of storage space for a card.

Based on the foregoing description, in addition to implementing the UIs of the application page 1 and the at least one card, the first application may also reserve at least one card slot for a card reassembled with card modules recombined, to implement a UI of the card reassembled with card modules recombined. If the first application is able to display the card reassembled with card modules recombined in addition to implementing the UI of the first card and the UI of the second card, the card tag 2, the card tag 1 of the first card, and the card tag 1 of the second card are embedded into the code for UI display and logic execution of the application page 1 of the first application, as shown in FIG. 11. The card tag 2 is used to reserve a card slot for displaying the card reassembled with card modules recombined. The card tag 1 of the first card carries the card name "fa.soundx.soundXcard" of the first card, and the card tag 1 of the second card carries the card name "fa.aircondition.airconditioncard" of the second card.

The card application process refers to a process where resources are loaded from a resource package set. The resource package set is used to pre-store code for UI display and logic execution of cards. Code for UI display and logic execution of all card modules of each card is usually stored based on a card name of the card.

In this way, the first card service application process may load code for UI display and logic execution of a card from the card application process, to implement UI display of a card in the first application process and a second application process, which also allows a card application to load code for UI display and logic execution of a card from the card application process, so that the card application implements UI display of the card. The card application mentioned in this specification is a card-related application program. In an example in which a card is corresponding to the music playing service pushed by the AI life application, a card application may be the AI life application or a smart speaker application.

Correspondingly, the resource package set includes at least one resource package 2 (a resource package 2 of the first card and a resource package 2 of the second card are used for illustration in FIG. 12a), and each resource package 2 is corresponding to code for UI display and logic execution of one card. For example, the resource package 2 of the first card may implement UI display of the six card modules of the first card. For any card, a resource package 2 includes a JS bundle and resource code that are corresponding to each card module of the card. The JS bundle is used to implement UI display and logic execution of each card module of the card. The resource code is used to provide the JS bundle with a source of data such as videos and pictures, for the UI display of the card.

In addition, the resource package set is further used to store code for UI display and logic execution of an application page of the card application, so that the card application can load the code for UI display and logic execution of the application page from the card application process, to implement a UI other than card UIs in the card application. The application page of the card application herein refers to a UI other than card UIs, that is, a UI displayed by using a JS bundle in a resource package 3.

Correspondingly, the resource package set may further include at least one resource package 3 (one resource package 3 is used for illustration in FIG. 12a), and each resource package 3 is corresponding to code for UI display and logic execution of an application page of a card application corresponding to one card. For any card, a resource package 3 includes a JS bundle and resource code that are corresponding to an application page of a card application corresponding to the card. The JS bundle is used to implement UI display and logic execution of the application page of the card application corresponding to the card. The resource code is used to provide the JS bundle with a source of data such as videos and pictures, for the UI display of the application page of the card application corresponding to the card.

The first card service application process is used to provide a service that drives UI display and logic execution of a card. In other words, the first card service application process loads a JS bundle from the card application process, and performs drawing and rendering based on the JS bundle to obtain a drawing result 1. Therefore, the first card service application process transfers the drawing result 1 to the first application process or the second application process, to implement UI display of a card. That is, the first card service application process and the first application process, or the first card service application process and the second application process implement the UI display of the card through address sharing. The first card service application process is corresponding to the card service application on the first device.

In this application, an inter-process communication (inter-process communication, IPC) connection may be established between the first application process and the first card service application process, to implement mutual communication between the first card service application process and the first application process.

Based on the description of the embodiment shown in FIG. 12a, an implementation process of displaying the first card in this application is described in detail in the following, where the implementation process is executed by the first application process, the card application process, and the first card service application process shown in FIG. 12a.

Figure 12B:
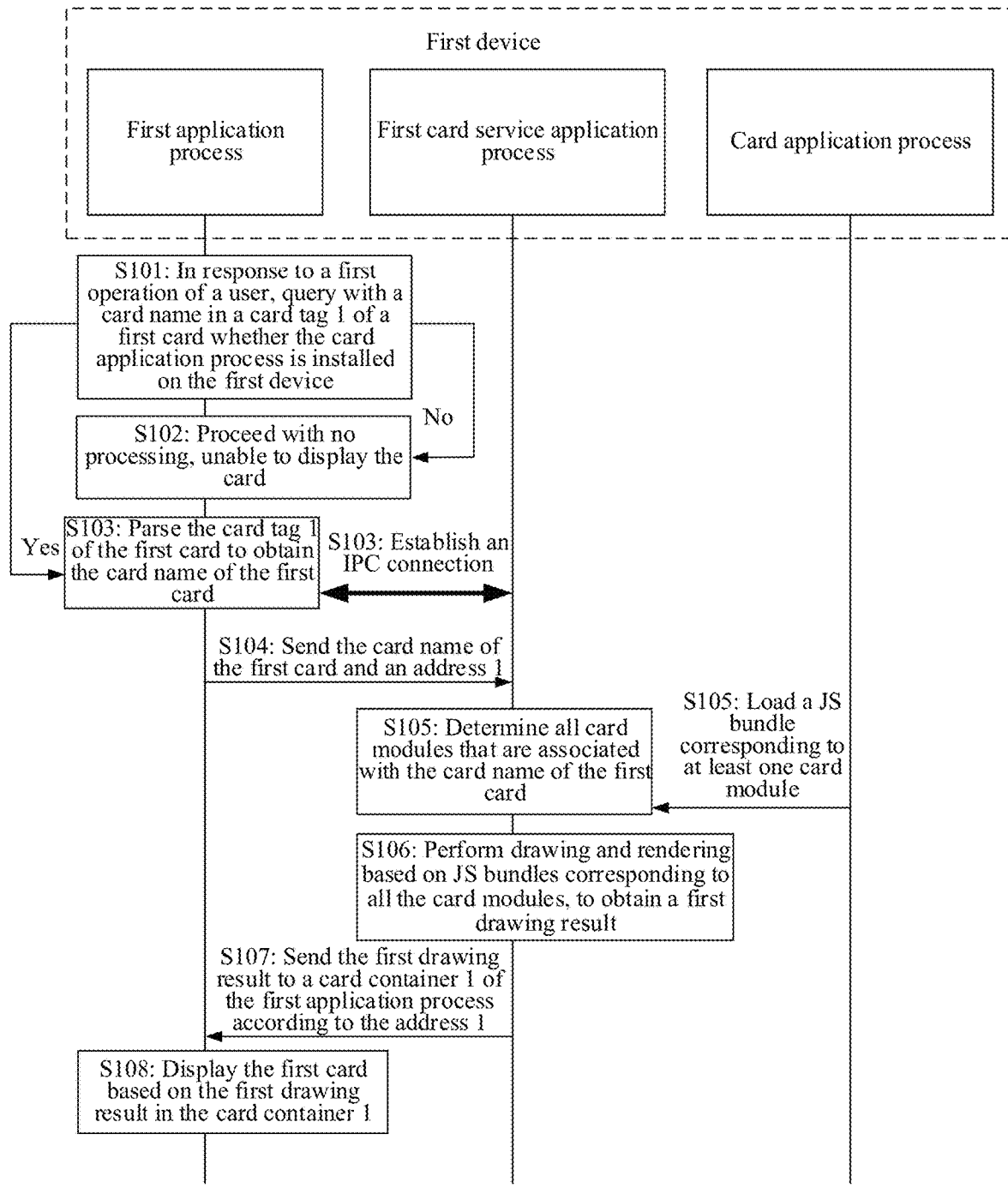
FIG. 12b is a signaling interaction diagram of a card sharing method according to an embodiment of this application.

FIG. 12b is a signaling interaction diagram of a card sharing method according to an embodiment of this application. As shown in FIG. 12b, the card sharing method in this application may include steps S101 to S117.

If a user wants to start the first card in the first application, the user may perform a first operation, such as tap, touch and hold, or swipe, on a page of the first application. The first card is any card in the first application. The touch-and-hold operation mentioned in this specification may be understood as an operation performed by a user for a time that has reached a preset time length.

S101: In response to the first operation of the user, the first application process queries with the card name in the card tag 1 of the first card whether the card service module on the first device includes a resource package set. The resource package set stores the first card corresponding to the card name.

A person skilled in the art may understand that after any process is installed on an electronic device, the process stores broadcast information in an operating system of the electronic device. The broadcast information is used to indicate that the process is installed. Therefore, the first application process may determine whether broadcast information can be found, to determine whether the card application process is installed. If no such broadcast information is found, the first application process determines that there is no resource package set corresponding to the card application process on the first device, and performs step S102. If such broadcast information is found, the first application process determines that the resource package set corresponding to the card application process is included on the first device, and performs steps S103 to S108.

S102: The first application process proceeds with no processing, and is unable to display the first card, which may be understood as that the first card cannot be embedded into the first application.

S103: The first application process parses the card tag 1 of the first card to obtain the card name of the first card, and establishes an IPC connection between the first application process and the first card service application process.

In some embodiments, the first card service application process is inactive by default when no card is displayed. In this case, in step S103, the first application program may activate the first card service application process. This helps reduce resource overheads. A binding relationship may be pre-established between the first application program and the first card service application process, so that the first application process starts the first card service application process based on the binding relationship. In other words, the first application process may invoke the first card service application process.

In some other embodiments, the first card service application process is active by default when no card is displayed. In this case, in step S103, the first application process does not need to activate the first card service application process.

It should be noted that the IPC connection between the first application process and the first card service application process may alternatively be established by an operating system of the first device. This is not limited in this application. Step S103 is optional. The IPC connection between the first application process and the first card service application process may be pre-established.

S104: The first application process sends the card name of the first card and an address 1 to the first card service application process through the IPC connection between the first application process and the first card service application process.

S105: The first card service application process determines at least one card module that is associated with the card name of the first card, and loads a JS bundle corresponding to the at least one card module from the resource package set by using the card application process. The JS bundle described in this specification may be one JS bundle or a plurality of JS bundles. This is not limited in this application.

S106: The first card service application process performs drawing and rendering based on the JS bundle corresponding to the at least one card module, to obtain a first drawing result. The first drawing result may be understood as frames of images to form a UI of the first card.

S107: The first card service application process sends the first drawing result to the card container 1 of the first application process according to the address 1 through the IPC connection between the first card service application process and the first application process.

S108: The first application process displays the first card based on the first drawing result at the address 1 in the card container 1. In this way, the first device is able to present service content pushed by an application service provider to the user in a card form, so that different cards are pushed to the user based on different service scenarios. In addition, a card may be displayed on a same UI or different UIs in each application program. This is not limited in this application.

Therefore, the foregoing content may be used in both step 11 in scenario 1 and step 21 in scenario 2 to implement UI display of the first card.

In this application, the user may share a card module of the first card to the second application on the first device. A specific implementation of the card sharing method performed between different applications on a same device in this application is described in the following.

Figure 13A:
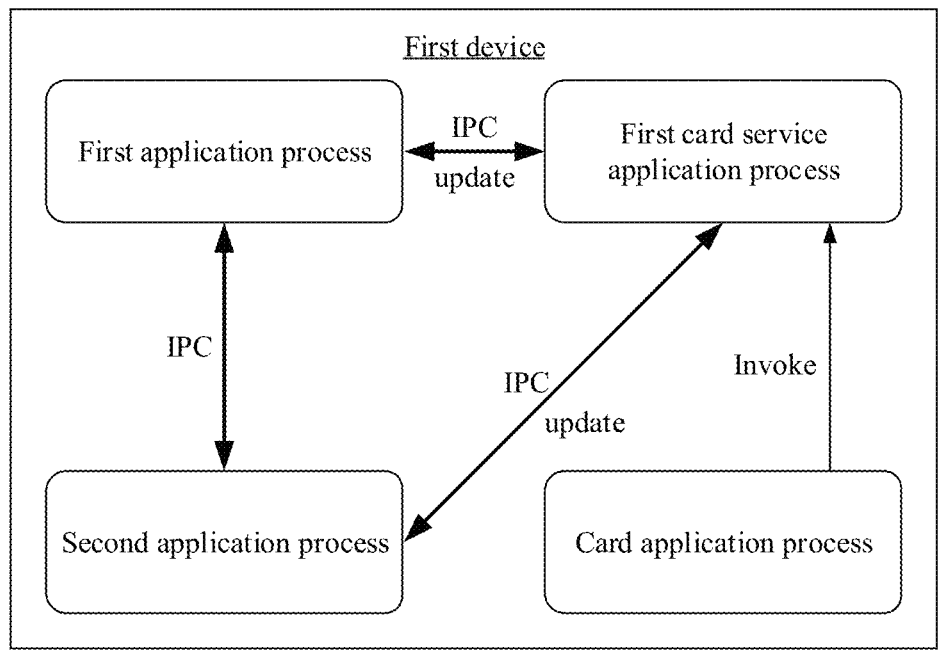
FIG. 13a and FIG. 13b are schematic diagrams of a software architecture for a scenario according to an embodiment of this application.
Figure 13B:
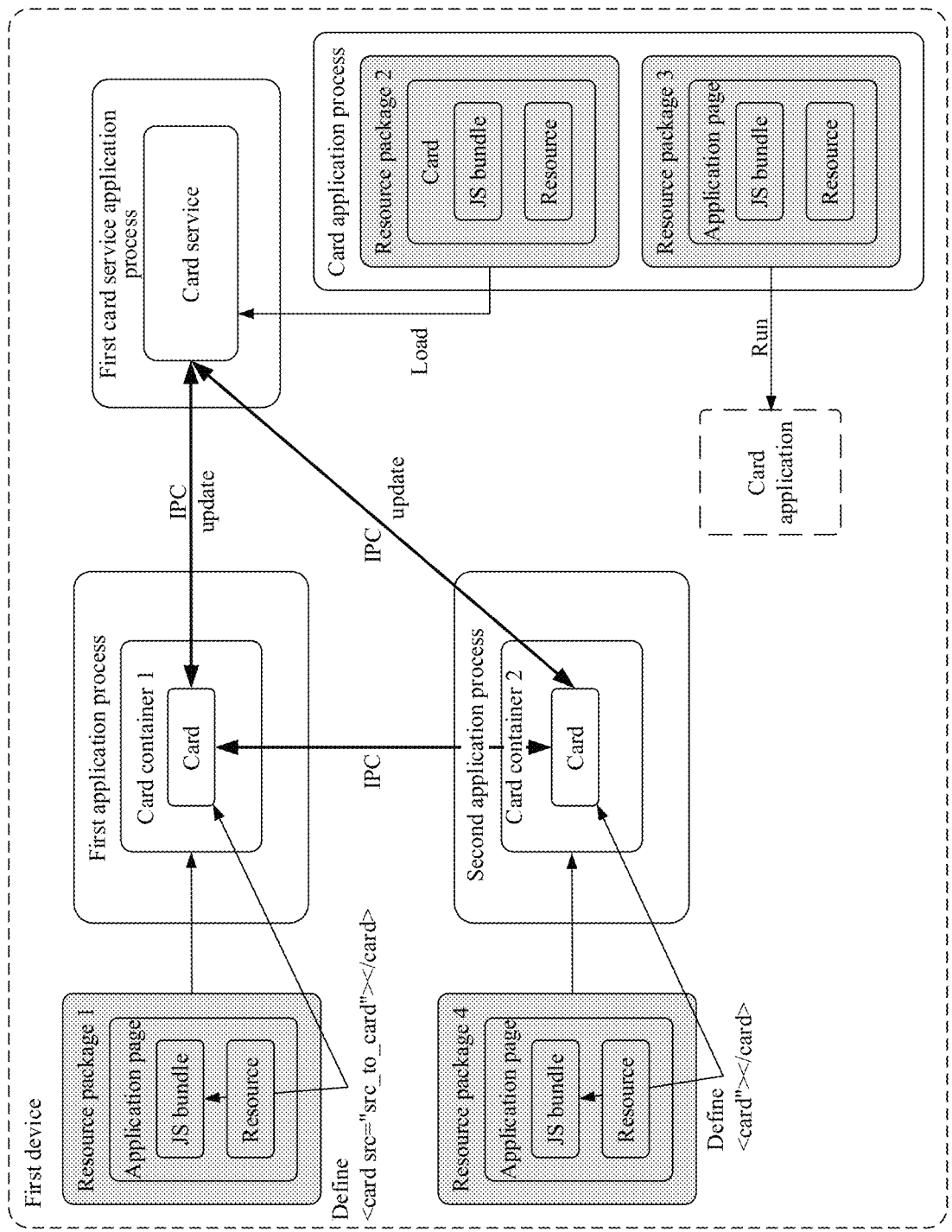
Figure 13C:
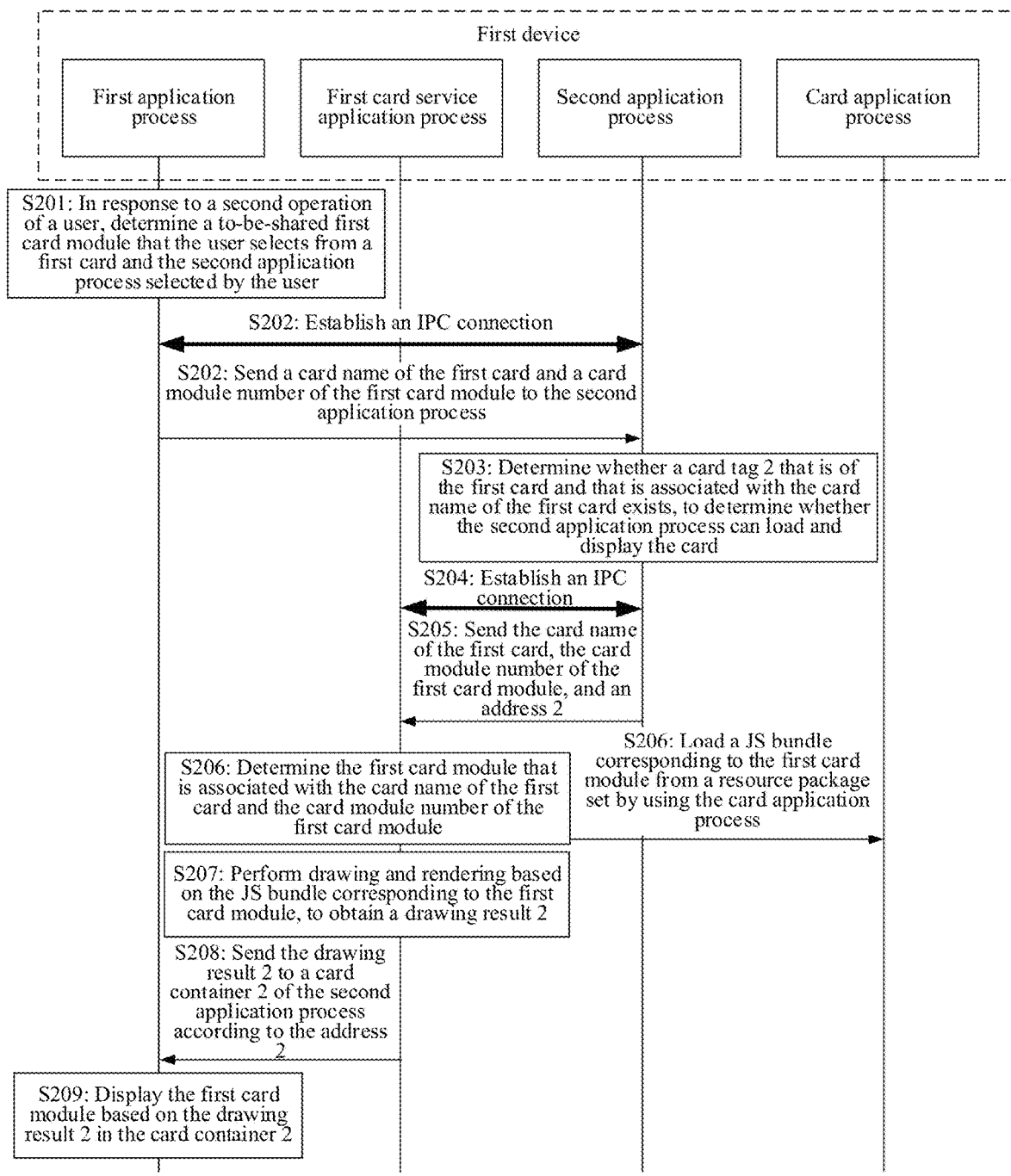
FIG. 13c is a signaling interaction diagram of a card sharing method according to an embodiment of this application.

Refer to FIG. 13a to FIG. 13c. An example is used in which a card is shared from the first application on the first device to the second application on the first device. FIG. 13a and FIG. 13b are schematic diagrams of a software architecture for a scenario according to an embodiment of this application. As shown in FIG. 13a and FIG. 13b, the first card service module on the first device may include the first application process, the first card service application process, the second application process, and the resource package set. For the first application process, the first card service application process, and the resource package set, refer to the description of FIG. 12a. Details are not described herein again.

The second application process is used to receive and display a shared card.

The second application process includes a resource package 4, a card tag 2, and a card container 2.

The resource package 4 is used to provide code for UI display and logic execution of an application page 2 of the second application. The resource package 4 includes a JS bundle and resource code that are corresponding to the application page 2 of the second application. The JS bundle is used to implement logic execution and UI display of the application page 2 of the second application. The resource code is used to provide the JS bundle with a source of data such as videos and pictures, for the UI display of the application page 2 of the second application. The application page 2 of the second application herein refers to a UI other than card UIs, that is, a UI displayed by using the JS bundle in the resource package 4.

The card tag 2 is used for embedding different cards or card modules. The card tag 2 carries no card name, so that the second application process uses the card tag 2 as a placeholder for loading and displaying a card reassembled with card modules recombined. For example, code in the second application process includes <card"></card>, where "card" indicates the card tag 2. In this case, the second application process may load and display a card reassembled with card modules recombined.

Based on the foregoing description, when implementing the UI display of the application page 2, the second application can also reserve at least one card slot for a card reassembled with card modules recombined, to implement a UI of the card reassembled with card modules recombined. For a specific implementation process, refer to the description of the UI of the application page 1 and the card tag 2 in the embodiment shown in FIG. 12a. Details are not described herein again.

In addition, the second application process may further include a card tag 1 that carries a card name, so that the second application process parses and loads a card corresponding to the card name based on the card tag 1. The card includes at least one card module. For example, code in the second application process includes <card src="src to card"></card>, where "card" indicates the card tag 1, and "src" indicates a card name. In this case, the second application process may load and display a card that includes all card modules.

The card container 2 is used to store a drawing result (one card is used for illustration in FIG. 13a). The drawing result may be understood as frames of images used to form a UI of a card. Interface resources of each card are usually stored in different storage space in the card container 2. In some embodiments, each card is corresponding to an address 2, so that the first card service application process transfers a drawing result to corresponding storage space in the card container 2 according to the address 2, and the second application is able to implement UI display of the card. Not only card display in a static picture form can be implemented, but also card display in a more complicated dynamic form can be implemented. A specific implementation form of the address 2 is not limited in this application. For example, the address 2 may be a start address of storage space for a card.

Based on the foregoing description, in addition to implementing a UI of the application page 2 and reserving at least one card slot for the card reassembled with card modules recombined, the second application can also implement a UI of at least one card. For a specific implementation process, refer to the description in the embodiment shown in FIG. 12a. Details are not described herein again.

In this application, an IPC connection may be established between the first application process and the second application process, to implement mutual communication between the first application process and the second application process. An IPC connection may be established between the first card service application process and the second application process, to implement mutual communication between the first card service application process and the second application process.

Based on the description of the embodiment shown in FIG. 13a and FIG. 13b, a specific implementation process of the card sharing method in this application is described in detail in the following, where the implementation process is executed by the first application process, the second application process, the card application process, and the first card service application process shown in FIG. 13a and FIG. 13b.

FIG. 13c is a signaling interaction diagram of a card sharing method according to an embodiment of this application. As shown in FIG. 13c, the card sharing method in this application may include steps S201 to S209.

If a user wants to share the first card or a card module of the first card embedded into the first application to the second application on the first device, the user may perform a second operation on a UI of the first card. The second operation is used to determine a to-be-shared card module that the user selects from the first card and the second application selected by the user. Then, steps S201 to S217 are performed to share, from the first application to the second application, the to-be-shared card module selected by the user from the first card. It should be noted that the user may select some card modules from the first card for sharing, or may select all card modules from the first card for sharing. This is not limited in this application.

S201: In response to the second operation of the user, the first application process determines a to-be-shared first card module that the user selects from the first card and the second application process selected by the user. The first card module may be at least one card module of the first card. The second operation may be associated with the first card module of the first card or associated with the first card module of the first card and a third card module of the first card, where the third card module is at least one non-recombinable card module. This is not limited in this application. In addition, the second operation may be further used to indicate the first device to share the first card module of the first card to the second application. Alternatively, the second operation may be further used to indicate the first device to share the first card module and the third card module of the first card to the second application.

S202: The first application process establishes an IPC connection between the first application process and the second application process, and sends a card name of the first card and a card module number of the first card module to the second application process through the IPC connection between the first application process and the second application process.

S203: The second application process determines whether a card tag 2 that is of the first card and that is associated with the card name of the first card exists, to determine whether the second application process can load and display the card. If the card tag 2 of the first card exists, the second application process determines that the second application process can load and display the card. If the card tag 2 of the first card does not exist, the second application process determines that the second application process cannot load and display the card.

S204: When determining that the second application process can load and display the card, the second application process establishes an IPC connection between the second application process and the first card service application process.

S205: The second application process sends the card name of the first card, the card module number of the first card module, and an address 2 to the first card service application process through the IPC connection between the second application process and the first card service application process.

S206: The first card service application process determines the first card module that is associated with the card name of the first card and the card module number of the first card module, and loads a JS bundle corresponding to the first card module from the resource package set by using the card application process.

S207: The first card service application process performs drawing and rendering based on the JS bundle corresponding to the first card module, to obtain a drawing result 2. The drawing result 2 may be understood as frames of images to form a UI of the first card module.

Based on a page size of the second application and a size of a display of the first device, the first card service application process may adaptively set parameters of each card module in the drawing result 2, such as a shape, a size, location layout, and presented content, so that aesthetic and clear UI display of the first card module can be implemented in the second application. In addition, a card module may be displayed on a same UI or different UIs in each application program. This is not limited in this application.

It should be noted that the drawing result 2 may also be used to form UIs of the first card module and the third card module.

S208: The first card service application process sends the drawing result 2 to the card container 2 of the second application process according to the address 2 through the IPC connection between the first card service application process and the second application process.

S209: The second application process displays the first card module based on the drawing result 2 in the card container 2. In this way, the first device is able to present, in a card form and through UI display, service content pushed by an application service provider, especially key information that is in the service content and that is frequently used by the user or requires cumbersome operations, to the user based on the user's wishes, so that different cards are pushed to the user based on different service scenarios.

In summary, based on card splitting and recombination of card modules, a card reassembled with card modules recombined can be shared between different application programs on a same device. In addition, by using a UI of a card, service content expected by a user can be provided for the user based on the user's wishes, especially key information that is in the service content and that is frequently used or requires cumbersome operations, which helps improve user experience.

In addition, because all the card modules of the first card can be determined based on the card name of the first card, in step S202, the first application process sends the card name of the first card to the second application process through the IPC connection between the first application process and the second application process, without sending card module numbers corresponding to all the card modules of the first card to the second application process. Therefore, the amount of data transmission is reduced. In step S205, the second application process sends the card name of the first card and the address 2 to the first card service application process through the IPC connection between the second application process and the first card service application process, without sending the card module numbers corresponding to all the card modules of the first card to the first card service application process. Therefore, the amount of data transmission is reduced.

In this way, an electronic device of a user is able to present, in a card form and through UI display, all service content pushed by an application service provider to the user based on the user's wishes, so that different cards are pushed to the user based on different service scenarios.

It should be noted that the first card may be shared to another process on the first device in addition to being shared to the minus one screen.

In some other embodiments, the user may drag the first card embedded into the first application on the first device to the second application on the first device. UIs of the card displayed in the first application and the second application may be the same or different. This is not limited in this application. For example, the user drags the first card displayed in the AI life application on the mobile phone to the minus one screen of the mobile phone, so that the UI of the first card can be displayed on the minus one screen. Therefore, abundant display channels are available for a card.

In some other embodiments, the user may drag a card that is reassembled with card modules recombined and that is in the second application on the first device to a third application on the first device. For a specific implementation process, refer to the foregoing content. UIs of the card displayed in the second application and the third application may be the same or different. This is not limited in this application. For example, the user drags a card that is shared to and displayed on the minus one screen of the mobile phone to a home screen of the mobile phone, so that a UI of the card can be displayed on the home screen.

In some embodiments, the user may stop card sharing by exiting the second application. When sharing a card to the second application, the first application process may also send sharing duration of the card to the first card service application process at the same time, allowing the first card service application process to support the second application in displaying the card, within the sharing duration of the card through address sharing, and to stop supporting the second application in displaying the card, outside the sharing duration of the card by stopping address sharing. This application is not limited to the foregoing two implementations of stopping card sharing. Therefore, the first application can revoke a service by stopping card sharing. In addition, the first card service application process can also implement updating of the drawing result 2 through address sharing.

In this application, a first device may share a card to a second device by using a plurality of implementations. With reference to two feasible implementations, a specific implementation of the card sharing method performed across devices in this application is described in the following.

Figure 14A:
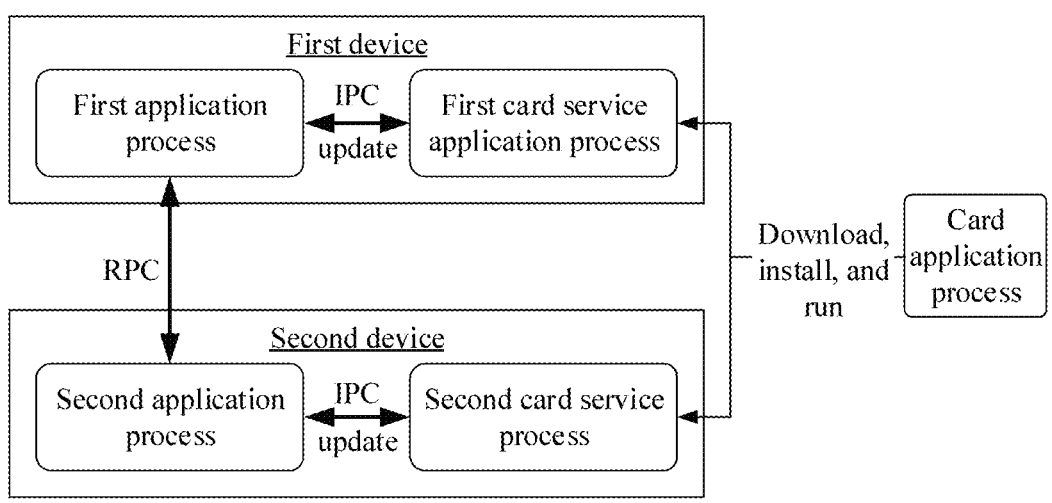
FIG. 14a and FIG. 14b are schematic diagrams of a software architecture for a scenario according to an embodiment of this application.
Figure 14B:
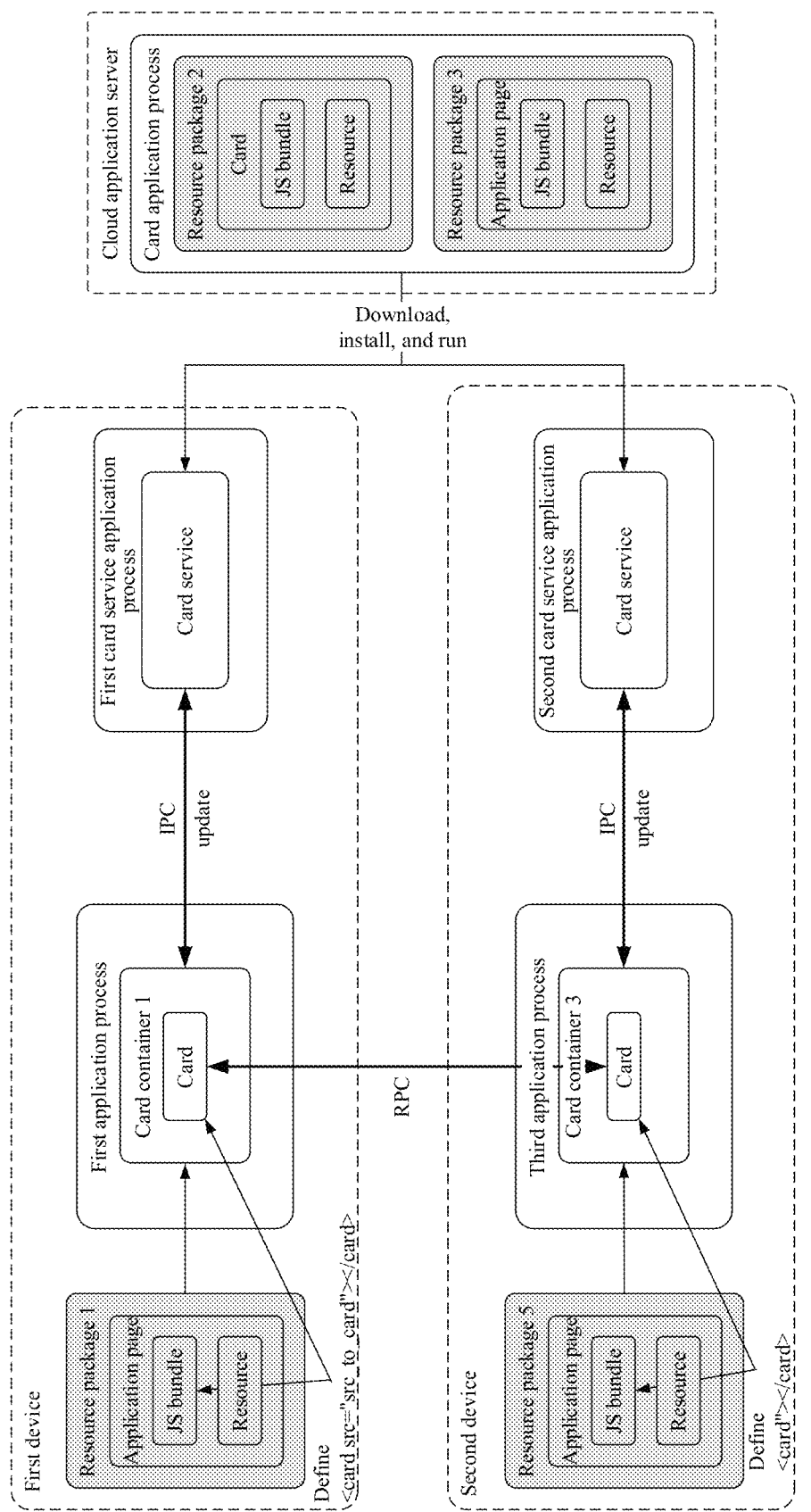

In one feasible implementation, referring to FIG. 14*a* to FIGS. 14*c*1 and 14*c*2, an example is used in which a card is shared from a first application on a first device to a third application on a second device. FIG. 14*a* and FIG. 14*b* are schematic diagrams of a software architecture for a scenario according to an embodiment of this application. As shown in FIG. 14*a* and FIG. 14*b*, a first card service module on the first device may include a first application process and a first card service application process, where the first card service module is located at the application program layer shown in FIG. 2*a*. A second card service module on the second device may include a third application process and a second card service application process, where the second card service module is located at the application program layer shown in FIG. 2*a*.

For specific implementation content of the first application process and the first card service application process, refer to the description in the embodiment shown in FIG. 12*a*. Details are not described herein again.

The third application process is used to receive and display a shared card.

The third application process includes a resource package 5, a card tag 2, and a card container 3.

The resource package 5 is used to provide code for UI display and logic execution of an application page 3 of the third application, that is, an interface resource. The resource package 5 includes a JS bundle and resource code that are corresponding to the application page 3 of the third application. The JS bundle is used to implement logic execution and UI display of the application page 3 of the third application. The resource code is used to provide the JS bundle with a source of data such as videos and pictures, for the UI display of the application page 3 of the third application. The application page 3 of the third application herein refers to a UI other than card UIs, that is, a UI displayed by using the JS bundle in the resource package 5.

The card tag 2 is used for embedding different cards or card modules. The card tag 2 carries no card name, so that the third application process uses the card tag 2 as a placeholder for loading and displaying a card reassembled with card modules recombined. For example, code in the third application process includes <card"></card>, where "card" indicates the card tag 2. In this case, the third application process may load and display a card reassembled with card modules recombined.

Based on the foregoing description, when implementing the UI display of the application page 3, the third application may reserve at least one card slot for a card reassembled with card modules recombined at the same time, to implement a UI of the card reassembled with card modules recombined. For a specific implementation process, refer to the description of the UI of the application page 1 and the card tag 2 in the embodiment shown in FIG. 12*a*. Details are not described herein again.

In addition, the third application process may further include a card tag 1 that carries a card name, so that the third application process parses and loads a card corresponding to the card name based on the card tag 1. The card includes at least one card module. For example, code in the third application process includes <card src="src to card"></card>, where "card" indicates the card tag 1, and "src" indicates a card name. In this case, the third application process may load and display a card that includes all card modules.

The card container 3 is used to store a drawing result (one card is used for illustration in FIG. 14*b*). The drawing result may be understood as frames of images used to form a UI of a card. Interface resources of each card are usually stored in different storage space in the card container 3. In some embodiments, each card is corresponding to an address 3, so that the first card service application process transfers a drawing result to corresponding storage space in the card container 3 according to the address 3, and the third application is able to implement UI display of the card. Not only card display in a static picture form can be implemented, but also card display in a more complicated dynamic form can be implemented. A specific implementation form of the address 3 is not limited in this application. For example, the address 3 may be a start address of storage space for a card.

Based on the foregoing description, in addition to implementing a UI of the application page 3 and reserving at least one card slot for the card reassembled with card modules recombined, the third application may implement a UI of at least one card at the same time. For a specific implementation process, refer to the description in the embodiment shown in FIG. 12*a*. Details are not described herein again.

The second card service application process is used to provide a service that drives UI display and logic execution of a card. In other words, the second card service application process loads a JS bundle from a card application process, and performs drawing and rendering based on the JS bundle to obtain a drawing result 2. Therefore, the second card service application process transfers the drawing result 2 to the third application process, to implement UI display of the card. That is, the second card service application process and the first application process, or the second card service application process and a third application process implement UI display of the card through address sharing. The second card service application process is corresponding to a second card service application on the second device.

In this application, a remote procedure call (remote procedure call, RPC) connection may be established between the first application process and the third application process, to implement mutual communication between the first application process and the third application process. An IPC connection may be established between the first card service application process and the first application process, to implement mutual communication between the first card service application process and the first application process. An IPC connection may be established between the second card service application process and the third application process, to implement mutual communication between the second card service application process and the third application process.

In addition, both the first device and the second device may install a resource package set that is corresponding to a card application process and that is from, for example, a cloud application server. For specific implementation content of the card application process and the resource package set, refer to the description in the embodiment shown in FIG. 12*a*. Details are not described herein again. It should be noted that resource package sets on the first device and the second device may be the same or different. This is not limited in this application. For ease of description, an example in which the resource package sets on the first device and the second device are the same is used for illustration in FIG. 14*a* and FIG. 14*b*.

Based on the description of the embodiment shown in FIG. 14*a* and FIG. 14*b*, a specific implementation process of the card sharing method in this application is described in detail in the following, where the implementation process is executed by the first application process, the first card service application process, the third application process, the second card service application process, and the card application process shown in FIG. 14*a* and FIG. 14*b*.

FIGS. 14*c*1 and 14*c*2 are a signaling interaction diagram of a card sharing method according to an embodiment of this application. As shown in FIGS. 14*c*1 and 14*c*2, the card sharing method in this application may include steps S301 to S310.

If a user wants to share a first card or a card module of a first card embedded into the first application to the third application on the second device, the user may perform a second operation on a UI of the first card. The second operation is used to determine a to-be-shared card module that the user selects from the first card, and the second device and the third application process that are selected by the user. Then, steps S301 to S310 are performed to share, from the first application process to the third application process on the second device, the to-be-shared card module selected by the user from the card. It should be noted that the user may select some card modules from the first card for sharing, or may select all card modules from the first card for sharing. This is not limited in this application.

S301: In response to the second operation of the user, the first application process determines a to-be-shared first card module that the user selects from the first card, and the second device (for example, determining a unique identifier, such as a device number of the second device) and the third application process (for example, determining a unique identifier, such as a name or a number of the third application process) that are selected by the user. The first card module may be at least one card module of the first card. The second operation may be associated with the first card module of the first card or associated with the first card module of the first card and a third card module of the first card, where the third card module is at least one non-recombinable card module. This is not limited in this application. In addition, the second operation may be further used to indicate the first device to share the first card module of the first card to the third application on the second device. Alternatively, the second operation may be further used to indicate the first device to share the first card module and the third card module of the first card to the third application on the second device.

S302: The first application process establishes an RPC connection between the first application process and the third application process, and sends a card name of the first card and a card module number of the first card module to the third application process through the RPC connection between the first application process and the third application process.

S303: The third application process queries with the card name of the first card whether a card service module on the second device includes a resource package set. The resource package set stores the first card corresponding to the card name.

If there is no resource package set, step S304 is performed. If there is a resource package set, steps S305 to S310 are performed.

Implementation of step S303 is similar to that of step S101 in the embodiment shown in FIG. 12*b*. This is not limited in this application.

S304: The third application process proceeds with no processing, and is unable to display the card.

S305: The third application process establishes an IPC connection between the third application process and the second card service application process.

In some embodiments, the second card service application process is inactive by default when no card is displayed. In this case, in step S305, the third application may activate the second card service application process, thereby reducing resource overheads.

In some other embodiments, the second card service application process is active by default when no card is displayed. In this case, in step S305, the third application process does not need to activate the second card service application process.

S306: The third application process sends the card name of the first card, the card module number of the first card module, and an address 3 to the second card service application process through the IPC connection between the third application process and the second card service application process.

S307: The second card service application process determines the first card module associated with the card name of the first card and the card module number of the first card module, and loads a JS bundle corresponding to the first card module from the card application process.

S308: The second card service application process performs drawing and rendering based on the JS bundle corresponding to the first card module, to obtain a drawing result 2. The drawing result 2 may be understood as frames of images to form a UI of the first card module.

S309: The second card service application process sends the drawing result 2 to the card container 3 of the third application process according to the address 3 through the IPC connection between the second card service application process and the third application process.

S310: The third application process displays the first card module based on the drawing result 2 in the card container 3. In this way, the second device is able to present, in a card form and through UI display, service content pushed by an application service provider, especially key information that is in the service content and that is frequently used by the user or requires cumbersome operations, to the user based on the user's wishes, so that a card can be quickly shared from the first device to the second device, and cards are pushed to different users based on different service scenarios.

In summary, based on card splitting and recombination of card modules, a card reassembled with card modules recombined can be shared between different devices. In addition, based on a user's wishes, service content that the user wants to share can be quickly shared to other users in a card form, which also satisfies control requirements of the other users for a device. For example, family members all have control rights to a device, or temporary control requirements of guests for a home device are satisfied. This helps improve user experience.

In addition, because all the card modules of the first card can be determined based on the card name of the first card, in step S302, the first application process sends the card name of the first card to the third application process through the RPC connection between the first application process and the third application process, without sending card module numbers corresponding to all the card modules of the first card to the third application process. Therefore, the amount of data transmission is reduced. In step S306, the third application process sends the card name of the first card and the address 3 to the second card service application process through the IPC connection between the third application process and the second card service application process, without sending the card module numbers corresponding to all the card modules of the first card to the second card service application process. Therefore, the amount of data transmission is reduced.

In this way, an electronic device of a user is able to present, in a card form and through UI display, all service content pushed by an application service provider to users based on the user's wishes, so that different cards are pushed to the users based on different service scenarios.

It should be noted that a card may further be shared to other devices than an in-vehicle device. Reference may be made to the foregoing content for details, which are not described herein again. In addition, the second device may further share the card to another device. For a specific implementation process, refer to the foregoing content. In addition, the user may drag a card reassembled with card modules recombined on the second device to another application on the second device or another device. For a specific implementation process, refer to the foregoing content.

In some embodiments, the user may stop card sharing by exiting the third application. When sharing a card to the third application, the first application process may also send sharing duration of the card to the third application process at the same time, allowing the first card service application process to support the second application in displaying the card, within the sharing duration of the card through address sharing, and to stop supporting the second application in displaying the card, outside the sharing duration of the card by stopping address sharing. This application is not limited to the foregoing two implementations of stopping card sharing. Therefore, the first application can revoke a service by stopping card sharing. In addition, the second card service application process can also implement updating of the drawing result 2 through address sharing.

Figure 15A:
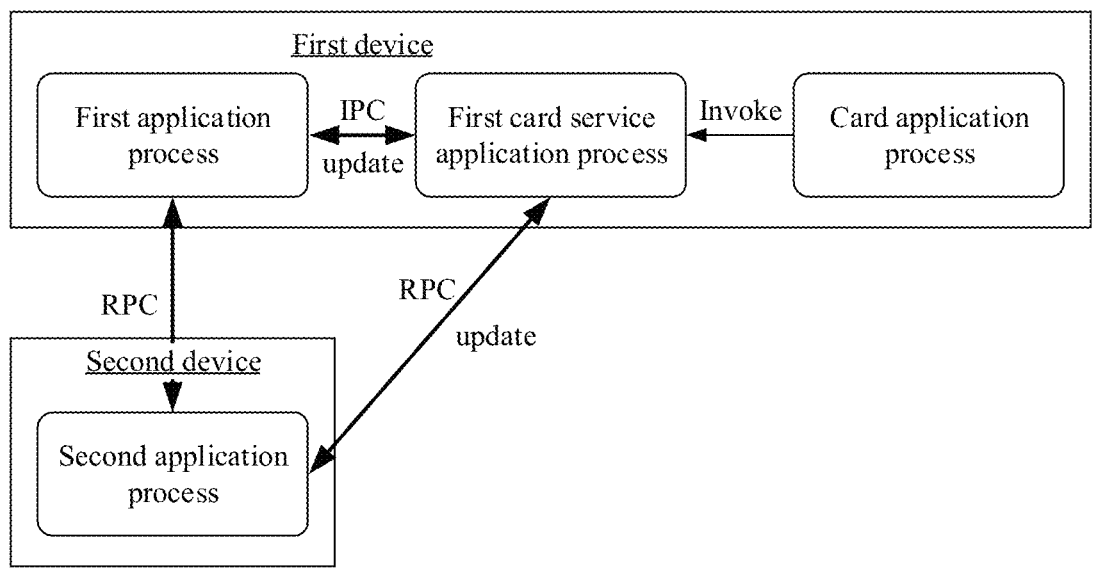
FIG. 15a and FIG. 15b are schematic diagrams of a software architecture for a scenario according to an embodiment of this application.
Figure 15B:
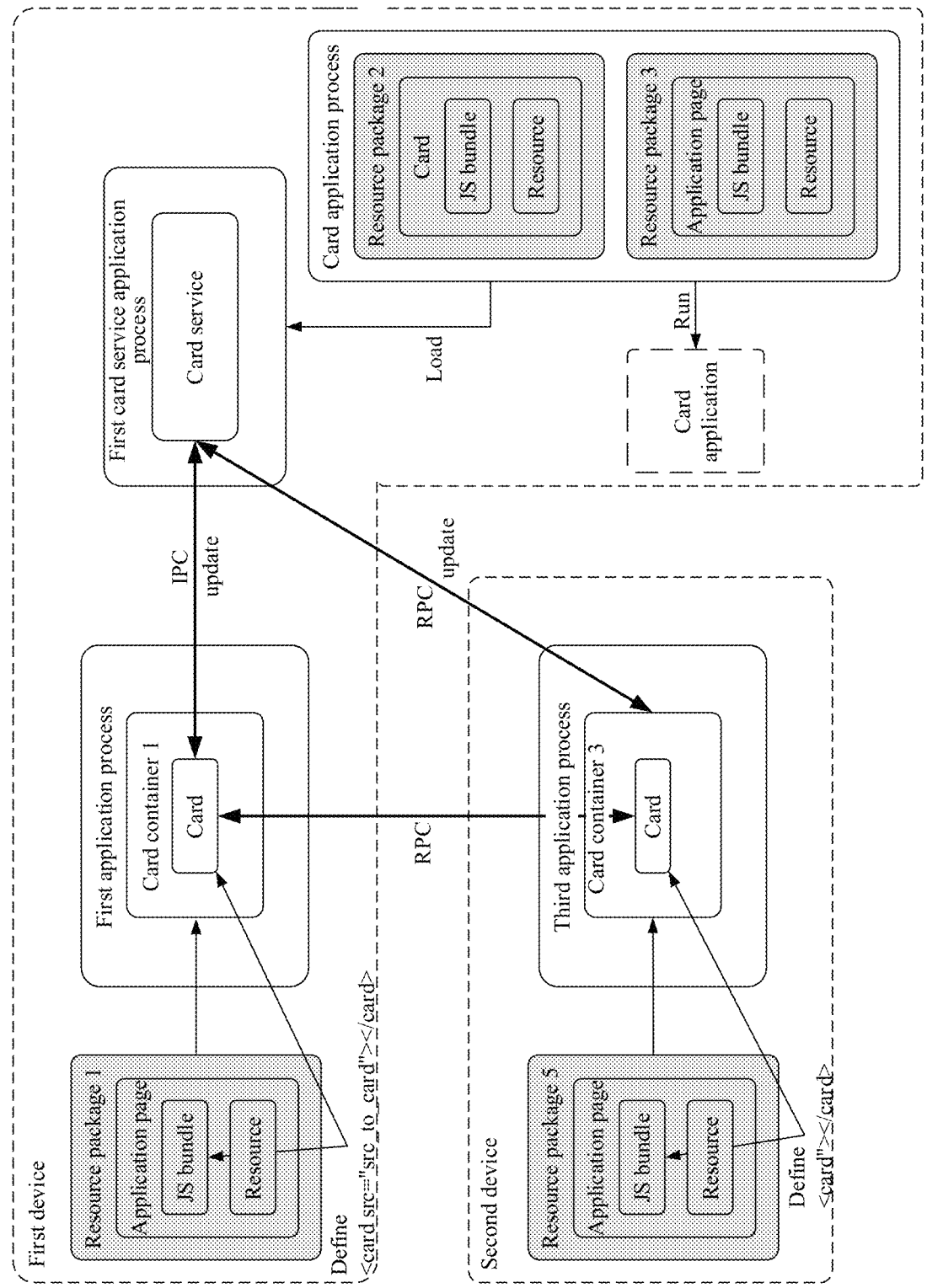

In another feasible implementation, referring to FIG. 15*a* to FIGS. 15*c*1 and 15*c*2, an example is used in which a card is shared from a first application on a first device to a third application on a second device. FIG. 15*a* and FIG. 15*b* are schematic diagrams of a software architecture for a scenario according to an embodiment of this application. As shown in FIG. 15*a* and FIG. 15*b*, a first card service module on the first device may include a first application process, a card application process, and a first card service application process, where the first card service module is located at the application program layer shown in FIG. 2*a*. A second card service module on the second device may include a third application process, where the second card service module is located at the application program layer shown in FIG. 2*a*.

For specific implementations of the first application process, the card application process, and the first card service application process, refer to the description in the embodiment shown in FIG. 12*a*. Details are not described herein again. For a specific implementation of the third application process, refer to the description in the embodiment shown in FIG. 14*a* and FIG. 14*b*. Details are not described herein again.

In this application, an RPC connection may be established between the first application process and the third application process, to implement mutual communication between the first application process and the third application process. An IPC connection may be established between the first card service application process and the first application process, to implement mutual communication between the first card service application process and the first application process. An RPC connection may be established between the first card service application process and the third application process, to implement mutual communication between the first card service application process and the third application process.

Based on the description of the embodiment shown in FIG. 15*a* and FIG. 15*b*, a specific implementation process of the card sharing method in this application is described in detail in the following, where the implementation process is executed by the first application process, the third application process, the card application process, and the first card service application process shown in FIG. 15*a* and FIG. 15*b*.

FIGS. 15*c*1 and 15*c*2 are a signaling interaction diagram of a card sharing method according to an embodiment of this application. As shown in FIGS. 15*c*1 and 15*c*2, the card sharing method in this application may include steps S401 to S409.

If a user wants to share a first card or a card module of a first card embedded into the first application to the third application on the second device, the user may perform a second operation on a UI of the first card. The second operation is used to determine a to-be-shared card module that the user selects from the first card, and the second device and the third application process that are selected by the user. Then, steps S401 to S409 are performed to share, from the first application process to the third application process on the second device, the to-be-shared card module selected by the user from the first card. It should be noted that the user may select some card modules from the first card for sharing, or may select all card modules from the first card for sharing. This is not limited in this application.

S401: In response to the second operation of the user, the first application process determines a to-be-shared first card module that the user selects from the first card, and the second device and the third application process that are selected by the user. The first card module may be at least one card module of the first card. The second operation may be associated with the first card module of the first card or associated with the first card module of the first card and a third card module of the first card, where the third card module is at least one non-recombinable card module. This is not limited in this application. In addition, the second operation may be further used to indicate the first device to share the first card module of the first card to the third application on the second device. Alternatively, the second operation may be further used to indicate the first device to share the first card module and the third card module of the first card to the third application on the second device.

S402: The first application process establishes an RPC connection between the first application process and the third application process, and sends a card name of the first card and a card module number of the first card module to the third application process through the RPC connection between the first application process and the third application process.

S403: The third application process determines whether a card tag 2 that is of the first card and that is associated with the card name of the first card exists, to determine whether the third application process can load and display the card. If the card tag 2 of the first card exists, the third application process determines that the third application process can load and display the card. If the card tag 2 of the first card does not exist, the third application process determines that the third application process cannot load and display the card.

S404: When determining that the third application process can load and display the card, the third application process establishes an RPC connection between the third application process and the first card service application process.

S405: The third application process sends the card name of the first card, the card module number of the first card module, and an address 3 to the first card service application process through the RPC connection between the third application process and the first card service application process.

S406: The first card service application process determines a card module associated with the card name of the first card and the card module number of the first card module, and loads a JS bundle corresponding to the first card module from the card application process.

S407: The first card service application process performs drawing and rendering based on the JS bundle corresponding to the first card module, to obtain a drawing result 2.

S408: The first card service application process sends the drawing result 2 to the card container 3 of the third application process according to the address 3 through the RPC connection between the first card service application process and the third application process.

S409: The third application process displays the first card module based on the drawing result 2 in the card container 3. In this way, the second device is able to present, in a card form and through UI display, service content pushed by an application service provider, especially key information that is in the service content and that is frequently used by the user or requires cumbersome operations, to the user based on the user's wishes, so that a card can be quickly shared from the first device to the second device, and cards are pushed to different users based on different service scenarios.

In summary, based on card splitting and recombination of card modules, a card reassembled with card modules recombined can be shared between different devices. In addition, based on a user's wishes, service content that the user wants to share can be quickly shared to other users in a card form, which also satisfies control requirements of the other users for a device. For example, family members all have control rights to a device, or temporary control requirements of guests for a home device are satisfied. This helps improve user experience.

In addition, because all card modules of a card can be determined based on a card name of the card, in step S402, the first application process sends the card name of the first card to the third application process through the RPC connection between the first application process and the third application process, without sending card module numbers corresponding to all the card modules of the first card to the third application process. Therefore, the amount of data transmission is reduced. In step S405, the third application process sends the card name of the first card and the address 3 to the first card service application process through the RPC connection between the third application process and the first card service application process, without sending the card module numbers corresponding to all the card modules of the first card to the first card service application process. Therefore, the amount of data transmission is reduced.

In summary, a card that includes all card modules may be shared between different devices, so that abundant UI display channels are available for a card, and cards are pushed to different users based on different service scenarios.

It should be noted that a card may further be shared to other devices than an in-vehicle device. Reference may be made to the foregoing content for details, which are not described herein again. In addition, the second device may further share the card to another device. For a specific implementation process, refer to the foregoing content.

In some embodiments, the user may stop card sharing by exiting the third application. When sharing a card to the third application, the first application process may send sharing duration of the card to the first card service application process at the same time, allowing the first card service application process to support the second application in displaying the card, within the sharing duration of the card through address sharing, and to stop supporting the second application in displaying the card, outside the sharing duration of the card by stopping address sharing. This application is not limited to the foregoing two implementations of stopping card sharing. Therefore, the first application can revoke a service by stopping card sharing. In addition, the first card service application process can also implement updating of the drawing result 2 through address sharing.

Based on some embodiments above, the card sharing method provided in this application is described in the following.

For example, this application provides a card sharing method.

The card sharing method in this application may include step 21 to step 23.

Step 21: Display an interface of a first application in response to a first operation of a user. A first card is displayed on the interface of the first application, the first card includes a first card module and a second card module, and interface resources of the first card are provided by a second application.

Step 22: Send a second message to a third application in response to a second operation of the user. The second operation is associated with the first card module, and the second message includes an identifier of the first card module.

Step 23: Display an interface of the third application. The first card module is displayed on the interface of the third application, and interface resources of the first card module are provided by a fourth application.

In this application, step 21 to step 23 is applicable to a scenario of card sharing between different application programs on a same device, and is also applicable to a scenario of card sharing across devices.

In the scenario of card sharing between different application programs on a same device, the first application, the second application, and the third application are different application programs on a first device. A first application process is corresponding to the first application. A second application process is corresponding to the second application. A third application process is corresponding to the third application. A fourth application process is corresponding to a fourth application. The second application and the fourth application are a same application program. The second application process and the fourth application process are a same application program process.

Specifically, step 21 is executed by the first application process; step 22 is executed by the first application process; and step 23 is executed by the third application process. For a specific implementation process, refer to the descriptions of FIG. 3a to FIG. 3l, FIG. 12a and FIG. 12b, and FIG. 13a to FIG. 13c, or refer to the description of displaying the first card in the first application and the description of sharing the first card from the first application to the second application in scenario 1. Details are not described herein again.

The first operation may include but is not limited to at least one operation of tap, touch and hold, swipe, and the like performed by the user. Parameters such as type and operation times of the first operation are not limited in this application, provided that the first application can respond to the first operation of the user and implement displaying of the first card.

The interface resources of the first card may be understood as resources such as code, a video, and data that are separately required for logic execution and UI display of displaying the first card module and the second card module, that is, a JS bundle and resource code that are corresponding to the first card module and the second card module each. For specific content, refer to the foregoing description. Details are not described herein again.

The second application is corresponding to the first card service application in the foregoing embodiment.

The second operation may include but is not limited to at least one operation of tap, touch and hold, swipe, and the like performed by the user. Parameters such as type and operation times of the second operation are not limited in this application. In addition, the second operation is associated with the first card module, so that the first application may respond to the second operation of the user and determine the first card module selected for sharing from the first card and a sharing object (that is, the second application).

A specific representation manner of the second message is not limited in this application. For example, the second message may further include an identifier of the second application, an identifier of the first card, and/or the like in addition to the identifier of the first card module.

The interface resources of the first card module may be understood as resources such as code, a video, and data that are required for logic execution and UI display of displaying the first card module, that is, a JS bundle and resource code that are corresponding to the first card module. For specific content, refer to the foregoing description. Details are not described herein again.

The fourth application is corresponding to the first card service application in the foregoing embodiment.

In a case of card sharing across devices, the first application and the second application are different application programs on the first device. The third application and the fourth application are different application programs on a second device. The first device is different from the second device. The first application process is corresponding to the first application. A second application process is corresponding to the second application. A third application process is corresponding to the third application. A fourth application process is corresponding to a fourth application.

Specifically, step 21 is executed by the first application process; step 22 is executed by the first application process; and step 23 is executed by the third application process. For a specific implementation process, refer to the descriptions of FIG. 3a to FIG. 3l, FIG. 12a and FIG. 12b, and FIG. 13a to FIG. 13c, or refer to the description of displaying the first card in the first application and the description of sharing the first card from the first application to the second application in one feasible implementation in scenario 2. Details are not described herein again.

The first operation may include but is not limited to at least one operation of tap, touch and hold, swipe, and the like performed by the user. Parameters such as type and operation times of the first operation are not limited in this application, provided that the first application can respond to the first operation of the user and implement displaying of the first card.

The interface resources of the first card may be understood as resources such as code, a video, and data that are separately required for logic execution and UI display of displaying the first card module and the second card module, that is, a JS bundle and resource code that are corresponding to the first card module and the second card module each. For specific content, refer to the foregoing description. Details are not described herein again.

The second application is corresponding to the first card service application in the foregoing embodiment.

The second operation may include but is not limited to at least one operation of tap, touch and hold, swipe, and the like performed by the user. Parameters such as type and operation times of the second operation are not limited in this application. In addition, the second operation is associated with the first card module, so that the first application may respond to the second operation of the user and determine the first card module selected for sharing from the first card and a sharing object (that is, the second application).

A specific representation manner of the second message is not limited in this application. For example, the second message may further include at least one of a device identifier of the second device, an identifier of the second application, an identifier of the first card, or the like in addition to the identifier of the first card module.

The interface resources of the first card module may be understood as resources such as code, a video, and data that are required for logic execution and UI display of displaying the first card module, that is, a JS bundle and resource code that are corresponding to the first card module. For specific content, refer to the foregoing description. Details are not described herein again.

The fourth application is corresponding to the second card service application in the foregoing embodiment.

In a case of card sharing across devices, the first application and the second application are different application programs on a first device. The third application is a different application program on a second device. The first device is different from the second device. The first application process is corresponding to the first application. A second application process is corresponding to the second application. A third application process is corresponding to the third application. A fourth application process is corresponding to the fourth application. The second application and the fourth application are a same application program. The second application process and the fourth application process are a same application program process.

Specifically, step 21 is executed by the first application process; step 22 is executed by the first application process; and step 23 is executed by the third application process. For a specific implementation process, refer to the descriptions of FIG. 3a to FIG. 3l, FIG. 12a and FIG. 12b, and FIG. 13a to FIG. 13c, or refer to the description of displaying the first card in the first application and the description of sharing the first card from the first application to the second application in one feasible implementation in scenario 2. Details are not described herein again.

The first operation may include but is not limited to at least one operation of tap, touch and hold, swipe, and the like performed by the user. Parameters such as type and operation times of the first operation are not limited in this application, provided that the first application can respond to the first operation of the user and implement displaying of the first card.

The interface resources of the first card may be understood as resources such as code, a video, and data that are separately required for logic execution and UI display of displaying the first card module and the second card module, that is, a JS bundle and resource code that are corresponding to the first card module and the second card module each. For specific content, refer to the foregoing description. Details are not described herein again.

The second application is corresponding to the first card service application in the foregoing embodiment.

The second operation may include but is not limited to at least one operation of tap, touch and hold, swipe, and the like performed by the user. Parameters such as type and operation times of the second operation are not limited in this application. In addition, the second operation is associated with the first card module, so that the first application may respond to the second operation of the user and determine the first card module selected for sharing from the first card and a sharing object (that is, the second application).

A specific representation manner of the second message is not limited in this application. For example, the second message may further include at least one of a device identifier of the second device, an identifier of the second application, an identifier of the first card, or the like in addition to the identifier of the first card module.

The interface resources of the first card module may be understood as resources such as code, a video, and data that are required for logic execution and UI display of displaying the first card module, that is, a JS bundle and resource code that are corresponding to the first card module. For specific content, refer to the foregoing description. Details are not described herein again.

The fourth application is corresponding to the first card service application in the foregoing embodiment.

In some embodiments, the first card further includes a third card module, the third card module is also displayed on the interface of the third application, and interface resources of the third card module are provided by the fourth application.

The first card module and the second card module may be set to recombinable card modules, such as the card module 2 to card module 6 of the first card that are mentioned above. The third card module may be set to a non-recombinable card module, such as the card module 1 of the first card that is mentioned above.

In step 22, based on that the second operation is associated with the first card module, the third card module and the second card module belong to the first card, and the third card module is a non-recombinable card module, the first application may determine the second card module and the third card module, so that the first application can send the second message to the third application, where the second message includes the identifier of the first card module and an identifier of the third card module. Therefore, in step 23, the first card module and the third card module are displayed on the interface of the third application.

In step 22, based on that the second operation is associated with the first card module, the first application may determine the second card module, so that the first application can send the second message to the third application, where the second message includes the identifier of the first card module. Therefore, in step 23, based on that the third card module and the second card module belong to the first card, and the third card module is a non-recombinable card module, the first card module and the third card module are displayed on the interface of the third application.

In summary, in this application, the card may be set with a property of being recombinable, or with a property of being non-recombinable. For example, a card module used to indicate service content of a card, key information of a card, or the like is set to be a non-recombinable card module. Therefore, in response to the second operation of the user the first application process may determine that the second card module and the third card module need to be displayed on the interface of the third application; or the third application may determine, based on the identifier of the first card module in the second message, that the second card module and the third card module need to be displayed on the interface of the third application. For a specific implementation process, refer to the description of FIG. 3a to FIG. 3d and the description in the explanation of a card. Details are not described herein again. Therefore, card sharing is facilitated.

In a feasible implementation of step 21, a specific implementation process of the displaying an interface of a first application in response to a first operation of a user may include step 31 to step 33.

Step 31: Send a first message to the second application process.

Step 32: Receive a first drawing result from the second application process. The first drawing result is obtained by rendering and drawing by the second application process based on the interface resources of the first card. The interface resources of the first card are obtained by invoking by the second application process from a resource package set based on the first message. The resource package set includes interface resources of the first card module, the second card module, and the third card module that are in the first card, and interface resources of a fourth card module and a fifth card module that are in a second card.

Step 33: Display the first card on the interface of the first application based on the first drawing result.

In this application, step 31 to step 33 are executed by the first device. Specifically, step 31 to step 33 are executed by the first application process. For a specific implementation process, refer to the description of FIG. 3a to FIG. 3d and the description of steps S101 to S108 in FIG. 12a and FIG. 12b, or refer to the description of displaying the first card in the first application. Details are not described herein again.

Specific content of the first message is not limited in this application.

In some embodiments, the first message may include the identifier of the first card, for example, a card name of the first card. Therefore, on a basis that the first card and the first card module and the second card module that are of the first card are determined by the second application process, the amount of data transmission between the first application process and the second application process is reduced.

In some embodiments, the first message may include the identifier of the first card, the identifier of the first card module, and the identifier of the second card module, for example, a card name of the first card, a card module number of the first card module, and a card module number of the second card module. Therefore, the second application process quickly determines the first card module and the second card module that are of the first card.

In some embodiments, the first message may further include a first address. Therefore, the first application process receives, from the second application process, the first drawing result sent to the first address. Address sharing not only allows the second application process to provide the first drawing result, but also allows the first application process to display the interface of the first application by using the first drawing result.

Specific representation content of the first address is not limited in this application. For example, refer to the address 1 mentioned above. It should be noted that the first address may be notified by the first application process to the second application process, and may also be notified by the second application process to the first application process. Alternatively, the first address is determined by an operating system on the first device, and is notified to the first application process and the second application process. This is not limited in this application.

In some embodiments, the method further includes: when the first device has a resource package set, sending a first message to the second application process. For specific implementation content, refer to the description of step S101 in FIG. 12b. Details are not described herein again. Therefore, when the first device does not have any resource package set, the second application process is unable to invoke the interface resources of the first card from the resource package set. Therefore, the method helps reduce unnecessary operations performed by the first device, thereby reducing power consumption of the first device, and also allows the first device to download a resource package set in a timely manner for quickly implementing card sharing.

In a feasible implementation of step 22, a specific implementation process of the sending a second message to a third application in response to a second operation of the user may include step 41 to step 43.

Step 41: Send a third message to the fourth application process.

Step 42: Receive a second drawing result from the fourth application process. The second drawing result is obtained by rendering and drawing by the fourth application process based on the interface resources of the first card module. The interface resources of the first card module are obtained by invoking by the fourth application process from the resource package set based on the third message. The resource package set includes the interface resources of the first card module, the second card module, and the third card module that are in the first card, and the interface resources of the fourth card module and the fifth card module that are in the second card.

Step 43: Display the first card module on the interface of the third application based on the second drawing result.

In this application, step 41 to step 43 are executed by the first device. Specifically, step 41 to step 43 are executed by the first application process. For a specific implementation process, refer to the description of FIG. 3a to FIG. 3l, the description of steps S201 to S209 in FIG. 13a to FIG. 13c, the description of steps S301 to S310 in FIG. 14a to FIGS. 14c1 and 14c2, and the description of steps S401 to S409 in FIG. 15a to FIGS. 15c1 and 15c2, or refer to the description of sharing the first card from the first application to the third application. Details are not described herein again.

Specific content of the third message is not limited in this application.

In some embodiments, the third message may include the identifier of the first card and the identifier of the first card module, for example, the card name of the first card and the card module number of the first card module. Therefore, the fourth application process quickly determines the first card module of the first card.

In some embodiments, the third message may further include a second address. Therefore, the third application process receives, from the fourth application process, the second drawing result sent to the second address. Address sharing not only allows the fourth application process to provide the second drawing result, but also allows the third application process to display the interface of the third application by using the second drawing result.

Specific representation content of the second address is not limited in this application. For example, refer to the address 2 or address 3 mentioned above. It should be noted that the second address may be notified by the third application process to the fourth application process, and may also be notified by the fourth application process to the third application process. Alternatively, the second address is determined by an operating system on the second device or the first device, and is notified to the third application process and the fourth application process. This is not limited in this application.

In some embodiments, the method may further include: when it is determined that the third application process is capable of displaying a card, sending the third message to the fourth application process. For specific implementation content, refer to the descriptions of step S201 in FIG. 13c, step S301 in FIGS. 14c1 and 14c2, and step S401 in FIGS. 15c1 and 15c2. Details are not described herein again. Therefore, when the third application process is incapable of displaying a card, the third application process is unable to send the third message to the fourth application process.

Therefore, the method helps reduce unnecessary operations performed by a device on which the third application process is located, thereby reducing power consumption of the device on which the third application process is located, and allows the device on which the third application process is located to notify the user in a timely manner that the first application is unable to share a card to the third application.

In some embodiments, the resource package set further includes interface resources of a fifth application. For the fifth application, refer to the card application mentioned above. Details are not described herein again. Therefore, resource support is provided for implementing interface display of the fifth application.

In some embodiments, the interface of the first application includes a first region and a second region. The first card is located in the first region. A first application page is located in the second region. Interface resources of the first application page are provided by the first application. For specific implementation content, refer to the descriptions of FIG. 10b and FIG. 11. Details are not described herein again.

In some embodiments, the first application includes any one of a home screen, a minus one screen, a control center, a notification center, or an AI life application.

In some embodiments, the third application includes any one of a home screen, a minus one screen, a control center, a notification center, or an AI life application.

For example, this application further provides an electronic device. The electronic device may include at least one memory and at least one processor. The memory is configured to store program instructions. The processor is configured to invoke the program instructions in the memory to cause a first device to perform the card sharing method in the foregoing embodiments.

For example, this application further provides a computer program product, including executable instructions. The executable instructions are stored in a readable storage medium. At least one processor of an electronic device is able to read the executable instructions from the readable storage medium, and the at least one processor executes the executable instructions to cause the electronic device to implement the card sharing method in the foregoing embodiments.

For example, this application further provides a computer readable storage medium, where a computer program is stored in the computer readable storage medium. When the computer program is executed by a processor, an electronic device is caused to implement the card sharing method provided in the foregoing embodiments.

For example, this application further provides a communications system. The communications system provided in this application may include a first device and a second device, where a first application is installed on the first device, and a third application is installed on the second device. The first application is configured to: display an interface of the first application in response to a first operation of a user, where a first card is displayed on the interface of the first application, the first card includes a first card module and a second card module, and interface resources of the first card are provided by a second application. The first application is further configured to send a second message to the third application in response to a second operation of the user, where the second operation is associated with the first card module, and the second message is used to indicate the first card module. The third application is configured to display an interface of the third application, where the first card module is displayed on the interface of the third application, and interface resources of the first card module are provided by a fourth application.

For the first device and the second device in the communications system, refer to the examples described above. Details are not described herein again.

In the foregoing embodiments, all or some functions may be implemented by software, hardware, or a combination of software and hardware. When the functions are implemented by software, all or some of the functions may be implemented in a computer program product form. A computer program product includes one or more computer instructions. When computer program instructions are loaded and executed on a computer, the processes or functions according to the embodiments of this application are generated in whole or in part. The computer may be a general-purpose computer, a dedicated computer, a computer network, or another programmable apparatus. The computer instructions may be stored in a computer readable storage medium. The computer readable storage medium may be any available medium that can be accessed by a computer, or a data storage device, such as a server or a data center integrated with one or more available media. The available medium may be a magnetic medium (for example, a floppy disk, a hard disk, or a magnetic tape), an optical medium (for example, DVD), a semiconductor medium (for example, a solid state disk (solid state disk, SSD)), or the like.

A person of ordinary skill in the art may understand that some or all of the processes of the methods in the embodiments may be implemented by a computer program instructing related hardware. The program may be stored in a computer readable storage medium. When the program is run, the processes of the methods in the embodiments are performed. The storage medium includes various media that can store program code, such as a ROM, a random access memory RAM, a magnetic disk, or an optical disc.

What is claimed is:

1. An electronic device, comprising at least one memory and at least one processor, wherein
   the memory is configured to store program instructions; and
   the processor is configured to invoke the program instructions in the memory, to cause the electronic device to perform the following steps:
   displaying an interface of a first application in response to a first operation of a user, wherein a first card is displayed on the interface of the first application, the first card comprises a first card module and a second card module, and interface resources of the first card are provided by a second application;
   sending a second message to a third application in response to a second operation of the user, wherein the second operation is associated with the first card module, and the second message comprises an identifier of the first card module; and
   displaying an interface of the third application, wherein the first card module is displayed on the interface of the third application, and interface resources of the first card module are provided by a fourth application,
   wherein the first application, the second application, and the third application are different application programs on a first device which is the electronic device, and the first card module comprises an operation button to control a functionality of the first application on the first device.

2. The device according to claim 1, wherein the first card further comprises a third card module, the third card module is also displayed on the interface of the third application, and interface resources of the third card module are provided by the fourth application.

3. The device according to claim 2, wherein the processor is configured to invoke the program instructions in the memory, to cause the electronic device further to perform the following steps:
sending a first message to a second application process;
receiving a first drawing result from the second application process, wherein the first drawing result is obtained by rendering and drawing by the second application process based on the interface resources of the first card, the interface resources of the first card are obtained by invoking by the second application process from a resource package set based on the first message, and the resource package set comprises the interface resources of the first card module, the second card module, and the third card module that are of the first card, and interface resources of a fourth card module and a fifth card module that are of a second card; and
displaying the first card on the interface of the first application based on the first drawing result.

4. The device according to claim 3, wherein the first message comprises an identifier of the first card.

5. The device according to claim 4, wherein the first message further comprises a first address; and
the first drawing result sent to the first address is received from the second application process.

6. The device according to claim 3, wherein the first message comprises an identifier of the first card, the identifier of the first card module, and an identifier of the second card module.

7. The device according to claim 3, wherein the processor is configured to invoke the program instructions in the memory, to cause the electronic device further to perform the following step:
sending the first message to the second application process in a case that the first device comprises the resource package set.

8. The device according to claim 3, wherein the resource package set further comprises interface resources of a fifth application.

9. The device according to claim 2, wherein the processor is configured to invoke the program instructions in the memory, to cause the electronic device further to perform the following steps:
sending a third message to a fourth application process;
receiving a second drawing result from the fourth application process, wherein the second drawing result is obtained by rendering and drawing by the fourth application process based on the interface resources of the first card module, the interface resources of the first card module are obtained by invoking by the fourth application process from a resource package set based on the third message, and the resource package set comprises the interface resources of the first card module, the second card module, and the third card module that are of the first card, and the interface resources of a fourth card module and a fifth card module that are of a second card; and
displaying the first card module on the interface of the third application based on the second drawing result.

10. The device according to claim 9, wherein the third message comprises the identifier of the first card and the identifier of the first card module.

11. The device according to claim 10, wherein the third message further comprises a second address; and
the second drawing result sent to the second address is received from the fourth application process.

12. The device according to claim 9, wherein the processor is configured to invoke the program instructions in the memory, to cause the electronic device further to perform the following step:
when it is determined that a third application process is capable of displaying a card, sending the third message to the fourth application process.

13. The device according to claim 2, wherein a first application process is corresponding to the first application; a second application process is corresponding to the second application; a third application process is corresponding to the third application; a fourth application process is corresponding to the fourth application; the second application and the fourth application are a same application program; and the second application process and the fourth application process are a same application program process.

14. The device according to claim 2, wherein the fourth application is a different application program on a second device; a first application process is corresponding to the first application; a second application process is corresponding to the second application; a third application process is corresponding to the third application; and a fourth application process is corresponding to the fourth application.

15. The device according to claim 1, wherein a first application process is corresponding to the first application; a second application process is corresponding to the second application; a third application process is corresponding to the third application; a fourth application process is corresponding to the fourth application; the second application and the fourth application are a same application program; and the second application process and the fourth application process are a same application program process.

16. The device according to claim 1, further comprising, repeating the steps, wherein for the repeated steps the fourth application is a different application program on a second device; the first device is different from the second device; a first application process is corresponding to the first application; a second application process is corresponding to the second application; a third application process is corresponding to the third application; and a fourth application process is corresponding to the fourth application.

17. The device according to claim 1, further comprising, repeating the steps, wherein for the repeated steps; a first application process is corresponding to the first application; a second application process is corresponding to the second application; a third application process is corresponding to the third application; a fourth application process is corresponding to the fourth application; the second application and the fourth application are a same application program; and the second application process and the fourth application process are a same application program process.

18. The device according to claim 1, wherein the interface of the first application comprises a first region and a second region; and
the first card is located in the first region, and a first application page is located in the second region, wherein interface resources of the first application page are provided by the first application.

19. The device according to claim 1, wherein the first application comprises any one of a home screen, a minus one screen, a control center, a notification center or an AI life application.

20. A method, performed by an electronic device, comprising:
- displaying an interface of a first application in response to a first operation of a user, wherein a first card is displayed on the interface of the first application, the first card comprises a first card module and a second card module, and interface resources of the first card are provided by a second application;
- sending a second message to a third application in response to a second operation of the user, wherein the second operation is associated with the first card module, and the second message comprises an identifier of the first card module; and
- displaying an interface of the third application, wherein the first card module is displayed on the interface of the third application, and interface resources of the first card module are provided by a fourth application,
- wherein the first application, the second application, and the third application are different application programs on a first device which is the electronic device, and the first card module comprises an operation button to control a functionality of the first application on the first device.

* * * * *